United States Patent [19]
Wittenbreder

[11] Patent Number: 6,147,886
[45] Date of Patent: Nov. 14, 2000

[54] DUAL OPPOSED INTERLEAVED COUPLED INDUCTOR SOFT SWITCHING CONVERTERS

[75] Inventor: Ernest H. Wittenbreder, Flagstaff, Ariz.

[73] Assignee: Technical Witts, Inc., Flagstaff, Ariz.

[21] Appl. No.: 09/312,091

[22] Filed: May 15, 1999

[51] Int. Cl.[7] .............................. H02M 3/24; H02M 3/335

[52] U.S. Cl. ................................ 363/95; 363/17; 363/132

[58] Field of Search ................................... 363/95, 17, 16, 363/20, 21, 132, 134, 127

[56] References Cited

U.S. PATENT DOCUMENTS

| | | | |
|---|---|---|---|
| 4,914,561 | 4/1990 | Rice | 363/126 |
| 5,132,888 | 7/1992 | Lo et al. | 363/17 |
| 5,291,382 | 3/1994 | Cohen | 363/16 |
| 5,325,283 | 6/1994 | Farrington et al. | 363/21 |
| 5,754,413 | 5/1998 | Fraidlin | 363/16 |
| 5,805,432 | 9/1998 | Zaitsu et al. | 363/16 |

*Primary Examiner*—Peter S. Wong
*Assistant Examiner*—Rajnikant B. Patel

[57] ABSTRACT

The power converter of this invention accomplishes zero voltage switching at both turn on and turn off transitions of four primary switches (220, 224, 228, and 232). A pair of coupled inductors (242 and 244) serve as both energy storage devices and isolation mechanisms. The stored energy in the coupled inductors (242 and 244) is used to drive the resonant transitions. The availability of stored energy in a coupled inductor for driving a switching transition is dependent on the timing of secondary switches (250 and 252) whereby the turn off of the secondary switches is delayed until the transition of the primary switches is complete. The power converter behaves as a pair of interleaved coupled inductor buck converters with oppositely directed magnetizing currents. During a first half cycle, while one inductor is coupled to the output, the other uncoupled inductor behaves as a current source, setting the primary winding currents for both inductors equal to the magnetizing current of the uncoupled inductor. The inductor which is coupled to the output appears as an output filter capacitor or voltage source to the uncoupled inductor during the first half cycle. During the alternate half cycle the roles of the two inductors are reversed. During the transition from one half cycle to the alternate half cycle the states of the secondary switches (250 and 252) are maintained unchanged until the transition has been completed so that the secondary switch transition is delayed with respect to the primary switch transition thereby making available the energy in the uncoupled inductor for driving the switching transition. The secondary switch connected to the uncoupled inductor is maintained open until the switching transition is complete accomplishing a resonant transition.

18 Claims, 58 Drawing Sheets

DUAL OPPOSED INTERLEAVED COUPLED INDUCTOR SOFT SWITCHING CONVERTERS

BACKGROUND OF THE INVENTION

1. Field of the Invention

The subject invention generally pertains to electronic power conversion circuits, and more specifically to high frequency, switched mode power electronic converter circuits.

2. Description of Related Art

There are some power conversion circuits which accomplish higher efficiencies by implementing a mechanism that accomplishes switching at zero voltage. Power loss in a switch is the product of the voltage applied across the switch and the current flowing through the switch. In a switching power converter, when the switch is in the on state, the voltage across the switch is zero, so the power loss is zero. When the switch is in the off state, the power loss is zero, because the current through the switch is zero. During the transition from on to off, and vice versa, power losses can occur, if there is no mechanism to switch at zero voltage or zero current. During the switching transitions, energy losses will occur if there is simultaneously (1) non-zero voltage applied across the switch and (2) non-zero current flowing through the switch. The power losses associated with the switching transitions will be the product of the energy lost per transition and the switching frequency. The power losses that occur because of these transitions are referred to as switching losses by those people who are skilled in the art of switching power converter design. In zero voltage switching converters the zero voltage turn off transition is accomplished by turning off a switch in parallel with a capacitor and a diode when the capacitor's voltage is zero. The capacitor maintains the applied voltage at zero across the switch as the current through the switch falls to zero. In the zero voltage transition the current in the switch is transferred to the parallel capacitor as the switch turns off.

The zero voltage turn on transition is accomplished by discharging the parallel capacitor using the energy stored in a magnetic circuit element, such as an inductor, and turning on the switch after the parallel diode has begun to conduct. During the turn on transition the voltage across the switch is held at zero clamped by the parallel diode. The various zero voltage switching (ZVS) techniques differ in the control and modulation schemes used to accomplish regulation and in the energy storage mechanisms used to accomplish the zero voltage turn on transition.

One of the ZVS techniques uses a resonant circuit which is frequency modulated over a broad frequency range. An example is shown in FIG. 1. These techniques have been refined by a multi-resonant technique in which more resonant circuit elements and a complex control circuit are required, but the converter can operate at a fixed frequency.

Several techniques have been introduced which accomplish zero voltage switching, inherently, at constant switching frequency. One of these techniques requires a full bridge switching arrangement with four primary switches in which the regulation is accomplished by phase modulation or by alternating pulse width modulation in the two switching legs. This technique is illustrated in FIG. 2. This technique has become a standard technique for high power conversion at high frequency. One of the potential problems with this technique is staircase saturation of the transformer core resulting from relatively small DC imbalances in the transformer's primary winding, which can lead to catastrophic failure. One common solution to the staircase saturation problem is to place a capacitor in series with the primary winding of the transformer to block any DC current. The series capacitor incurs losses during high power operation and requires the user to use voltage mode control rather than the preferred current mode control, which unbalances the capacitor voltage resulting in high switch stress that can lead to catastrophic failure. Another problem is high conduction losses that results from the peak recirculation current during the reset time of the output choke.

The FIG. 3 circuit is an example of prior art that overcomes the staircase saturation problem associated with the FIG. 2 circuit. The two transformers are coupled inductors and energy storage devices that accommodate large DC currents, so that staircase saturation is not a problem. The FIG. 3 circuit can accomplish zero voltage switching under the right circumstances. The transitions are driven by the stored energy in the parallel inductor. The amount of energy stored in the parallel inductor must be large enough to charge/discharge the parasitic capacitors associated with the switches that are in transition. The current in the parallel inductor would have to be increased sufficiently to both provide current to drive the transition and current to drive the primary windings of the transformers. This is a particular problem at high line voltage where the energies required to drive the switching transition are greatest. For illustration, referring to FIG. 3, consider the condition in which switches S1 and S4 are on and switches S2 and S3 are off. Increasing current will flow from left to right through both the parallel inductor, L1, and the primary windings of the transformers. During this time current flows in the secondary winding of T1 through D1 and to the output capacitor and load resistor. Stored energy builds up in the core of transformer T2, but no current flows in the secondary winding of T2, since its secondary winding voltage reverse biases D2. After a time, switch S1 is turned off and the stored energies in L1 and T2 drive the transition which can easily be made to be zero voltage. During the state which follows the connection point between T1 and T2 drops below ground potential and the T1 primary voltage becomes equal to the sum of the voltages across T2 and the switches, S2 and S4. During the time that S2 and S4 are on, the current in L1 remains relatively unchanged, dropping slightly, but the current in the primary windings drops towards zero as the current in the secondary windings shifts from T1 to T2. The critical switching transition occurs when switch S4 turns off. During the switching transition that follows L1 must provide all of the energy to drive the transition, charging the output capacitance of S4, discharging the output capacitance of S3 and providing charge to the other parasitic capacitances in the windings of each of the magnetic circuit elements and the D1 diode, which becomes reverse biased during the transition. As secondary current shifts from D1 to D2 the current in the primary circuit reverses sign and flows from right to left. When the transition is complete the current in the primary winding will equal the magnetizing current in the primary winding of the T1 transformer. In this discussion, and all the discussions that follow, the magnetizing current will mean the current in a coupled inductor winding that is substantially proportional to the field of magnetic induction that exists in the core of the coupled inductor. The magnetizing current in a coupled inductor may be referred to any winding of that coupled inductor in such a manner that the total stored magnetic energy in the core of the coupled inductor is equal to one half times the inductance of the winding, to which the magnetizing current is referred, times the square of the magnetizing current. With this definition of magnetizing current the magnetizing current will have both AC and DC components, in general. As the switching transition progresses the current required by the primary circuit from L1 increases as the current provided by L1 decreases. The rate of increase of current in the primary windings from right to left during the S4 turn off transition depends on the line voltage and the resistance in the active section of the circuit. As the current is the primary windings increases from right to left much of the current and energy provided by the L1 inductor is diverted to driving the load. In order for the current in the inductor L1 to drive the load during the transition and also drive the transition the current provided by the inductor L1 must be larger than the peak primary current and the energy stored must be sufficient that the current provided by L1 is relatively invariant for the duration of the transition. As a result of the large current in L1 the conduction losses in the four switches are substantially increased by the presence of L1 and because of the substantial stored energy requirement the inductor L1 adds additional cost, weight and volume to the converter.

OBJECTS AND ADVANTAGES

An object of the invention is to accomplish zero voltage switching, without the addition of energy storage elements specifically for driving switching transitions, and thereby to reduce semiconductor switching power losses.

Another object is to provide an isolated converter which is relatively simple and is capable of delivering high output power.

Another object is to eliminate the possibility of transformer staircase saturation.

Another object is to provide a converter design with minimal snubber requirements and superior EMI performance.

Another object is to provide a simple resonant transition converter design that can be readily used with the single frequency, pulse width modulated or phase shift modulated, controller integrated circuits.

Another object is to provide a resonant switching transition mechanism which can be designed to provide zero voltage switching over the full range of line voltage and load conditions.

Another object is to provide a high power conversion scheme with reduced conduction losses.

Another object of this invention is to provide a high efficiency zero voltage switching power converter design that can be extended to multiple isolated outputs.

Another objective is to provide a high power bridge converter that neither needs nor benefits from the addition of a capacitor placed in series with a primary winding of a coupled inductive magnetic element.

Another objective is to provide a converter with superior output ripple performance.

Another objective is to provide a high efficiency power converter with stored energy for driving the switching transitions which is independent of load current.

Another object is to provide a resonant switching transition mechanism with two magnetic circuit elements, which store the energy transferred to the load during a switching cycle and which store energy that can be used for zero voltage transitions for all transitions of all switches.

Further objects and advantages of my invention will become apparent from a consideration of the drawings and ensuing description.

These and other objects of the invention are provided by a novel circuit technique that uses two coupled inductors as both energy storage devices and isolation mechanisms, and a secondary side switch for each coupled inductor and each output. The zero voltage switching transitions are accomplished using stored magnetic energy in one of the two coupled inductors and a novel switch timing mechanism that prevents stored energy directed in opposition to the energy needed to drive the switching transitions from being available during the critical switching transitions.

BRIEF DESCRIPTION OF THE DRAWINGS

The present invention is illustrated by reference to the drawings in which like reference numerals refer to like elements of the invention.

Figure 1:
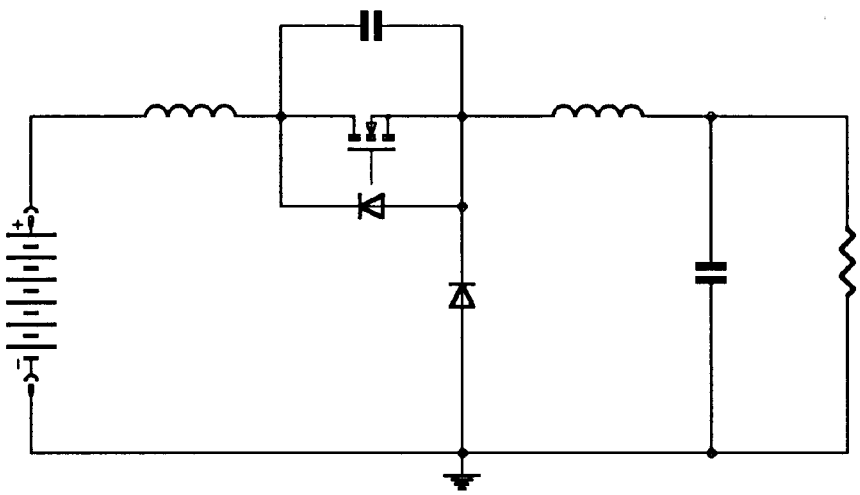
FIG. 1 illustrates a circuit schematic drawing of a frequency modulated, zero voltage switching power converter.

| Reference Numerals | |
|---|---|
| 60 node | 61 DC input power source |
| 62 lead | 63 node |
| 64 lead | 65 node |
| 66 input filter capacitor | 67 reset capacitor |
| 68 node | 69 lead |
| 70 node | 71 diode |
| 72 switch | 73 capacitor |
| 74 node | 75 diode |
| 76 switch | 77 capacitor |
| 78 node | 79 lead |
| 80 node | 81 lead |
| 82 lead | 83 coupled inductor |
| 84 lead | 85 coupled inductor |
| 86 lead | 87 lead |
| 88 node | 89 lead |
| 90 lead | 91 lead |
| 92 lead | 93 switch |
| 94 switch | 95 node |
| 96 lead | 97 node |
| 98 output filter capacitor | 99 load |
| 101 DC input voltage source | 102 lead |
| 103 node | 104 lead |
| 105 node | 106 input filter capacitor |
| 107 lead | 108 node |
| 109 lead | 110 node |

-continued

Reference Numerals

| | | | |
|---|---|---|---|
| 111 | diode | 112 | switch |
| 113 | capacitor | 114 | node |
| 115 | diode | 116 | switch |
| 117 | capacitor | 118 | node |
| 119 | lead | 120 | node |
| 121 | lead | 122 | coupling capacitor |
| 123 | coupled inductor | 124 | lead |
| 125 | coupled inductor | 126 | lead |
| 127 | lead | 128 | node |
| 129 | lead | 130 | lead |
| 131 | lead | 132 | lead |
| 133 | switch | 134 | switch |
| 135 | node | 136 | lead |
| 137 | node | 138 | output filter capacitor |
| 139 | load | 140 | node |
| 201 | DC input power source | 202 | lead |
| 203 | node | 204 | lead |
| 205 | node | 206 | input filter capacitor |
| 207 | lead | 208 | node |
| 209 | lead | 210 | node |
| 212 | lead | 212 | node |
| 213 | lead | 214 | node |
| 215 | lead | 216 | node |
| 217 | lead | 218 | node |
| 219 | diode | 220 | switch |
| 221 | capacitor | 222 | node |
| 223 | diode | 224 | switch |
| 225 | capacitor | 226 | node |
| 227 | diode | 228 | switch |
| 229 | capacitor | 230 | node |
| 231 | diode | 232 | switch |
| 233 | capacitor | 234 | node |
| 235 | lead | 236 | node |
| 237 | lead | 238 | lead |
| 239 | node | 240 | lead |
| 241 | lead | 242 | coupled inductor |
| 243 | lead | 244 | coupled inductor |
| 245 | lead | 246 | lead |
| 247 | node | 248 | lead |
| 249 | lead | 250 | switch |
| 251 | lead | 252 | switch |
| 253 | node | 254 | node |
| 255 | lead | 256 | output filter capacitor |
| 257 | load | 258 | node |
| 259 | lead | | |

SUMMARY

The subject invention uses a primary switching network that provides alternating bidirectional voltage to a pair of coupled inductors, which are also magnetic energy storage elements, in which the primary windings of the two coupled inductors are connected in series, at least one secondary side switch for each coupled inductor secondary winding, a primary side energy storage and filter capacitor, and a secondary side energy storage and filter capacitor placed in parallel with the load. The zero voltage switching is accomplished in this converter by energy stored in the primary magnetizing inductance of one of the two coupled inductors while secondary current flow is inhibited or delayed during the switching transition in the secondary winding of the transformer which is providing the energy to drive the switching transition.

DESCRIPTION OF THE PREFERRED EMBODIMENTS

Figure 4:
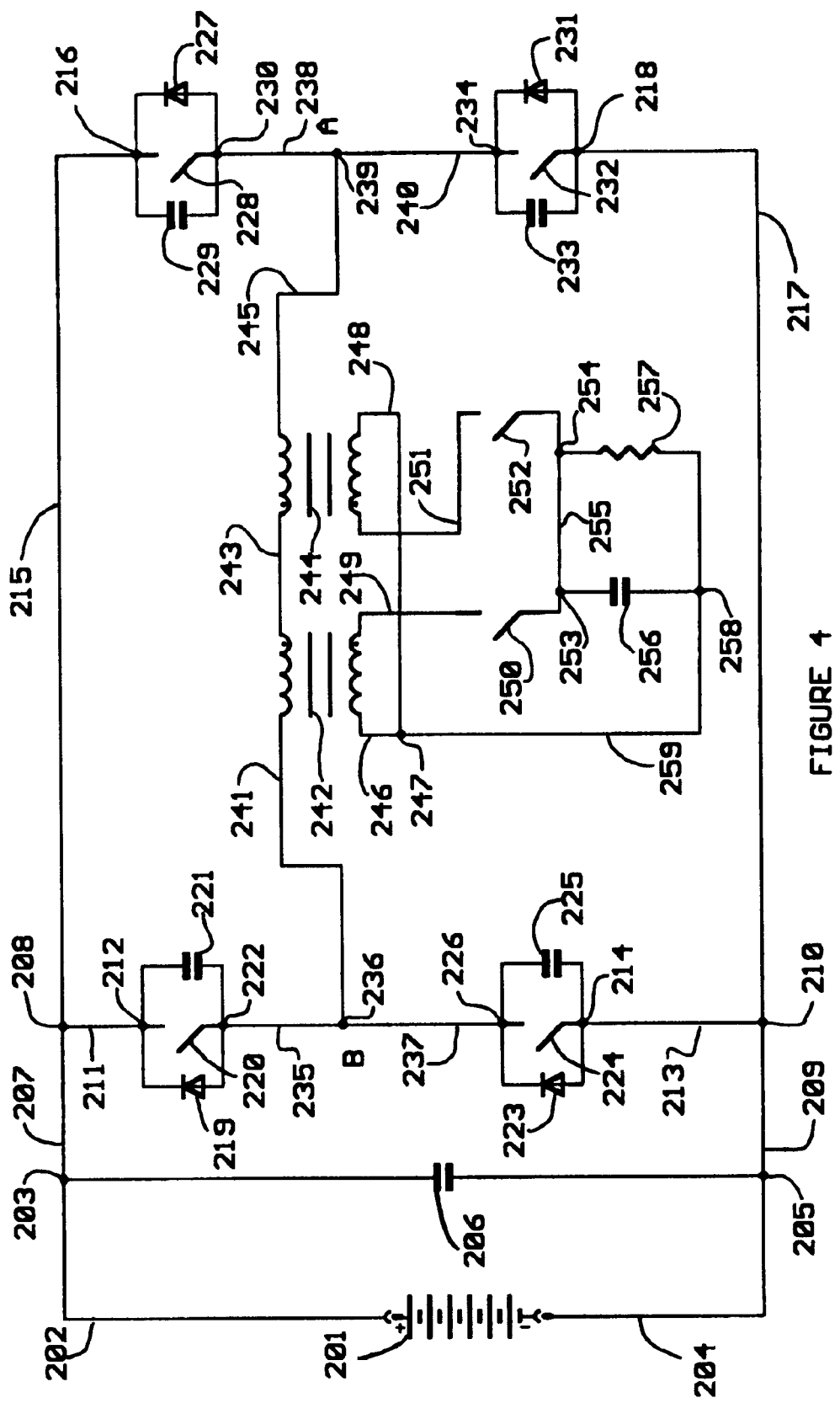
FIG. 4 illustrates a circuit schematic drawing of a soft switching, phase shift modulated, full bridge, dual opposed interleaved coupled inductor buck converter according to the subject invention.

Referring to FIG. 4, there is shown a series type power processing topology. The circuit employs a source of substantially DC voltage, a primary switching network consisting of four switches in a full bridge arrangement that generates alternating bi-directional voltage pulses, a pair of coupled inductors arranged so that the primary windings of the two coupled inductors are in series and their secondary windings are connected at a point that is also common to a load and output filter capacitor, a pair of power switches, one in series with each coupled inductor secondary winding and connected to each other at a point which is also common to the output filter capacitor and the load. For purposes of the operational state analysis, it is assumed that the filter capacitor is sufficiently large that the voltage developed across the capacitor is approximately constant over a switching interval. Also for purposes of the operational state analysis, it is assumed that the input DC voltage source has sufficiently low source impedance that the voltage developed across the input DC voltage source is approximately constant over a switching interval. It will be assumed that the parasitic capacitors that parallel the switches are small and their effects can be ignored, except during the switching transitions. It will be assumed that the coupled inductor windings are coupled with a coupling coefficient of unity. It will be assumed that diodes are ideal and have no leakage and no forward voltage drop. It will finally be assumed that the power switches are ideal; that is, lossless and able to carry current in either direction. Moreover it will be recognized by one skilled in the art that, while only a single output version is considered in this analysis, multiples of voltages may be obtained through the addition of windings, switches, diodes, and capacitors operated as herein to be described.

Structure

As shown in the circuit of FIG. 4, a positive terminal of DC input power source 201 is coupled, via a lead 202, to a node 203. The node 203 is connected to a first terminal of an input filter capacitor 206. A negative terminal of source 201 is connected, via a lead 204, to a node 205. The node 205 is connected to a second terminal of capacitor 206. Node 203 is connected to a node 208 via a lead 207. Node 205 is connected to a node 210 via a lead 209. Node 208 is connected to a node 212 via a lead 211 and to a node 216 via a lead 215. Node 210 is connected to a node 214 via a lead 213 and to a node 218 via a lead 217. Node 212 is connected to a cathode terminal of a diode 219 and to a first terminal of a primary switch 220 and to a first terminal of a capacitor 221. Diode 219, capacitor 221, and switch 220 form a first switch subcircuit. A node 222 is connected to an anode terminal of diode 219 and to a second terminal of switch 220 and to a second terminal of capacitor 221. Node 214 is connected to an anode terminal of a diode 223 and to a first terminal of a primary switch 224 and to a first terminal of a capacitor 225. Diode 223, capacitor 225, and switch 224 form a second switch subcircuit. A node 226 is connected to a cathode terminal of diode 223 and to a second terminal of switch 224 and to a second terminal of capacitor 225. Node 216 is connected to a cathode terminal of a diode 227 and to a first terminal of a primary switch 228 and to a first terminal of a capacitor 229. Diode 227, capacitor 229, and switch 228 form a third switch subcircuit. A node 230 is connected to an anode terminal of diode 227 and to a second terminal of switch 228 and to a second terminal of capacitor 229. Node 218 is connected to a cathode terminal of a diode 231 and to a first terminal of a primary switch 232 and to a first terminal of a capacitor 233. Diode 231, capacitor 233, and switch 232 form a fourth switch subcircuit. Node 222 is connected to a node 236 via a lead 235. Node 226 is connected to node 236 via a lead 237. Node 230 is connected to a node 239 via a lead 238. Node 234 is connected to node 239 via a lead 240. Node 236 is connected to an undotted terminal of the primary winding of a coupled inductor 242 via a lead 241.

A dotted terminal of the primary winding of inductor 242 is connected to a dotted terminal of the primary winding of a coupled inductor 244 via a lead 243. An undotted terminal of the primary winding of inductor 244 is connected to node 239 via a lead 245. An undotted terminal of a secondary winding of inductor 242 is connected to a node 247 via a lead 246. An undotted terminal of a secondary winding of inductor 244 is connected to node 247 via a lead 248. A dotted terminal of the secondary winding of inductor 242 is connected to a first terminal of a secondary switch 250 via a lead 249. A dotted terminal of the secondary winding of inductor 244 is connected to a first terminal of a secondary switch 252 via a lead 251. A second terminal of switch 250 is connected to a node 253. A second terminal of switch 252 is connected to a node 254. Node 253 is connected to node 254 via a lead 255. Node 253 is connected to a first terminal of an output filter capacitor 256. Node 254 is connected to a first terminal of a load resistor 257. A second terminal of capacitor 256 is connected to a node 258. A second terminal of resistor 257 is connected to node 258. Node 258 is connected to node 247 via a lead 259. The dots on the primary and secondary windings of inductors 242 and 244 indicate the polarity of the windings. The AC wave forms of the dotted terminals will be in phase with respect to each other for each coupled inductor. The AC wave forms of the undotted terminals will be in phase with respect to each other for each coupled inductor. The AC wave forms of the dotted terminals and the undotted terminals will be 180° out of phase or in opposite phase in comparison to each other for each coupled inductor.

Figure 5:
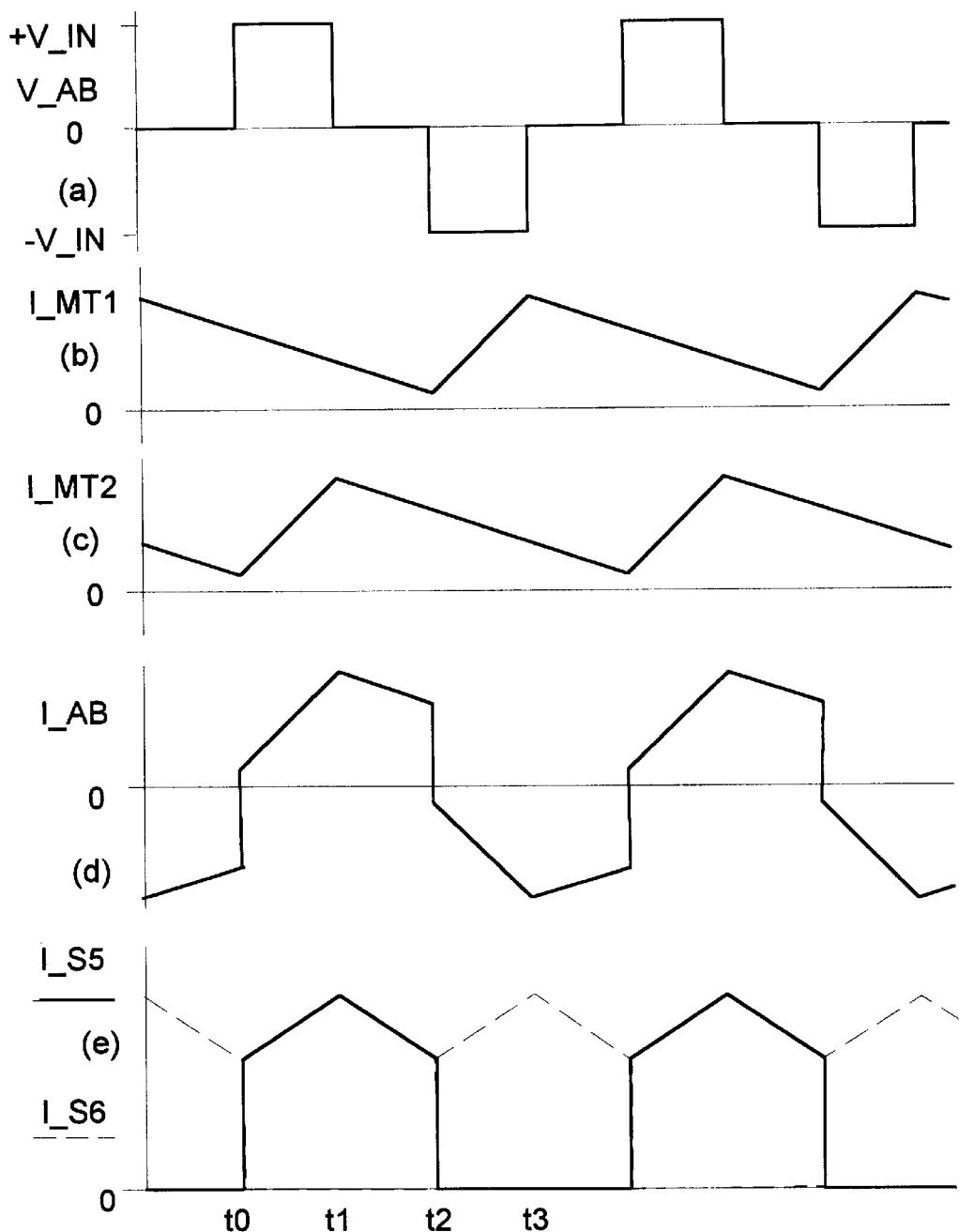
FIG. 5a through 5e are timing diagrams illustrating the operation of the power converter of FIG. 4 using voltage and current wave forms.

The primary switching network consisting of switches 220, 224, 228, and 232 converts the substantially DC input voltage, V__IN, of source 201, applied to this network to an AC wave form at its output terminals, which are labeled A and B in FIG. 4. The AC wave form, measured as the difference voltage between points A and B, is a stream of bi-directional pulses that alternate in polarity, but are substantially equal in magnitude and duration, as illustrated by FIGS. 5a and 6a. A conventional timing circuit (not shown) controls the duty cycles of the switches in order to accomplish output voltage regulation. The control circuit may be responsive to an external control signal or voltage reference, to an AC component of source 201, to the output voltage, to the output current, to the current supplied by the DC input power source, to other physical parameters which may effect power converter or load operation, or to any combination of these physical parameters.

Operation

It is assumed in this analysis that the system has reached a settled operating condition. Except for the short, but finite, switching intervals there are four states of the circuit of FIG. 4, two on states and two off states. It is also assumed, for purpose of analysis, that the switching intervals between the states are approximately zero seconds and that capacitors 221, 225, 229, and 233 are small and do not contribute significantly to the operation of the converter, except during the brief switching transitions.

Figure 6:
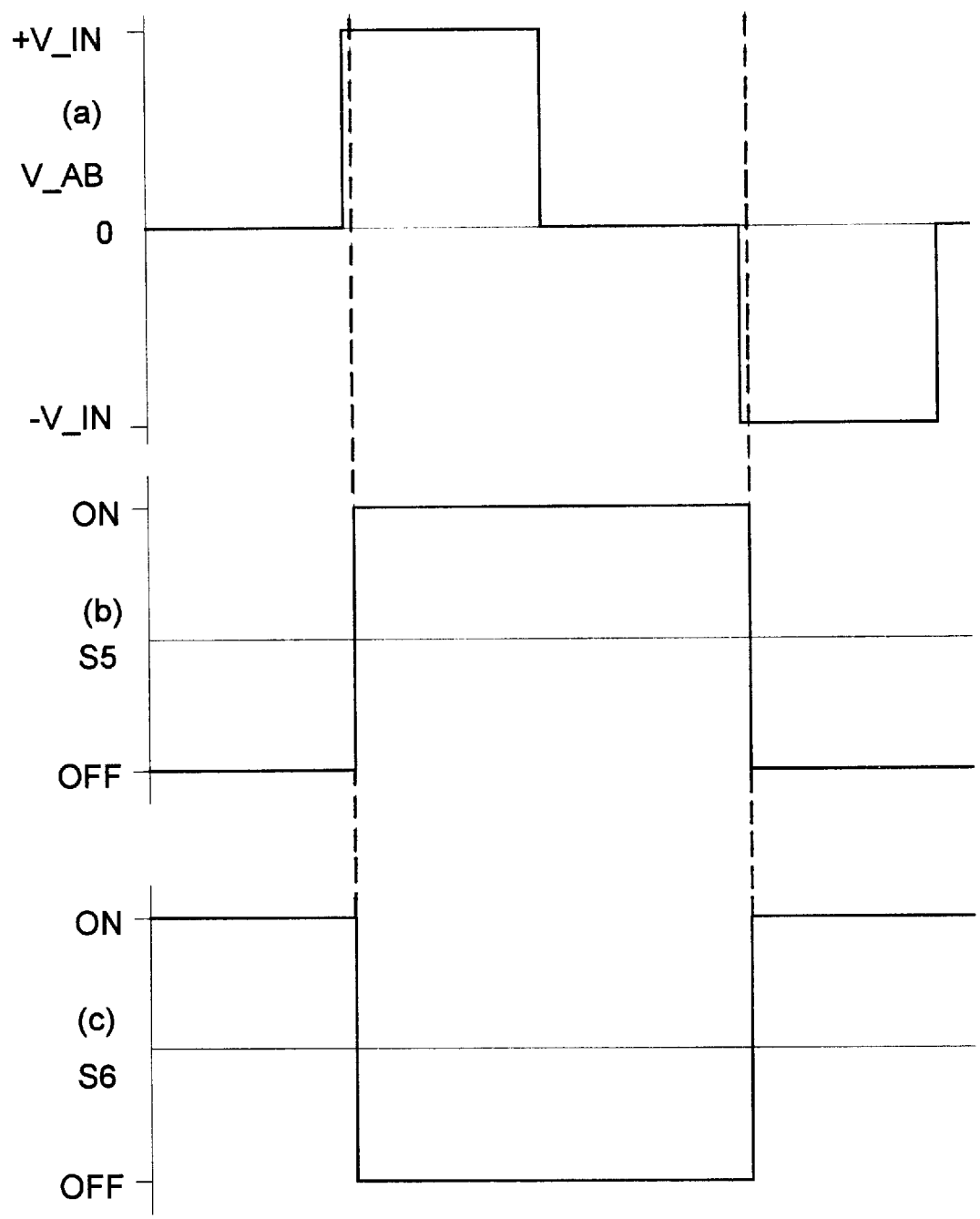
FIG. 6a through 6c are timing diagrams illustrating the action of the primary and secondary switches of FIG. 4.
Figure 7:
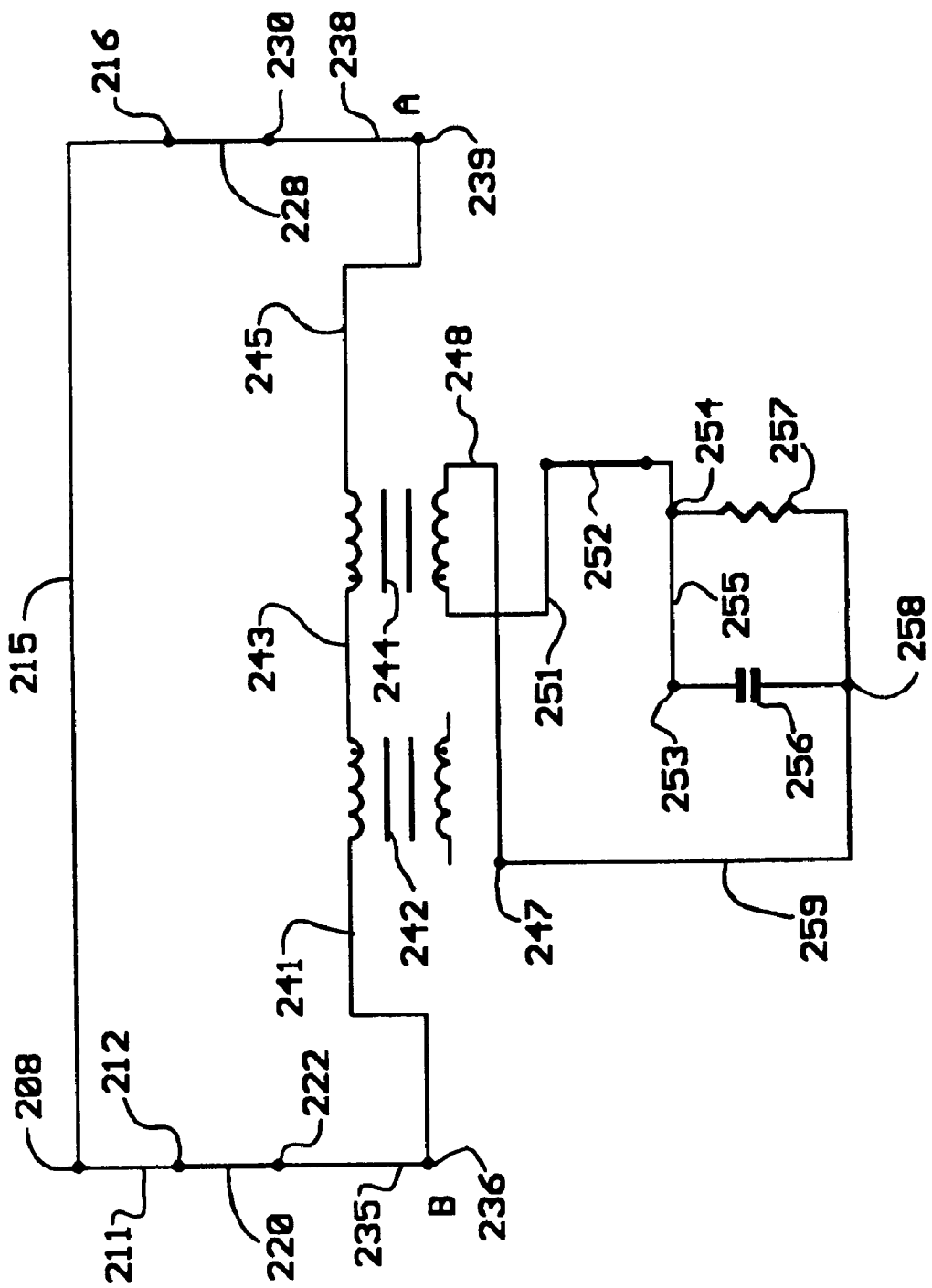
FIG. 7 illustrates an initial condition and second off state of the FIG. 4 converter.
Figure 8:
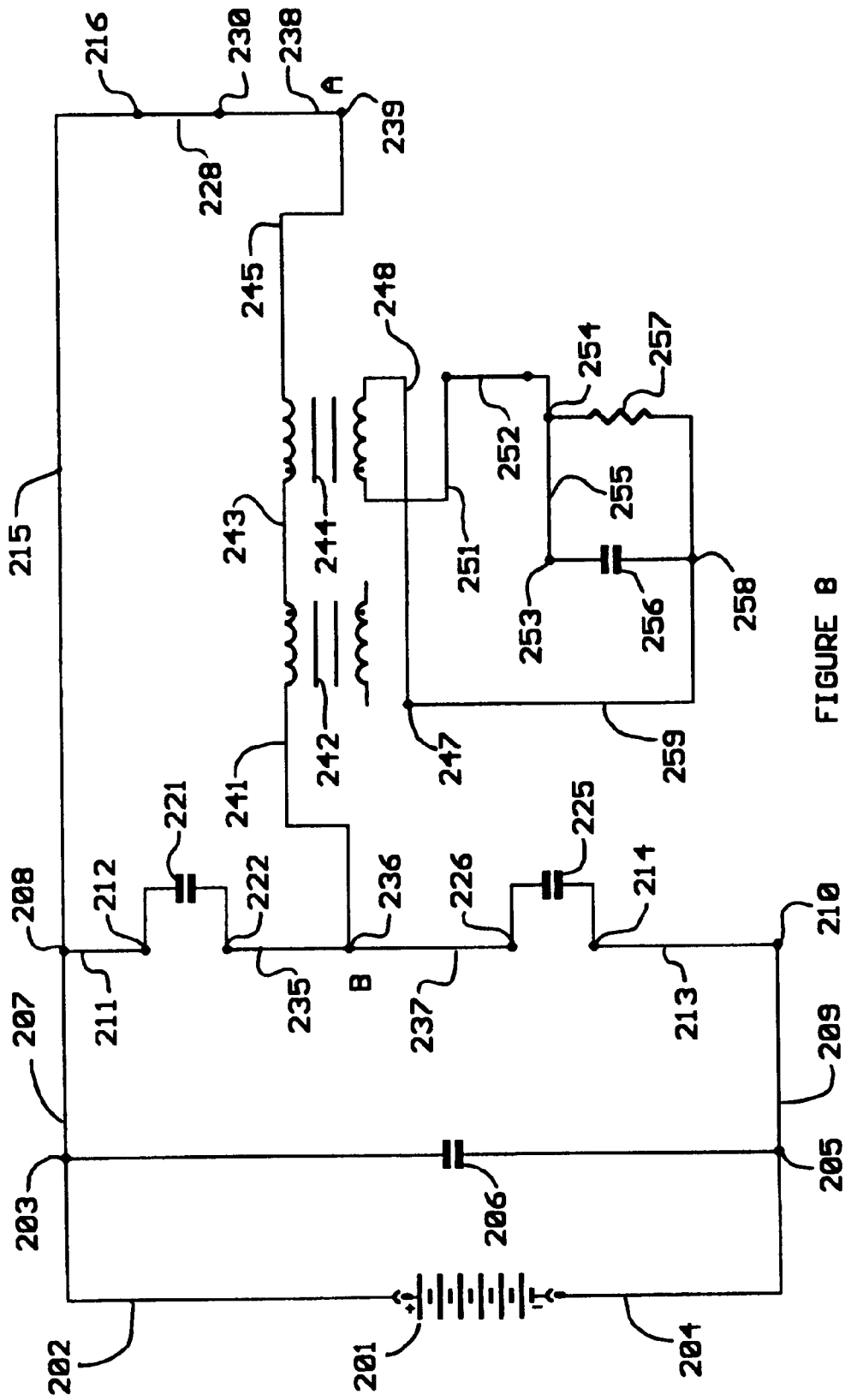
FIG. 8 illustrates a first phase of a first turn on switching transition of the FIG. 4 converter.
Figure 9:
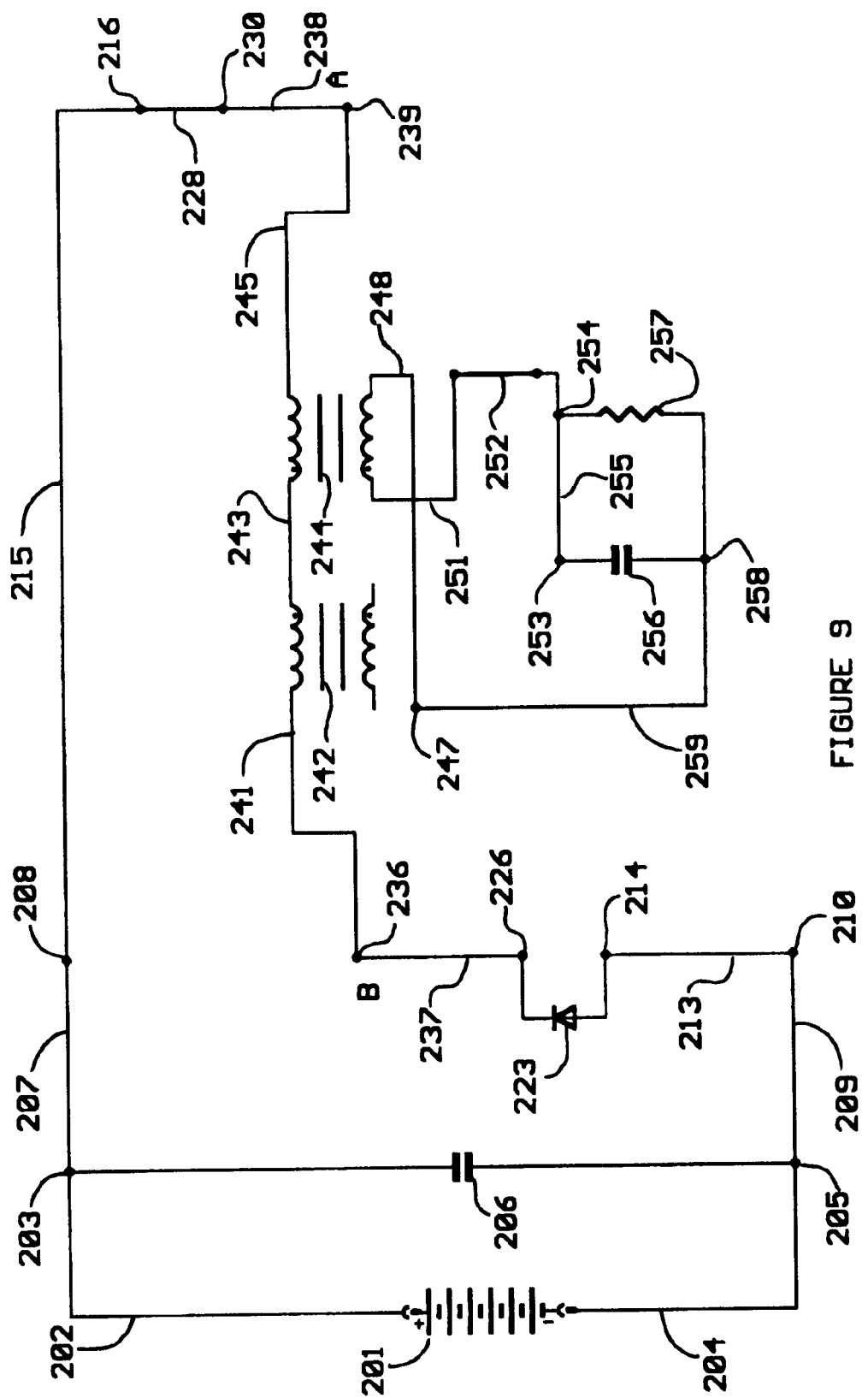
FIG. 9 illustrates a second phase of a first turn on switching transition of the FIG. 4 converter.
Figure 10:
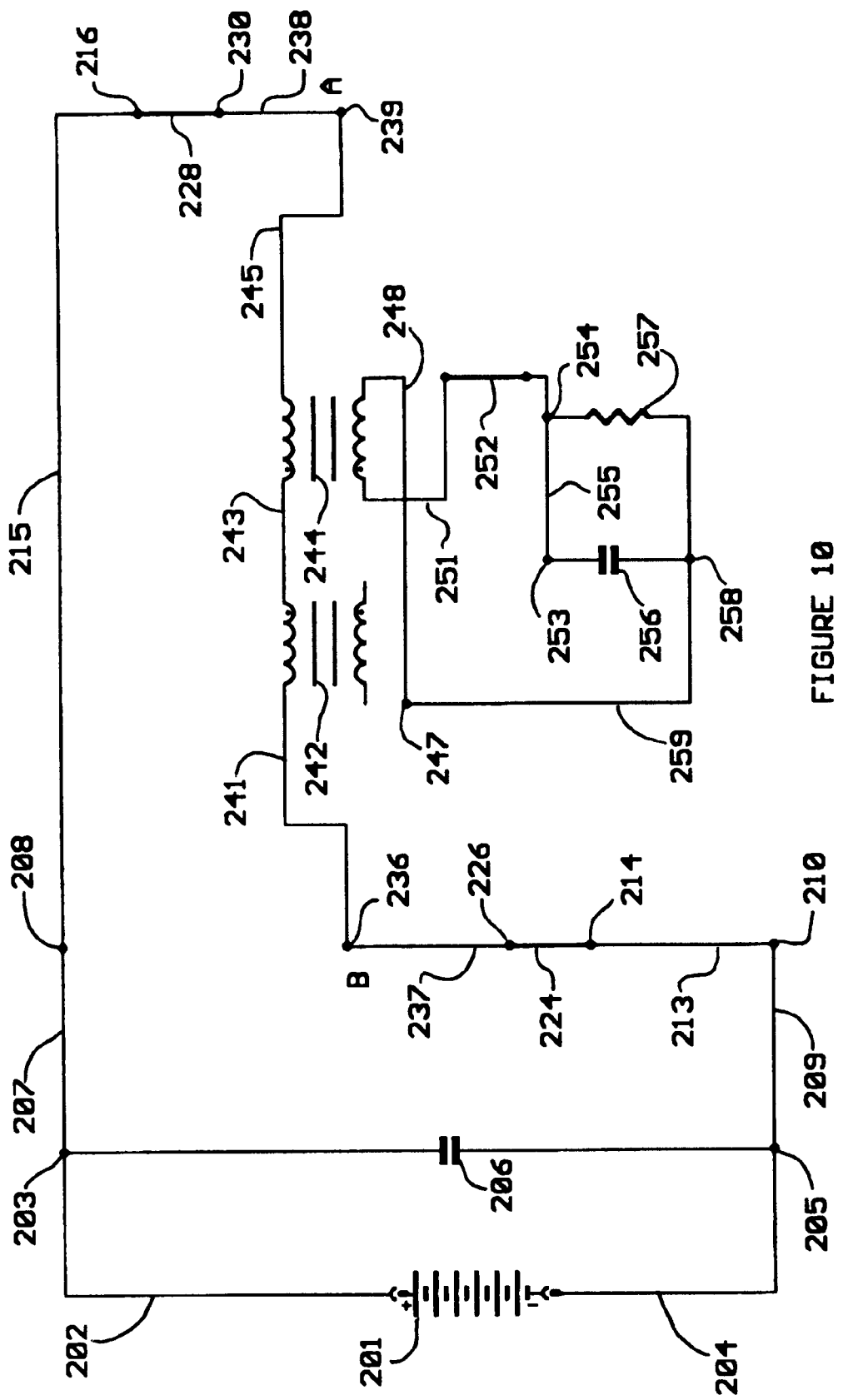
FIG. 10 illustrates a third phase of a first turn on switching transition of the FIG. 4 converter.
Figure 11:
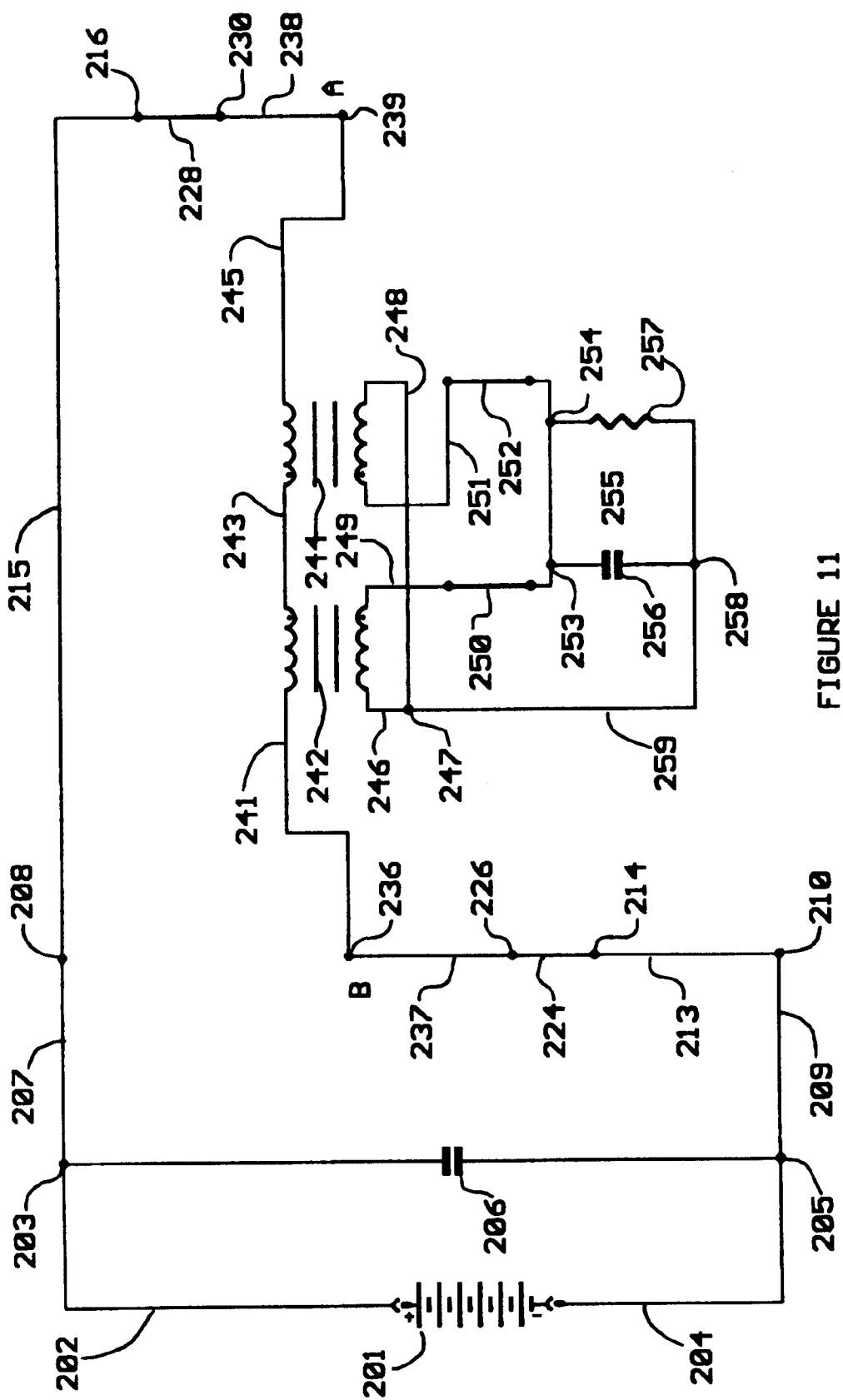
FIG. 11 illustrates a fourth phase of a first turn on switching transition of the FIG. 4 converter.
Figure 12:
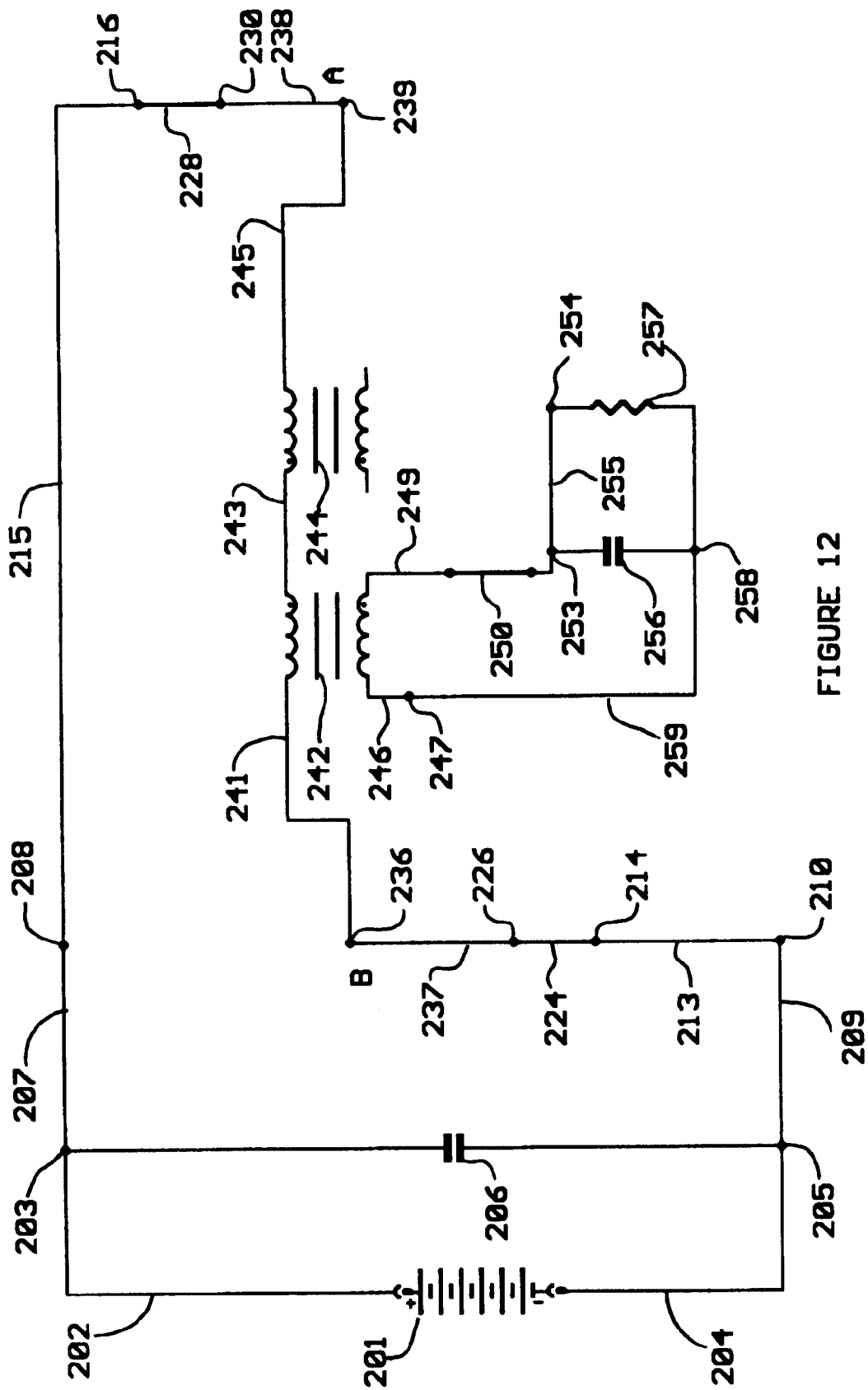
FIG. 12 illustrates a first on state of the FIG. 4 converter.
Figure 13:
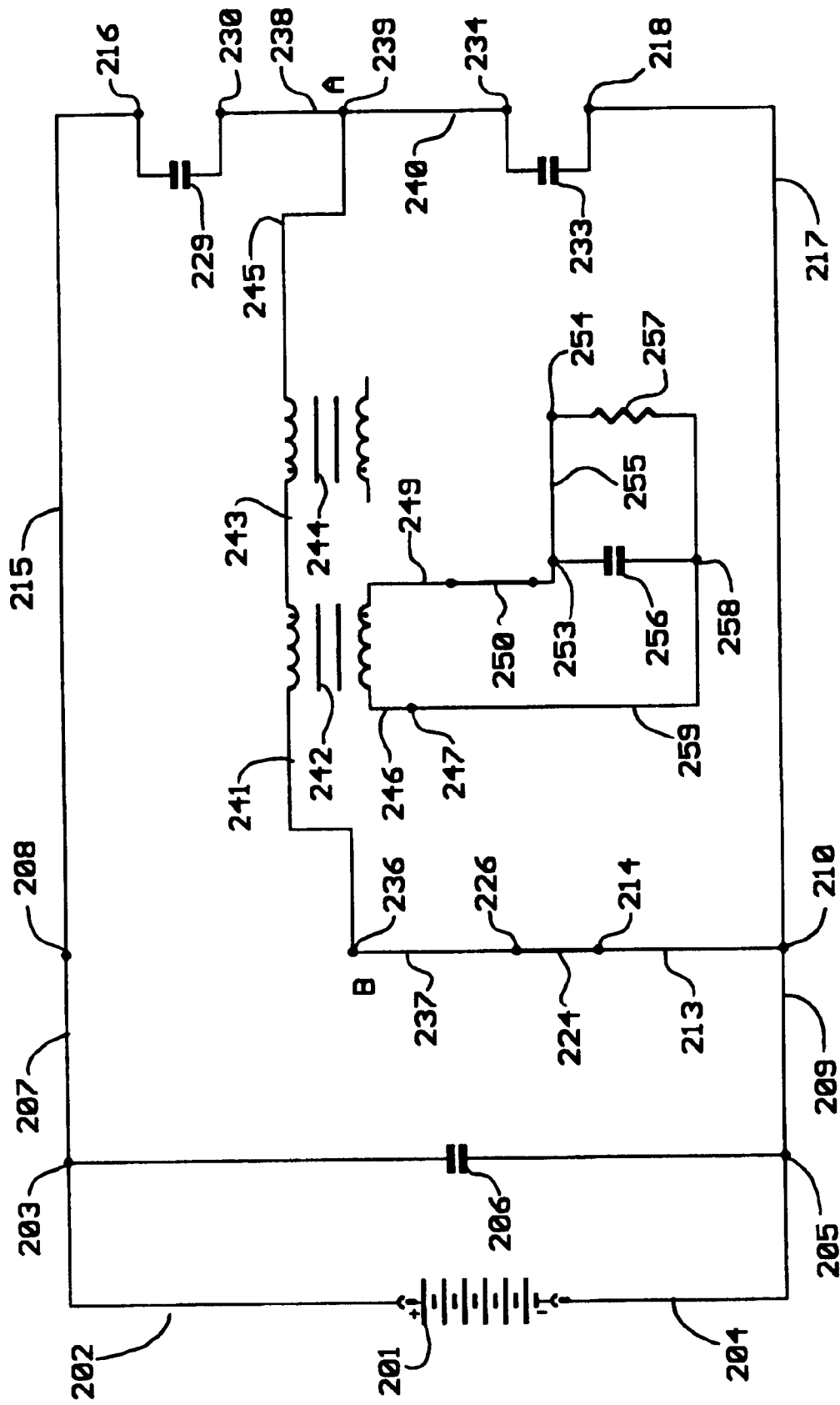
FIG. 13 illustrates a first phase of a first turn off transition of the FIG. 4 converter.
Figure 14:
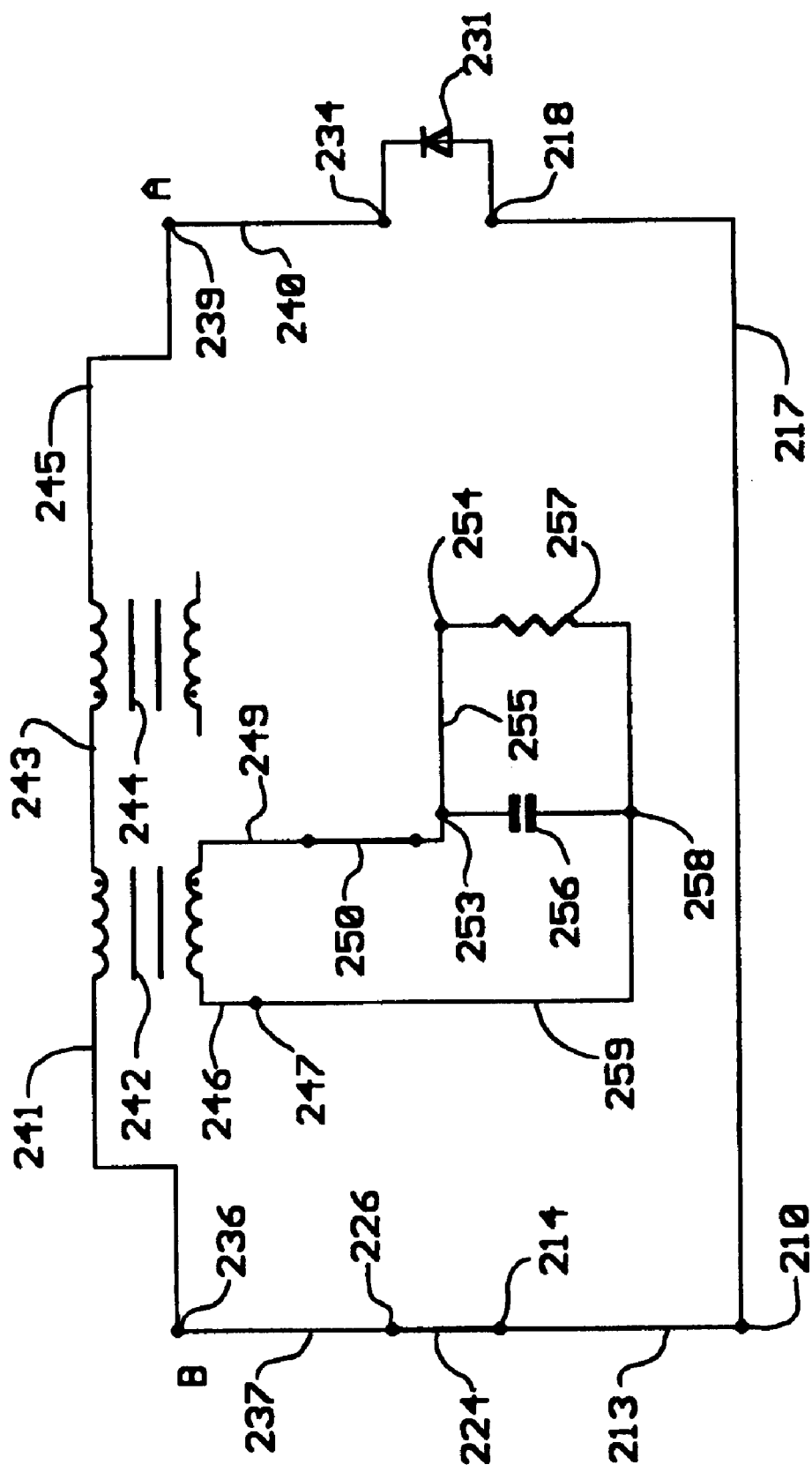
FIG. 14 illustrates a second phase of a first turn off transition of the FIG. 4 converter.
Figure 15:
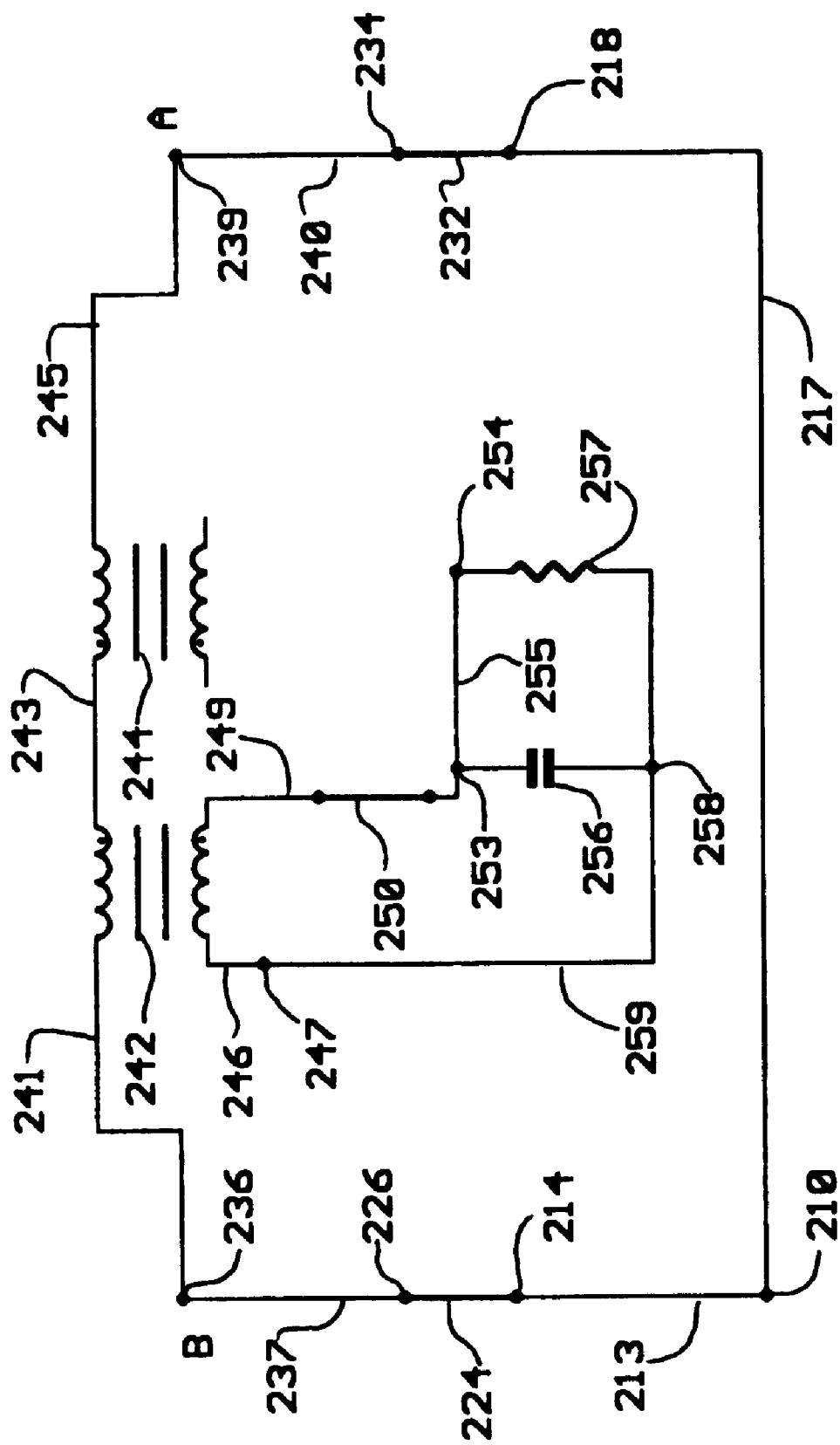
FIG. 15 illustrates a first off state of the FIG. 4 converter.
Figure 16:
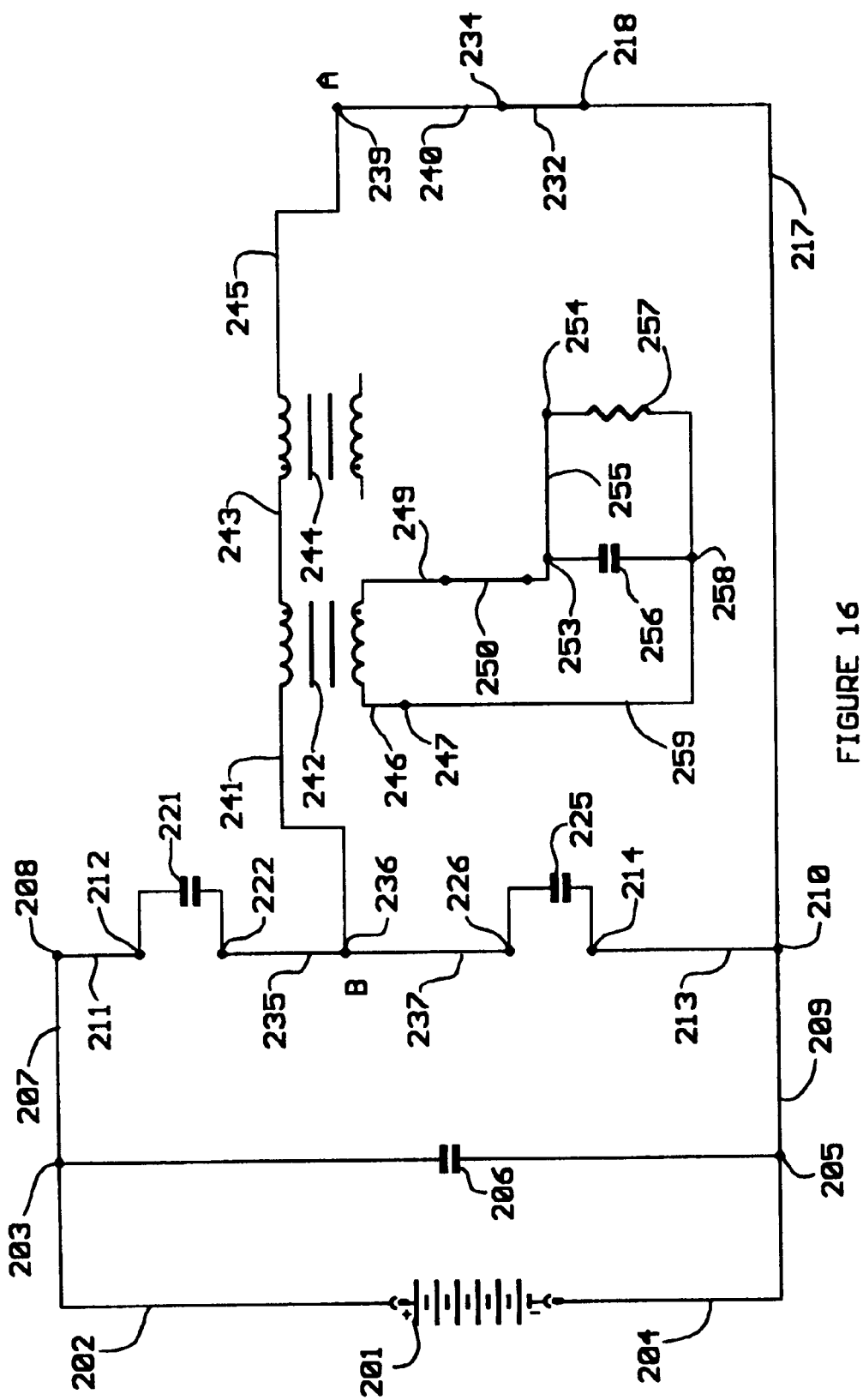
FIG. 16 illustrates a first phase of a second turn on transition of the FIG. 4 converter.
Figure 17:
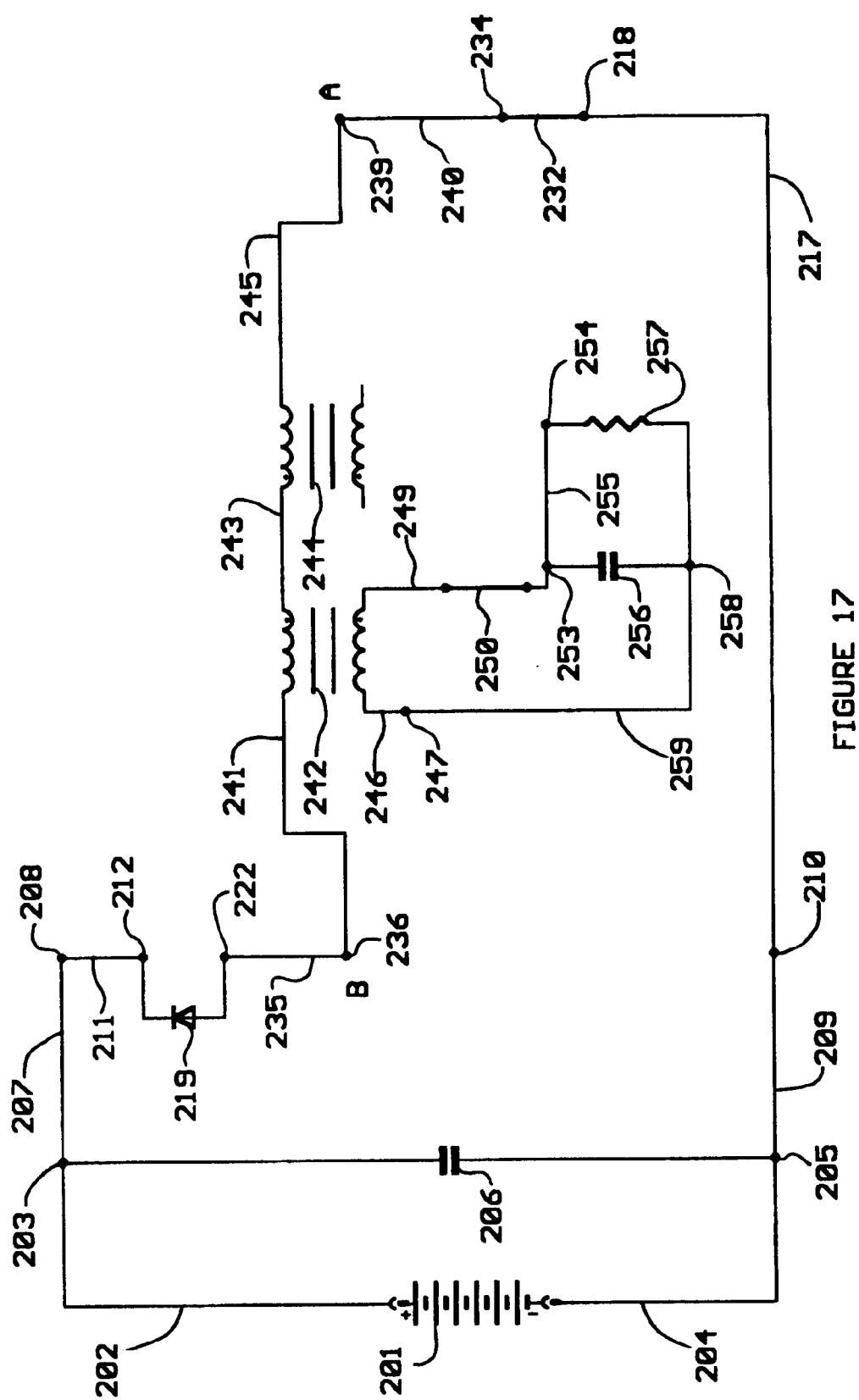
FIG. 17 illustrates a second phase of a second turn on transition of the FIG. 4 converter.
Figure 18:
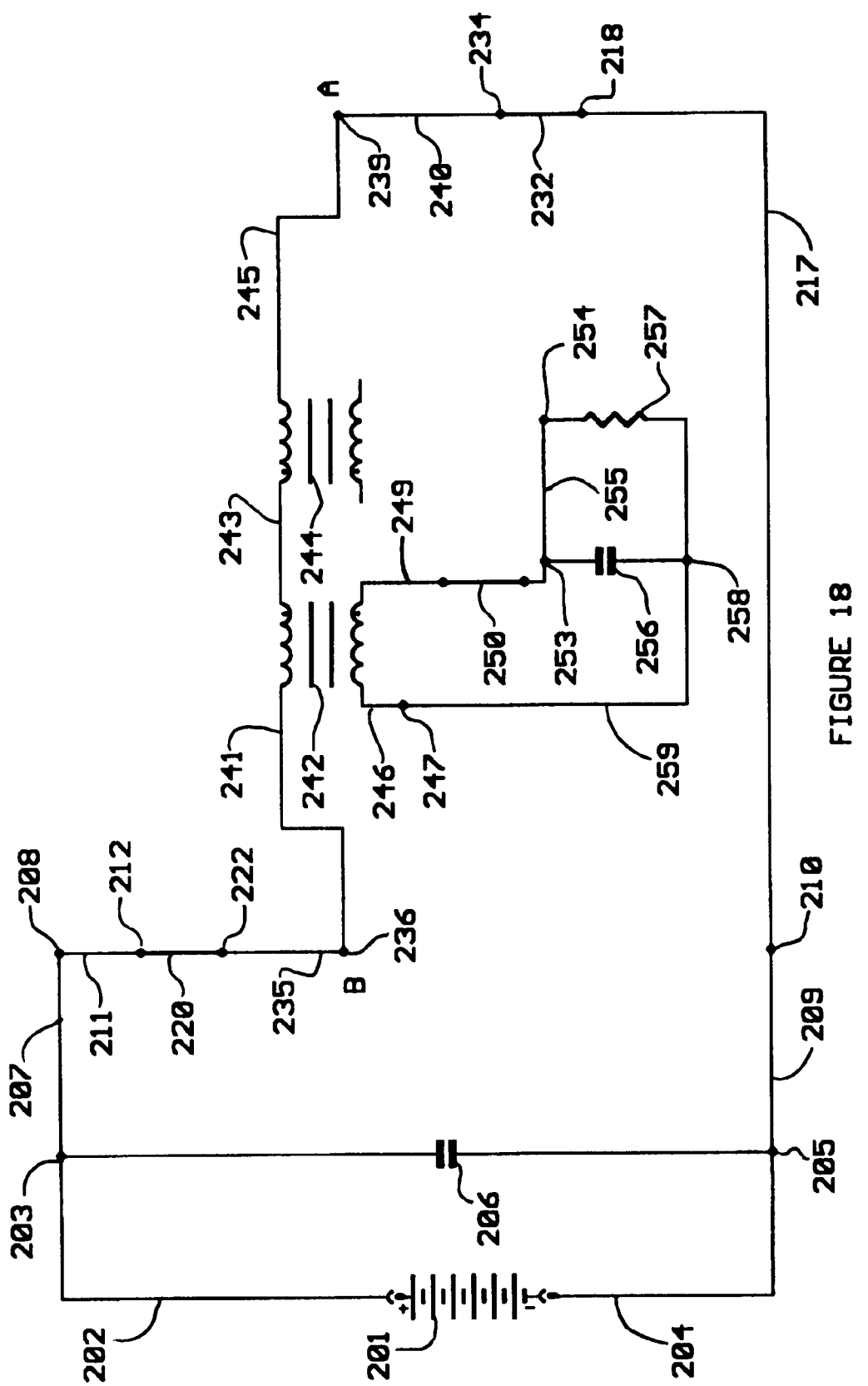
FIG. 18 illustrates a third phase of a second turn on transition of the FIG. 4 converter.
Figure 19:
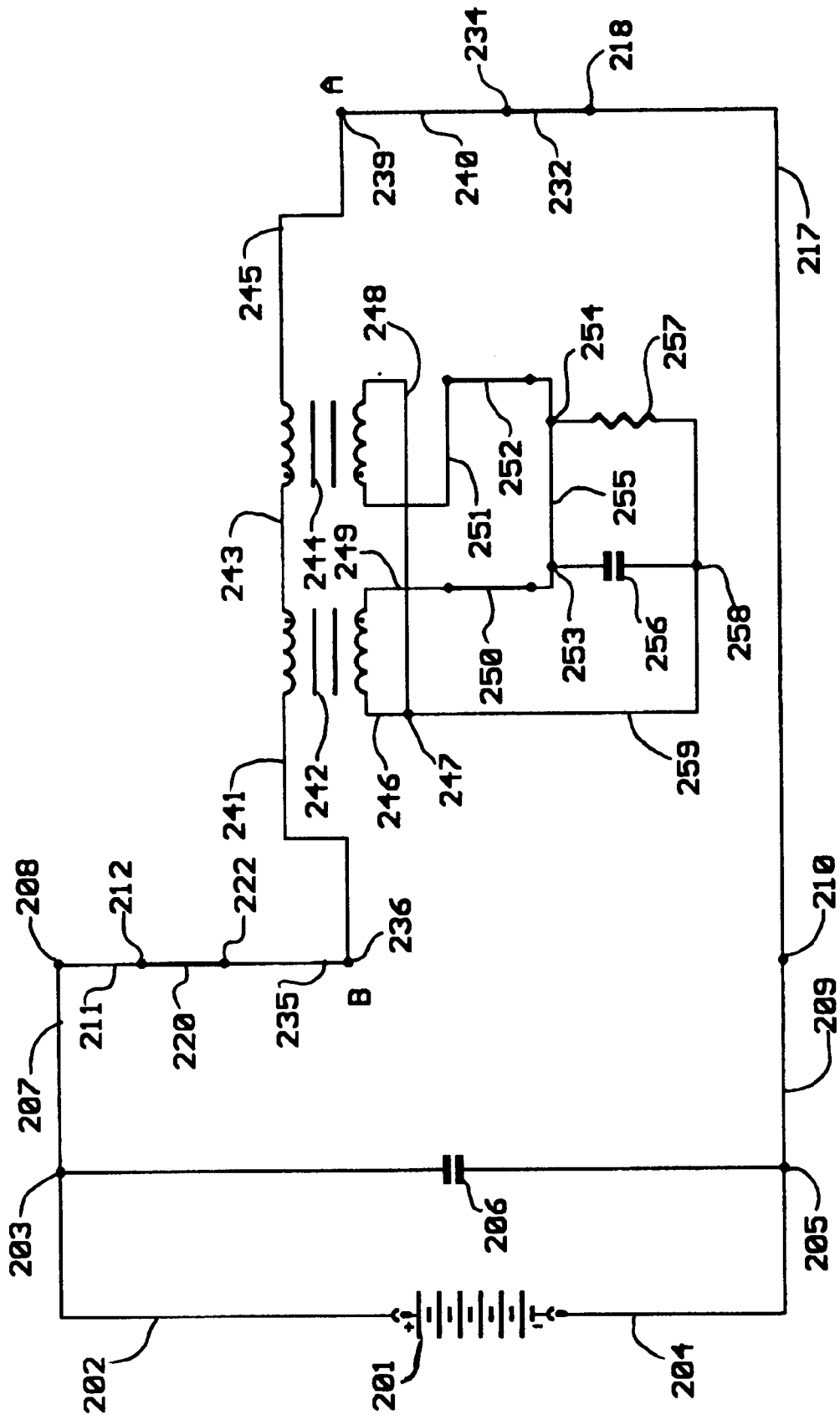
FIG. 19 illustrates a fourth phase of a second turn on transition of the FIG. 4 converter.
Figure 20:
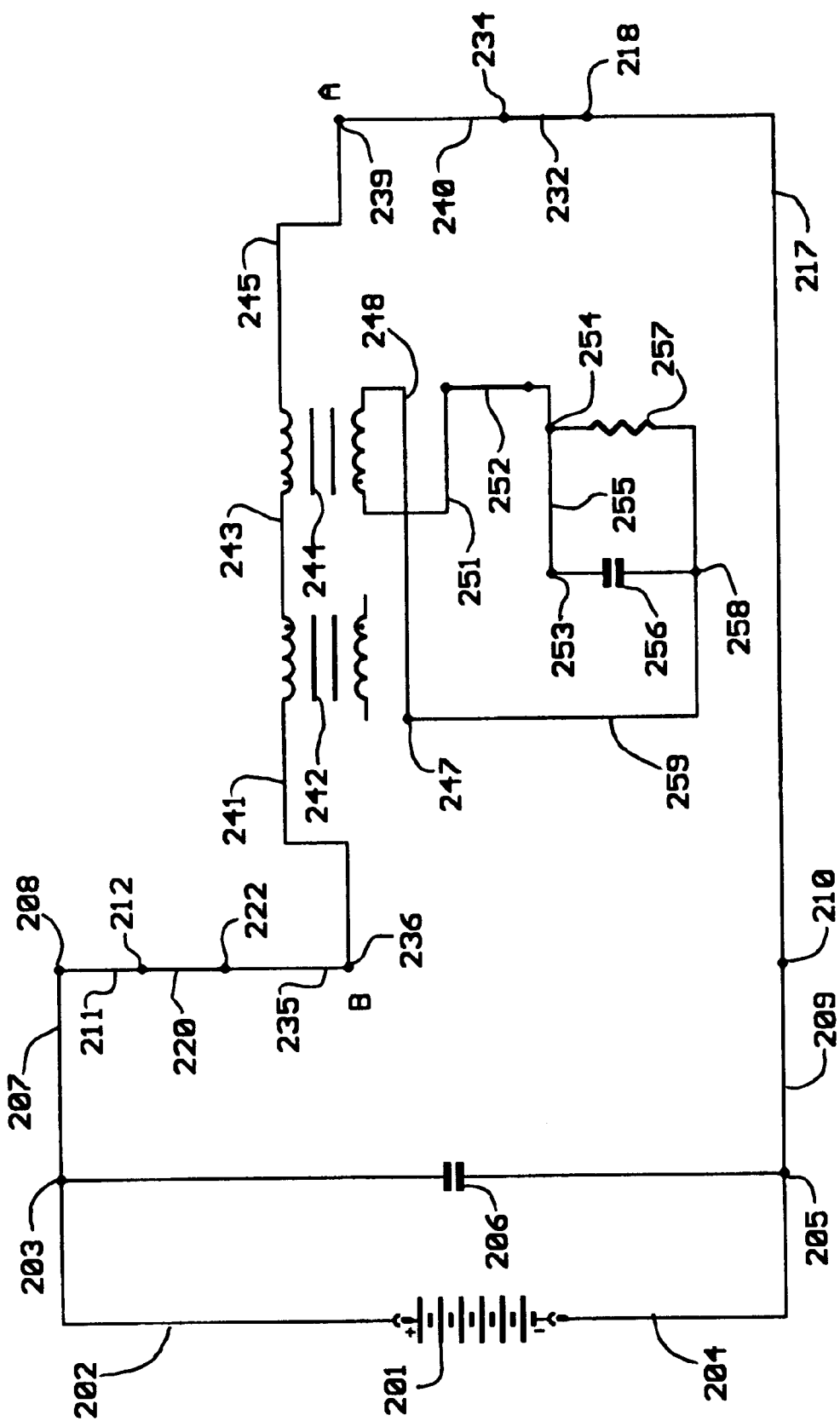
FIG. 20 illustrates a second on state of the FIG. 4 converter.
Figure 21:
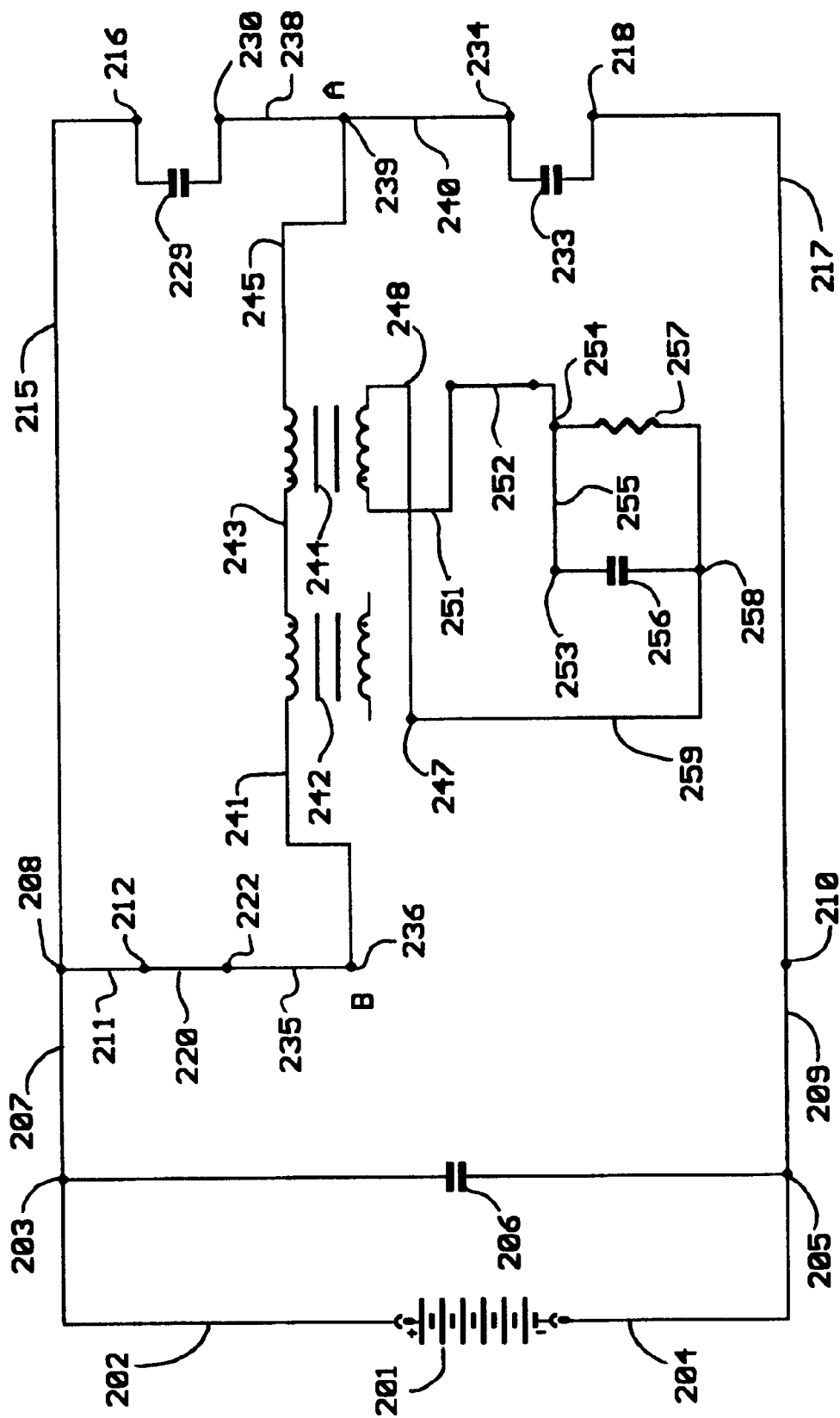
FIG. 21 illustrates a first phase of a second turn off transition of the FIG. 4 circuit.
Figure 22:
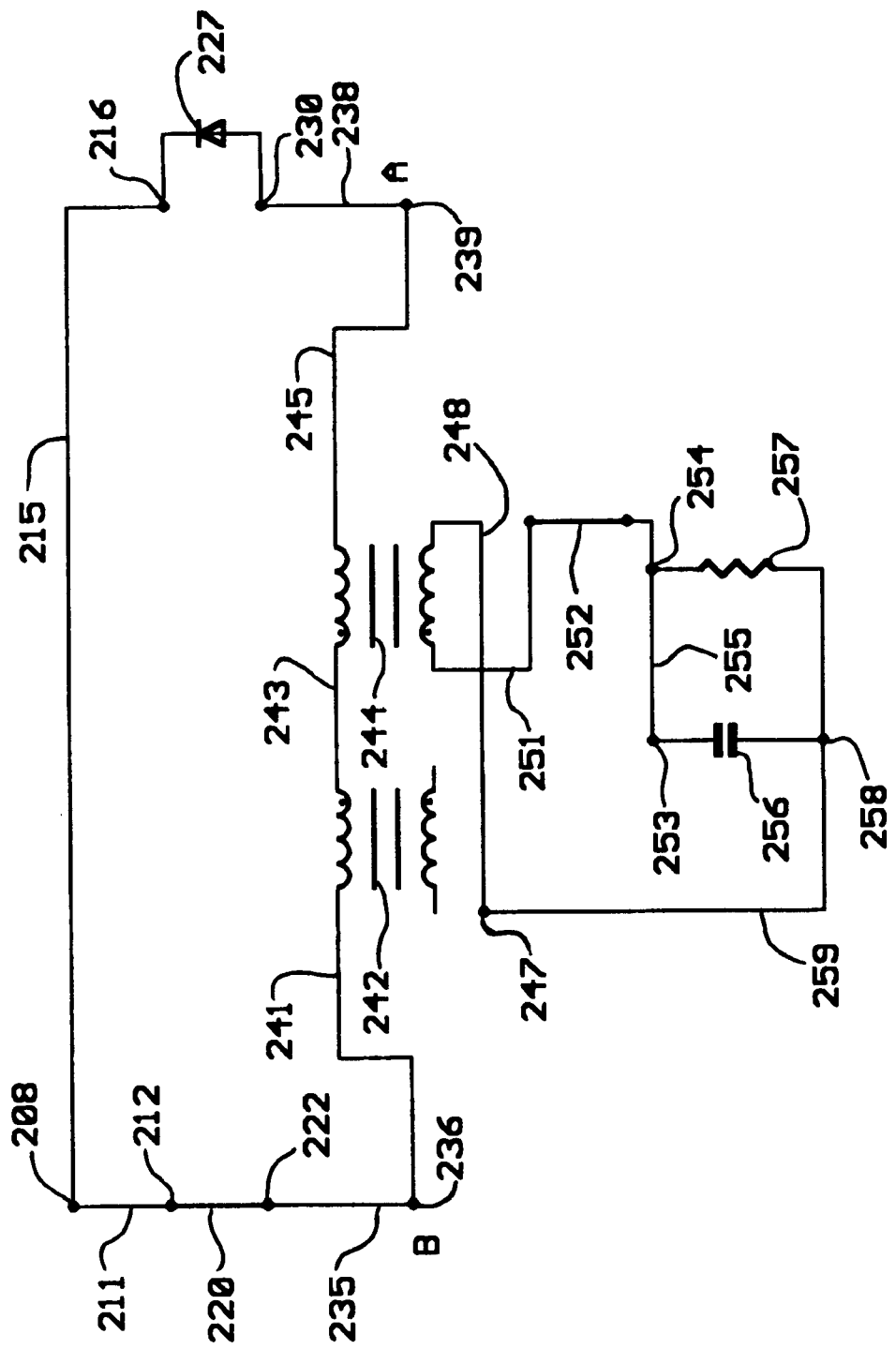
FIG. 22 illustrates a second phase of a second turn off transition of the FIG. 4 circuit.

In operation consider an initial condition, illustrated in FIG. 7, in which the voltage difference between points A and B, labeled V__AB in FIGS. 5a and 6a, is substantially zero and current is flowing through the primary windings from B towards A. The current flowing in the primary windings of inductors 242 and 244, labeled I__AB in FIG. 5d, is negative. During this initial condition, the switches 220 and 228 are closed (on) and switches 224 and 232 are open (off) and switch 252 is closed (on) and switch 250 is open (off). During this initial condition, inductors 242 and 244 each have a substantial amount of stored energy, but the magnetizing currents of inductors 242 and 244 referred to their primary windings are oppositely directed. Let us define that the magnetizing current is flowing in a positive direction when the current flows from the undotted terminal, through the winding, to the dotted terminal. For inductor 242 the secondary current is zero and the primary current is equal to its magnetizing current and the magnetizing current of inductor 242, referred to the primary winding, labeled I__MT1 in FIG. 5b, is positive, since the current is flowing through the inductor 242 primary winding from the undotted terminal to the dotted terminal. During the initial condition, the current I__AB is equal in magnitude and direction to the magnetizing current, referred to the primary winding, of inductor 242. During the initial condition, the magnetizing current, referred to the primary winding, of inductor 244, is in the positive direction and directed in opposition to the current I__AB. The total current in the primary winding of inductor 244 is equal to the current I__AB and is composed of two components. One component of the total primary winding current of inductor 244 is its magnetizing current and the other component is the induced current from the secondary winding of inductor 244. The induced current component of the primary winding current of inductor 244 is equal to the current flowing in the secondary winding of inductor 244 multiplied by the ratio of the secondary winding turns of inductor 244 to the primary winding turns of inductor 244. Alternately, the current flowing in the secondary winding of inductor 244 is equal to the vector sum of (1) the total current flowing in the primary winding of inductor 244 multiplied by its turns ratio and (2) the magnetizing current of inductor 244, referred to the secondary winding. In this case the vector sum is equal to the sum of the magnitudes of the total primary winding current and the magnetizing current of inductor 244 so that, if we assume a turns ratio of unity, the secondary winding current of inductor 244 will be larger in magnitude than the primary winding current of inductor 244. Another way to understand this situation is to consider that inductor 244 magnetizing current is flowing in its secondary winding and that the magnetizing current component of the secondary winding current is supplemented by a contribution of current, induced from the primary winding, equal to the total primary winding current multiplied by the ratio of primary winding turns to secondary winding turns. During the initial condition, the dotted terminal of each coupled inductor winding is positive with respect to the negative terminal of each winding. The voltage V__AB is zero during the initial condition. Therefore, the primary winding voltage of inductor 242 must be equal in magnitude to the primary winding voltage of inductor 244. The magnitude of the voltage on the secondary winding of inductor 244 is equal to the output voltage of the circuit, which is equal to the voltage difference between nodes 253 and 258. The magnitude of the voltage of the primary winding of inductor 244 is equal to the secondary winding voltage of inductor 244 multiplied by the ratio of the primary winding turns of inductor 244 to the secondary winding turns of inductor 244. The magnitude of the voltage of the primary winding of inductor 242 is equal to the magnitude of the primary winding voltage of inductor 244. The magnitude of the secondary winding voltage of inductor 242 is equal to the magnitude of the primary winding voltage of inductor 242 multiplied by the ratio of the primary winding turns of inductor 242 to the secondary winding turns of inductor 242. During the initial condition, the winding voltages of inductors 242 and 244 are directed so that their stored energies and their magnetizing currents are decreasing. The circuit currents are illustrated in FIGS. 5b through 5e. At a time determined by the control circuit, the primary switching network changes state, so that switch 220 is opened (turned off). This condition is illustrated in FIG. 8. The current in the primary windings, flowing from B to A, is maintained by the stored energy in inductor 242 and this current charges capacitor 221 and discharges capacitor 225. While the charging and discharging of capacitors 221 and 225, respectively, is taking place, the voltage at node 236 is falling and, eventually, diode 223 becomes forward biased and begins to conduct, as illustrated in FIG. 9. As diode 223 is conducting, the voltage at node 236 is clamped to a voltage substantially equal to the voltage at node 210. Shortly after diode 223 begins to conduct, switch 224 is closed (turned on) at substantially zero voltage, as illustrated in FIG. 10. Shortly after switch 224 is closed, switch 250 is closed (turned on), as illustrated in FIG. 11. When switch 250 is closed, current rapidly decreases in switch 252 and current rapidly increases in switch 250. During the time interval, illustrated in FIG. 11, when switch 250 is closed and switch 252 is closed, the winding voltages of inductors 242 and 244 change rapidly. Switch 252 is opened (turned off) when the current in switch 252 reaches zero, as illustrated in FIG. 12. Before the secondary switches change state the secondary winding voltage of inductor 244 is equal to the output voltage and after the change of state the secondary winding voltage of inductor 242 is equal to the output voltage. During the very brief time interval, illustrated by FIG. 11, when switches 250 and 252 are conducting, there are substantial voltages applied to the small, but finite, leakage and parasitic inductances in the circuit which cause both primary and secondary currents to change rapidly and which cause the primary currents to change sign. After the change of state of switches 250 and 252, the system enters a first on state, illustrated by FIG. 12, in which the stored energy in inductor 244 increases, provided by energy from source 201. During the first on state, current flows from right to left in FIG. 4 and from A to B in the primary windings of inductors 242 and 244. During the first on state, the voltage V_AB is positive and the current I_AB is positive, as illustrated in FIG. 5a and FIG. 5d, respectively. The current in the secondary winding of inductor 242 has two components. One component of the current in the secondary winding of inductor 242 is due to the decreasing magnetizing current in inductor 242 and the second component is due to the increasing reflected (induced) primary winding current. The magnetizing current in the secondary winding of inductor 242 is decreasing because the dotted terminals of the windings of inductor 242 are positive with respect to the undotted terminals of the windings of inductor 242. The reflected (induced) primary current is increasing because the primary current of inductor 242 is equal to the primary magnetizing current of inductor 244, which is increasing. The magnetizing current of inductor 244 is increasing because the undotted terminals of the windings of inductor 244 are positive with respect to the dotted terminals of the windings of inductor 244. The result of both increasing and decreasing components of secondary winding current of inductor 244 is a secondary winding current of inductor 244 that increases. During the first on state, the secondary winding voltage of inductor 242 is equal to the output voltage. The voltage of the primary winding of inductor 242 is equal to the output voltage multiplied by the ratio of the primary turns to the secondary turns of inductor 242. The voltage applied to the primary winding of inductor 244 is equal to the source 201 voltage, V_IN, minus the voltage of the primary winding of inductor 242. During the first on state both the stored energy and the magnetizing current in inductor 244 increase. The first on state comes to an end at a time determined by the control circuit when switch 228 is opened (turned off), as illustrated in FIG. 13. The stored energy in inductor 244 maintains the current in the primary winding of inductors 242 and 244 as capacitor 229 is charged and capacitor 233 is discharged. As capacitor 233 discharges, the voltage at node 239 drops toward the voltage of node 210. When the voltage at node 239 reaches the voltage at node 210, diode 231 begins to conduct, as illustrated in FIG. 14, and clamps the voltage at node 239, preventing the voltage at node 239 from dropping further. After diode 231 begins to conduct, switch 232 is closed (turned on), as illustrated in FIG. 15. The system, as illustrated in FIG. 15, is now in a first off state, in which the primary winding current is flowing from right to left or from A to B. During the first off state the magnetizing currents and stored energies in inductors 242 and 244 decrease. During the first off state the secondary winding current of inductor 242 decreases. During the first off state the magnitudes of the primary winding voltages of inductors 242 and 244 are equal in magnitude, so that the voltage across the series combination of the two primary windings is zero. The voltage across the secondary winding of inductor 242 is equal to the output voltage. The voltage across the primary winding of inductor 242 is equal to the secondary winding voltage of inductor 242 multiplied by the ratio of the primary turns to the secondary turns of inductor 242. At a time determined by the control circuit, switch 224 is turned off, as illustrated in FIG. 16. The stored energy in inductor 244 maintains the primary winding currents of inductors 242 and 244 as capacitor 225 is charged and capacitor 221 is discharged. The voltage at node 236 rises as capacitors 225 and 221 charge and discharge, respectively, until the voltage at node 236 reaches the voltage at node 208, at which time diode 219 begins to conduct, as illustrated in FIG. 17, and clamps the voltage at node 236, preventing the voltage at node 236 from continuing to rise above the voltage at node 208. Soon after diode 219 begins to conduct, switch 220 is closed (turned on), as illustrated in FIG. 18. After switch 220 is closed, switch 252 is closed (turned on), as illustrated in FIG. 19 and, as a result, the current in switch 252 increases rapidly, as the current in switch 250 decreases rapidly, and switch 250 is opened (turned off) at the instant that the current in switch 250 reaches zero, as illustrated in FIG. 20. During the very brief time interval when switches 250 and 252 are closed, the primary current changes sign. The opening of switch 250 marks the beginning of a second on state. During the second on state, illustrated in FIG. 20, the secondary winding voltage of inductor 244 is equal to the output voltage. The primary winding voltage of inductor 244 is equal to the output voltage multiplied by the ratio of the primary turns to the secondary turns of inductor 244. The primary winding voltage of inductor 242 is equal to the input DC voltage, V_IN, minus the primary winding voltage of inductor 244. During the second on state, the magnetizing current and stored energy of inductor 242 increase. The secondary winding current of inductor 244 has two components. One component of the secondary winding current of inductor 244 is equal to the decreasing magnetizing current, referred to the secondary winding, of inductor 244. The second component of the secondary winding current of inductor 244 is equal to the increasing reflected (induced) primary current in inductor 244. The primary current of inductor 244 is equal to the increasing magnetizing current of inductor 242. The net current in the secondary winding of inductor 244 will be increasing, during the second on state. During the second on state, the voltage V_AB is negative and the current I_AB is also negative since the voltage at B is positive with respect to the voltage at A and the current in the primary windings of inductors 242 and 244 is flowing from B towards A. During the second on state, stored energy in inductor 242 increases as the magnetizing current in inductor 242 increases. At a time determined by the control circuit, switch 232 is opened (turned off), as illustrated in FIG. 21. The stored energy in inductor 242 maintains the current in the primary windings of inductors 242 and 244 and this current charges capacitor 233 and discharges capacitor 229. As capacitors 233 and 229 charge and discharge, respectively, the voltage at node 239 rises, until diode 227 becomes forward biased, as illustrated in FIG. 22, and clamps the voltage at node 239 to the voltage at node 208. Soon after diode 227 begins to conduct, switch 228 is closed (turned on), as illustrated in FIG. 7. The system is now in a second off state and the conditions are the same as the initial conditions, as illustrated in FIG. 7, and the process described above repeats continuously. The drive signal to switch 224 is inverted, with respect to the drive signal of switch 220, and the drive signal to switch 232 is inverted, with respect to the drive signal to switch 228, except that there are short time intervals, during which the resonant transitions take place, in which the switches are off simultaneously. Break-before-make switching, with a short, but finite, switching interval, which may be of the order of approximately 20 to 2000 nanoseconds, is adopted in the implementation of zero voltage switching. Each of the switching transitions of switches 220, 224, 228, and 232 are zero voltage so that to a first order approximation the switching losses of the four primary switches are eliminated.

In the steady state, the volt second product must add up to zero for any winding for a complete cycle, which is a way of expressing the fact that the time average winding voltage is zero in the steady state. This fact can be used to calculate the transfer function for the converter. Let us assume that inductors 242 and 244 are identical and that D represents the fraction of a cycle that the system is in one or the other of the two on states, so that the system spends a fraction of a cycle equal to D/2 in one on state and a fraction of a cycle equal to D/2 in the other on state. Since the time average voltage across a coupled inductor winding must be zero in the steady state, for either one of the primary windings the volt second product sum for one cycle can be expressed as:

$$\left(V_{IN} - \frac{N_{PRI} \cdot V_{OUT}}{N_{SEC}}\right) \cdot \frac{D}{2} \cdot T - V_{OUT} \cdot \frac{N_{PRI}}{N_{SEC}} \cdot \left(1 - \frac{D}{2}\right) \cdot T = 0 \quad (1)$$

where $V_{IN}$ is the voltage of source 201, $N_{PRI}$ is the number of primary turns of one of inductors 242 or 244, $N_{SEC}$ is the number of secondary turns of one of inductors 242 or 244, $V_{OUT}$ is the output voltage of the power supply, which is also the voltage difference between nodes 253 and 258, and T is the cycle period. From (1) the output voltage can be determined in terms of the input source voltage, $V_{IN}$, the turns ratio of inductor 242 or 244, $N_{PRI}/N_{SEC}$, and the duty cycle, D, so that:

$$V_{OUT} = \frac{1}{2} \cdot \frac{N_{SEC}}{N_{PRI}} \cdot D \cdot V_{IN} \quad (2)$$

and it should be noted that this formula differs from the transfer function for a conventional forward converter by the factor, ½.

If we assume, for purposes of analysis, that the switches are ideal and that there are no losses in the circuit, then we can say that the output power is equal to the input power. We will also assume that the magnetizing inductances and the input and output filter capacitances are large so that the input and output currents and voltages will be invariant. Input power will be delivered only during the two on states since there is no path for input power delivery during the off states. For equal input and output powers we have:

$$I_{IN} \cdot D \cdot V_{IN} = I_{OUT} \cdot V_{OUT} \quad (3)$$

where $I_{IN}$ is the current flowing from source 201 into the converter circuit and $I_{OUT}$ is the load current. If we substitute equation (2) into equation (3) for $V_{OUT}$, we get the following expression, solving for $I_{OUT}$:

$$I_{OUT} = 2 \cdot \frac{N_{PRI}}{N_{SEC}} \cdot I_{IN} \quad (4)$$

which differs from the transfer function for the conventional forward converter by the factor, 2.

Consider the coupled inductor winding currents. The minimum magnetizing current for inductor 244, $I_{MT20}$, occurs at the first switching transition, which occurs at the beginning of the first on state. During the first on state, inductor 244 magnetizing current increases from its minimum value to its maximum value. We know from (4) that the average current, during the first on state, is equal to $I_{IN}$, which will be equal to the average inductor 244 magnetizing current. During the first on state, the time rate of change of $I_{MT2}$, the magnetizing current in inductor 244, will be:

$$\frac{d\,I_{MT2}}{dt} = \frac{\left(V_{IN} - \frac{N_{PRI}}{N_{SEC}} \cdot V_{OUT}\right)}{L_{PRI}} \quad (5)$$

The duration of the first on state is $$\frac{1}{2} \cdot D \cdot T.$$

From the current slope given by (5) and the average value of inductor 244 magnetizing current, which is $I_{IN}$, calculated from (4), we determine that the value of $I_{MT20}$ is:

$$I_{MT20} = \frac{1}{2} \cdot I_{OUT} \cdot \frac{N_{SEC}}{N_{PRI}} - \frac{\left(V_{IN} - V_{OUT} \cdot \frac{N_{PRI}}{N_{SEC}}\right)}{L_{PRI}} \cdot \frac{D \cdot T}{4} \quad (6)$$

and the value of the magnetizing current in inductor 244, during the first on state, is:

$$I_{MT2} = I_{MT20} + \frac{\left(V_{IN} - \frac{N_{PRI}}{N_{SEC}} \cdot V_{OUT}\right)}{L_{PRI}} \cdot (t - t_0), \quad (7)$$

where $t_0$ marks the time at the beginning of the first on state.

We can also determine the value of $I_{MT21}$, which is the peak magnetizing current for inductor 244, which occurs at the end of the first on state:

$$I_{MT21} = \frac{1}{2} \cdot I_{OUT} \cdot \frac{N_{SEC}}{N_{PRI}} + \frac{\left(V_{IN} - V_{OUT} \cdot \frac{N_{PRI}}{N_{SEC}}\right)}{L_{PRI}} \cdot \frac{D \cdot T}{4}. \quad (8)$$

Since we assumed that the two coupled inductors are physically identical and that the on times for the two on states are equal, the minimum and maximum magnetizing currents for inductor 242 will be the same as the minimum and maximum magnetizing currents for inductor 244. Let $I_{MT12}$ be the minimum magnetizing current of inductor 242, which occurs at the beginning of the second on state. Let $I_{MT13}$ be the maximum magnetizing current for inductor 242, which occurs at the end of the second on state. During the first off state, which follows the first on state, the time rate of change of the magnetizing currents for inductors 242 and 244 is given by:

$$\frac{d I_{MT}}{dt} = -\frac{V_{OUT}}{L_{PRI}} \cdot \frac{N_{PRI}}{N_{SEC}}. \quad (9)$$

The duration of the first off state is $$\frac{1}{2} \cdot (1-D) \cdot T.$$

From the current rate of change in (9) and the duration of the off state we can determine $I_{MT22}$ and $I_{MT10}$ to be:

$$I_{MT10} = I_{MT22} = I_{MT21} - \frac{1}{2} \cdot \frac{V_{OUT}}{L_{PRI}} \cdot \frac{N_{PRI}}{N_{SEC}} \cdot (1-D) \cdot T, \quad (10)$$

where $I_{MT22}$ is the magnetizing current in inductor 244 at the end of the first off state and $I_{MT10}$ is the magnetizing current in inductor 242 at the beginning of the first on state.

We can determine the magnetizing current in inductor 244 during the first off state to be:

$$I_{MT2} = I_{MT21} - \frac{V_{OUT}}{L_{PRI}} \cdot \frac{N_{PRI}}{N_{SEC}} \cdot (t - t_1), \quad (11)$$

where $t_1$ marks the time at the end of the first on state.

During the first on state and the first off state, the primary current, I_AB, is equal to inductor 244 magnetizing current. During the second on state and the second off state, the primary current, I_AB, is equal to the negative of inductor 242 magnetizing current. I_AB is plotted in FIG. 5d.

During the first on state, the secondary winding of inductor 242 provides the current for the load. There are two components of inductor 242 secondary winding current. A first component of inductor 242 secondary winding current, during the first on state, is inductor 242 magnetizing current, referred to the secondary winding. The magnetizing current at $t_0$ of inductor 242, referred to the secondary winding, is $$I_{MT10} \cdot \frac{N_{PRI}}{N_{SEC}}.$$

The second component of inductor 242 secondary winding current is the induced current from the primary winding of inductor 242. The primary winding current of inductor 242 at $t_0$ is $I_{MT20}$ and the resulting induced current in the secondary winding is $$I_{MT20} \cdot \frac{N_{PRI}}{N_{SEC}}.$$

The total current in the secondary winding of inductor 242, at the beginning of the first on state, is:

$$I_{SS0} = \frac{N_{PRI}}{N_{SEC}} \cdot (I_{MT10} + I_{MT20}), \quad (12)$$

where $I_{SS0}$ is the current in switch 250 at $t_0$, which is equal to the current in the secondary winding of inductor 242 at $t_0$, where $t_0$ is the beginning of the first on state. By the same argument we can show that:

$$I_{SS1} = \frac{N_{PRI}}{N_{SEC}} \cdot (I_{MT11} + I_{MT21}) \text{ and} \quad (13)$$

$$I_{SS2} = \frac{N_{PRI}}{N_{SEC}} \cdot (I_{MT12} + I_{MT22}), \quad (14)$$

where $I_{SS1}$, $I_{MT11}$, and $I_{MT21}$ are switch 250 current, inductor 242 magnetizing current, and inductor 244 magnetizing current, respectively, all at $t_1$, which marks the end of the first on state and the beginning of the first off state, and $I_{SS2}$, $I_{MT12}$, and $I_{MT22}$ are switch 250 current, inductor 242 magnetizing current, and inductor 244 magnetizing current, respectively, all at $t_2$, which marks the end of the first off state.

During the first on state and the first off state, the time rate of change of inductor 242 magnetizing current is given by (9) and the duration of the first on state is $$\frac{1}{2} \cdot D \cdot T,$$

so that $$I_{MT11} = I_{MT10} - \frac{1}{2} \cdot \frac{N_{PRI}}{N_{SEC}} \cdot \frac{V_{OUT}}{L_{PRI}} \cdot D \cdot T, \quad (15)$$

and since we know that the duration of the first off state is $$\frac{1}{2} \cdot (1-D) \cdot T$$

we determine that $$I_{MT12} = I_{MT11} - \frac{1}{2} \cdot \frac{N_{PRI}}{N_{SEC}} \cdot \frac{V_{OUT}}{L_{PRI}} \cdot (1-D) \cdot T. \quad (16)$$

The average current in switch 250 during the first on state is given by:

$$I_{SSAV} = \frac{1}{2} \cdot (I_{SS0} + I_{SS1}). \quad (17)$$

By combining equations (2), (6), (8), (10), (12), (13), (15), and (17) we determine that:

$$I_{SSAV} = I_{OUT} \quad (18)$$

for the first on state. A similar analysis yields the same result for the first off state. It is also clear that due to the system symmetry the average switch 252 current is also equal to $I_{OUT}$ during the second on state and the second off state. The secondary switch currents are plotted in FIG. 5e.

Figure 2:
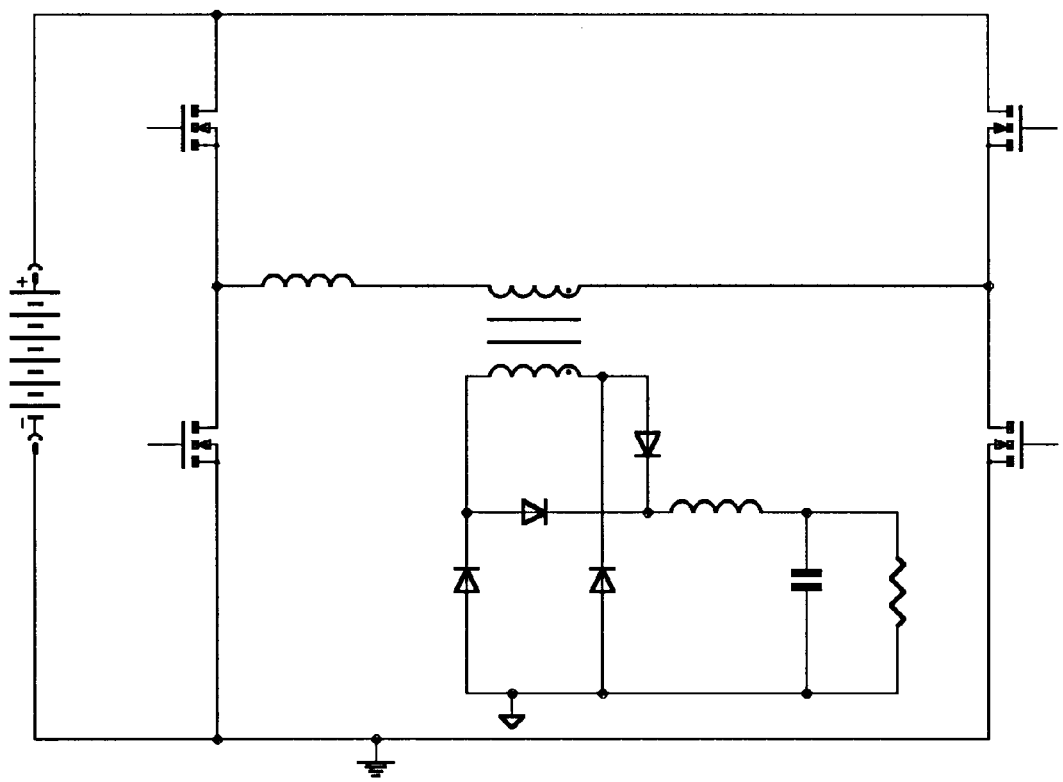
FIG. 2 illustrates a circuit schematic drawing of a phase shift modulated, full bridge, zero voltage switching, forward converter.
Figure 3:
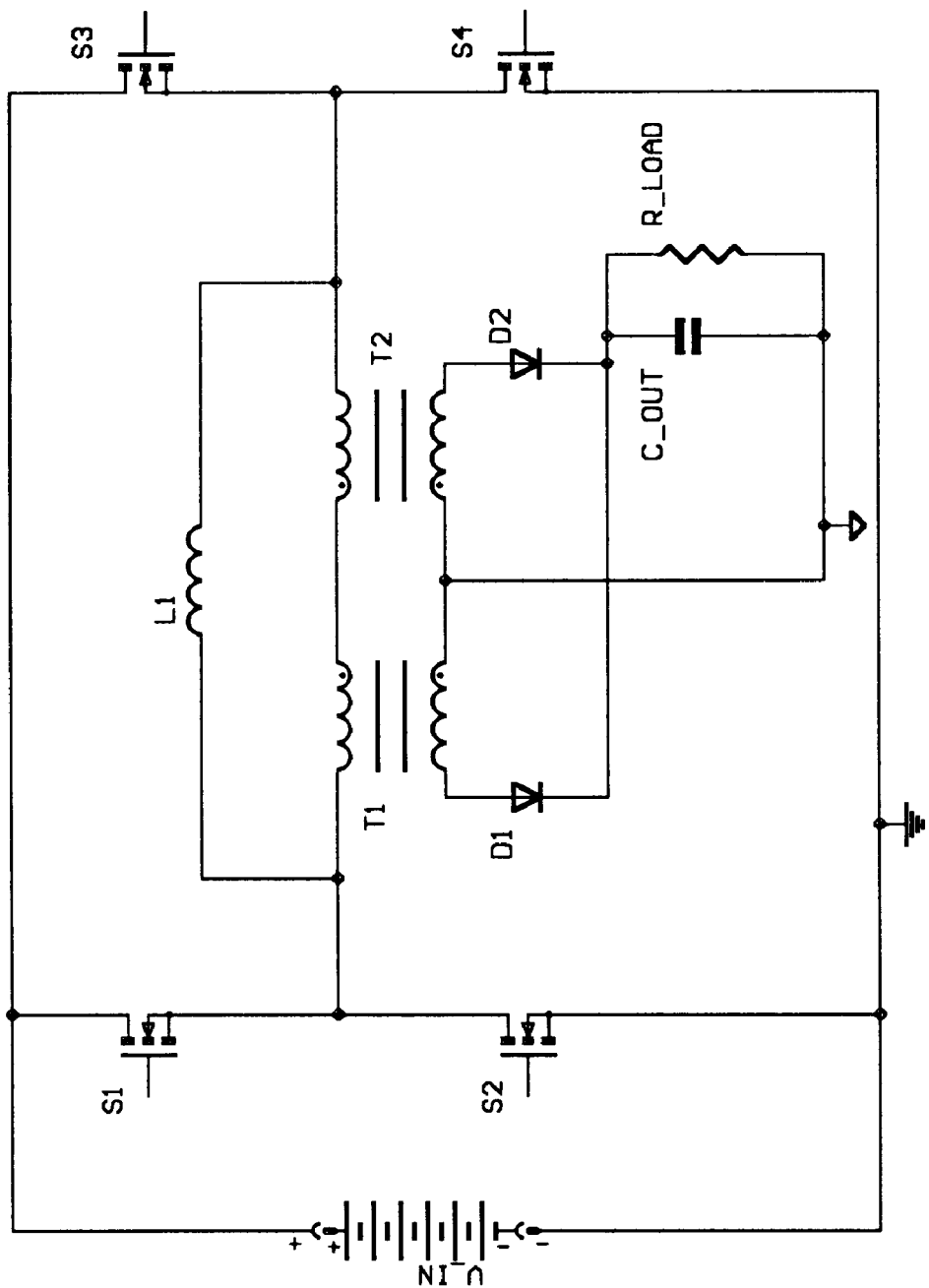
FIG. 3 illustrates a circuit schematic drawing of a phase shift modulated, full bridge, zero voltage switching, dual opposed interleaved coupled inductor buck converter.

FIG. 6 illustrates the switch timing for the secondary switches relative to the primary switch timing. The important principle here is that the secondary switch transition timing is delayed with respect to the primary switch timing. This brief delay enables all of the primary switching transitions to be driven by the stored energy in inductors 242 and 244. Without this delay in the secondary switches the stored energy in inductors 242 and 244 would not be available for driving the primary switching transitions during the turn on transitions at the beginning of the two on states. For example, consider the switching transition that precedes the first on state. During the initial conditions, the switches 220 and 228 are on. The voltage at node 239 is equal to the voltage at node 208 and switch 252 is on. The voltage at lead 243 and at the dotted terminals of the primary windings of inductors 242 and 244 is at a voltage more positive than the voltage at node 208 because switch 252 is on and the dotted terminals of inductor 244 must be positive with respect to the undotted terminals. The current in the primary windings of inductors 242 and 244 is directed to the right in FIG. 4, driven by the stored energy in inductor 242. When switch 220 is opened (turned off), the stored energy in inductor 242 forces node 236 voltage to fall. If switch 250 were closed and not open during the turn on switching transition then node 236 voltage would not be able to fall, because the stored energy in inductor 242 would force its magnetizing current into switch 250 and to the load and the magnetizing current in the primary winding of inductor 242 would not be available to drive the transition and to charge capacitor 221 and discharge capacitor 225. Only if switch 250 is open during the entire transition can the energy stored in inductor 242 be used for driving the switching transition and obtaining a zero voltage transition for switch 224 and the elimination of first order primary circuit switching losses. The prior art converter, shown in FIG. 3, relies on a parallel inductor L1 to provide energy to drive the switching transition, but the energy stored in L1 must also provide energy to the load during the transition, because the secondary diodes will both be forward biased during the transition and the current diverted to the load from L1 will act to prevent a zero voltage transition. In order to accomplish a zero voltage switching transition, using the parallel inductor, as taught by the prior art, shown in FIG. 3, the current in the parallel inductor must be large enough to both drive the transition quickly and provide current to the load, through the primary windings of the coupled inductors. The additional current in the parallel inductor also flows in the switches, which creates substantial conduction losses in the switches. The prior art converter, represented by FIG. 2, places a choke in series with the primary winding of the transformer to provide a source of energy to drive a zero voltage switching transition. The action of the primary switching network is the same as described for the subject invention. During the off state of the circuit of FIG. 2, the series choke maintains the current in the primary winding of the transformer at the peak current level, whereas, in the subject invention, the current drops as the magnetizing current in the coupled inductors drop resulting in substantially lower conduction losses in the subject invention, by comparison to the FIG. 2 circuit. The transformer of the FIG. 2 circuit is an ideal transformer and cannot store a substantial amount of energy and, consequently, care must be taken to prevent staircase saturation, which can be done by adding a series capacitor or by choosing a control mode that limits the primary current, thereby preventing staircase core saturation. Staircase core saturation is not a problem in the subject invention, since the cores are, by design and intent, substantial energy storage devices. The series choke in the FIG. 2 circuit also provides an insertion loss which will result in a longer duty cycle, higher peak primary currents, and higher conduction losses by comparison to the subject invention.

Related Embodiments

Figure 23:
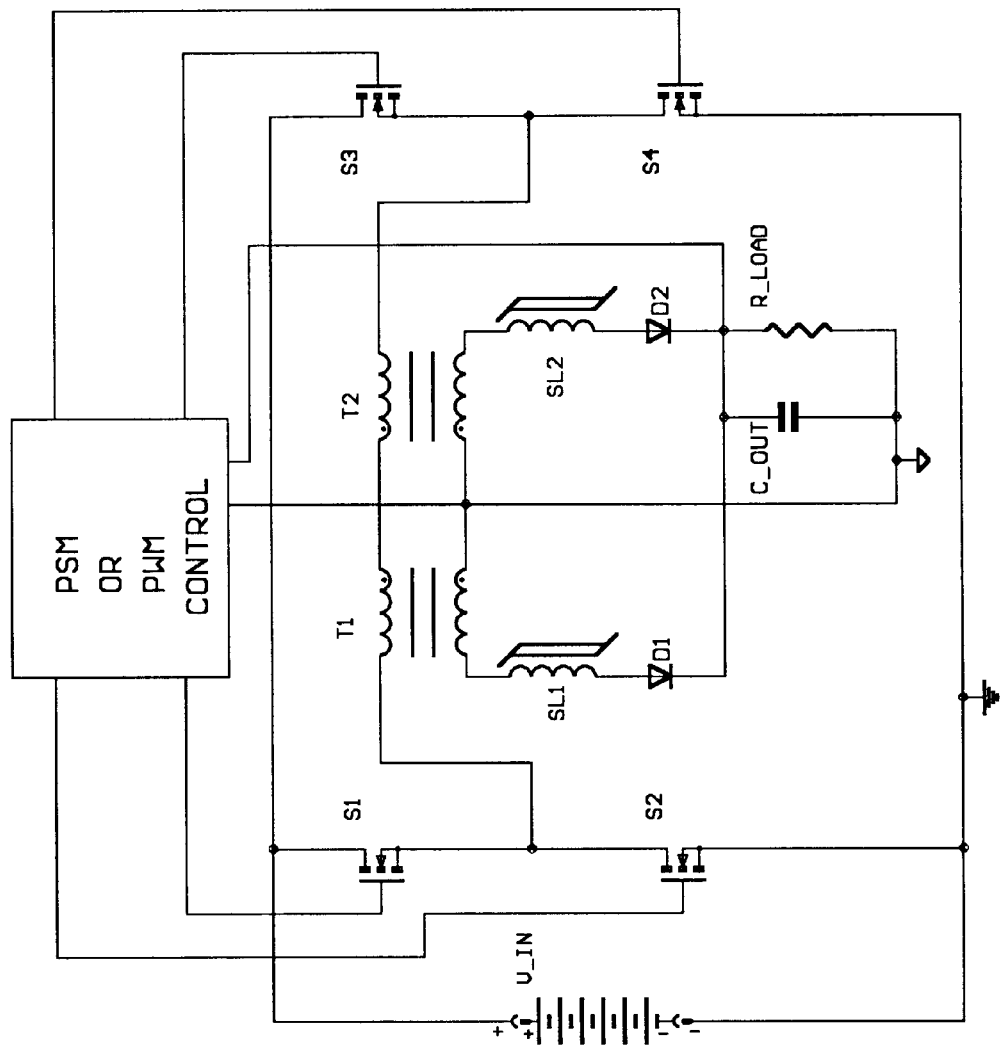
FIG. 23 illustrates the power converter of FIG. 4 with secondary saturable inductors and diodes used as secondary switches and power mosfets used as primary switches, whereby the saturable inductors provides the necessary time delay in the turn on of the secondary diodes.

FIG. 23 illustrates a more specific embodiment of the subject invention, in which the secondary switches are implemented using a series combination of a diode and a saturable core inductor and the primary switches are implemented using power mosfets. The power mosfets contain the switch, as a semiconductor field effect transistor switch, the diode as the intrinsic body drain diode of the power mosfet, and the capacitor as the mosfet output capacitance. The saturable core inductor provides the necessary short delay at the beginning of each on state by a suitable reset circuit (not shown) that programs the core of the saturable core inductor to provide the brief delay. At the beginning of each on state, the saturable core inductor appears as a high impedance, preventing current flow in the secondary diode and, after a brief time interval, the core of the saturable core inductor saturates and the impedance of the saturable core inductor rapidly falls to a near zero value, enabling current to flow in the secondary diode, and enabling the beginning of the on state. The diode in series with the saturable core inductor provides a natural turn off at the time that the current drops to zero, as needed. To effectively delay the turn on of the secondary diodes a large inductance must be used since there will be a large voltage applied to any series inductance used to provide the delay during the delay time. Another alternative is to provide a large leakage inductance in the coupled inductors to provide the delay. The alternative of leakage inductance as a delay mechanisms is not preferred because the leakage inductance adds an insertion loss and the stored energy in the leakage inductance creates ringing with the circuit parasitic capacitances such as diode capacitance and inductor winding capacitance. The ringing creates EMI and/or the need for a snubber to damp the ringing. Also the amount of delay that can be provide by leakage inductance alone is likely to be insufficient.

The control block suggests that either phase shift modulation or pulse width modulation may be used. There is nothing that would prevent either control method from being employed in this invention. The phase shift modulation approach has been described here as an example of one control approach but pulse width modulation of the primary switches, using the described circuit structure and operating mechanism, must be considered as included within the claims of this invention. The invention does nothing to preclude the use of pulse width modulation, as an alternative method of control. It is well known to anyone skilled in the art of power conversion that any full bridge switching structure can be modulated by either phase shift modulation or pulse width modulation to obtain the desired control. With pulse width modulation both off states would use the same pair of switches and there would be three distinct switch states rather than four, as described with the phase shift modulation approach.

Figure 24:
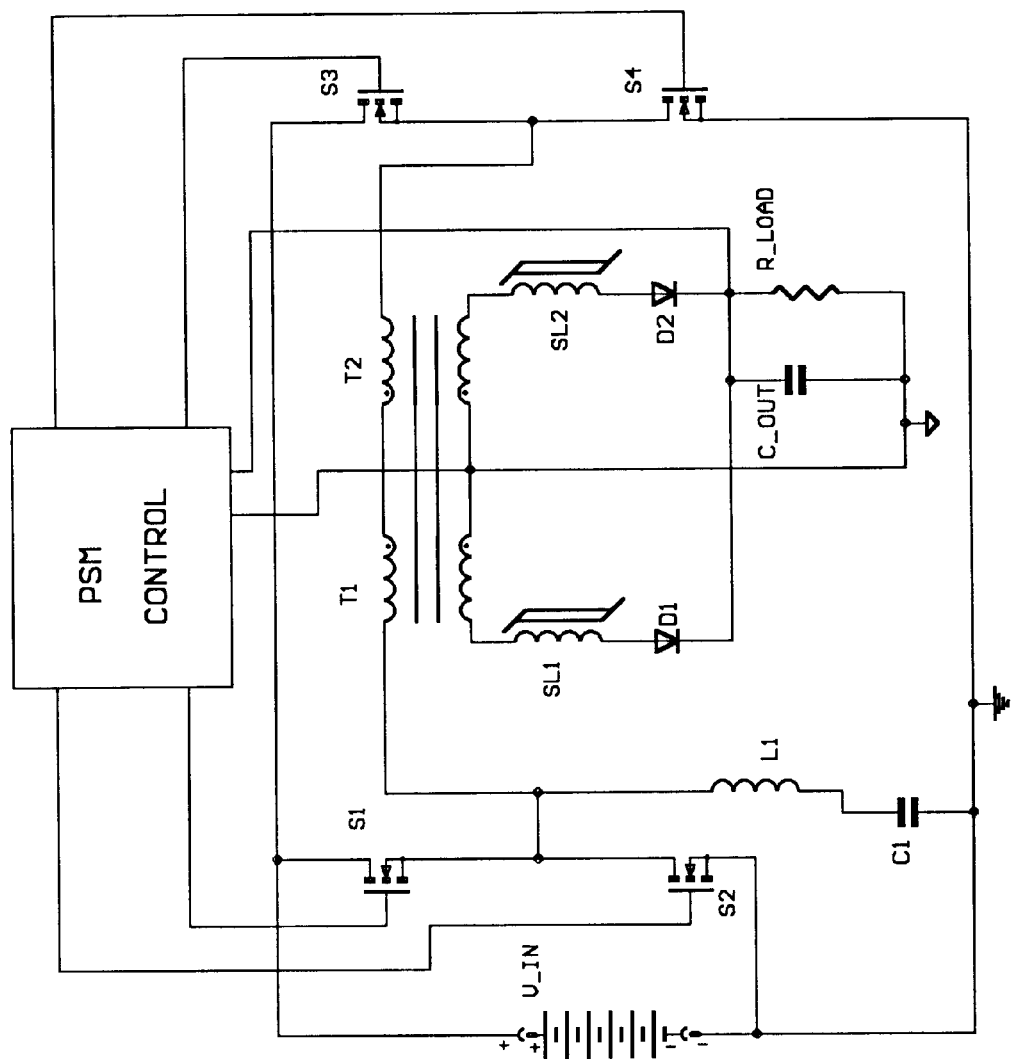
FIG. 24 illustrates the power converter of FIG. 23 with the two coupled inductors integrated onto a single magnetic core and a series LC circuit added to provide additional current and stored energy for driving the turn on transitions.
Figure 25:
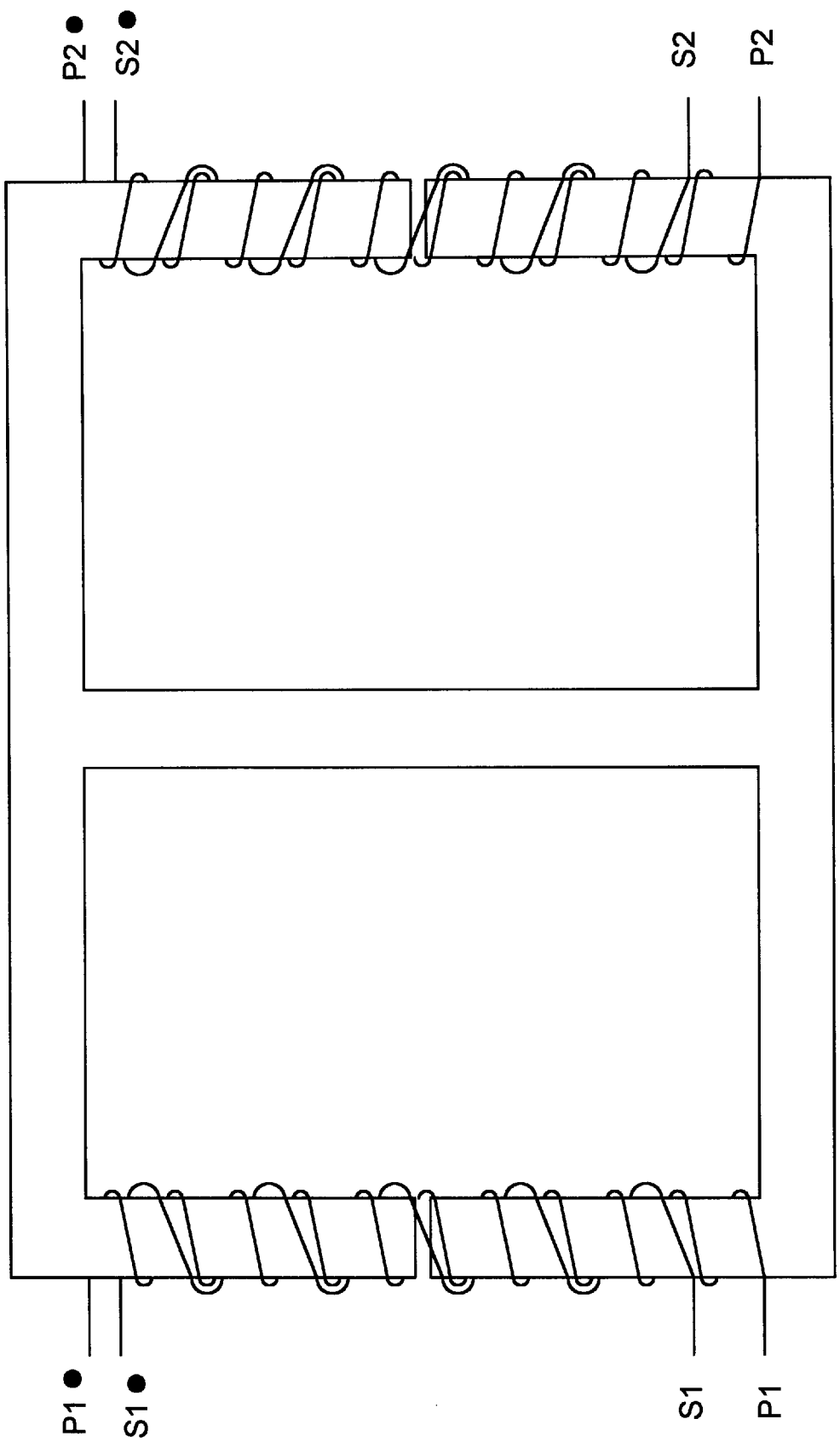
FIG. 25 illustrates a possible construction of the integrated magnetic of the FIG. 25 circuit.

FIG. 24 shows another specific embodiment of the invention, which is similar to the FIG. 23 circuit, but with the addition of a series LC combination, which may be added to provide additional current to speed up the critical turn on transition and to extend the load range over which soft switching can be attained for phase shift modulated power converters. Another difference of the FIG. 24 circuit is that the two coupled inductors are integrated on a single core. An example of a coupled inductor construction that enables this integration is shown in FIG. 25. In FIG. 25 the coupled inductors are wound on the gapped outer legs of the core and the ungapped center post provides a common path for return flux from both outer legs.

Figure 26:
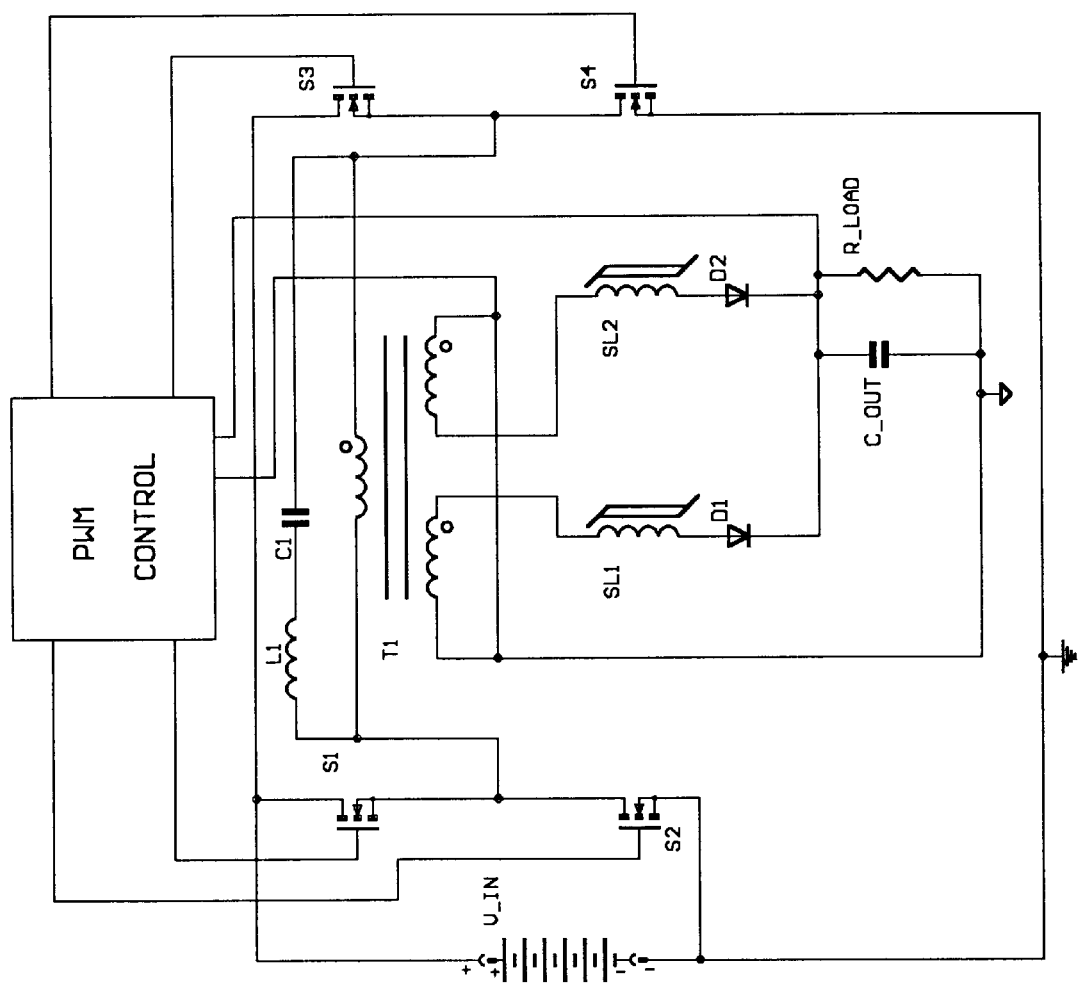
FIG. 26 illustrates the FIG. 23 circuit with pulse width modulation and with an integrated magnetic with a single primary winding and a series LC oriented to provide current and stored energy for driving all transitions.
Figure 27:
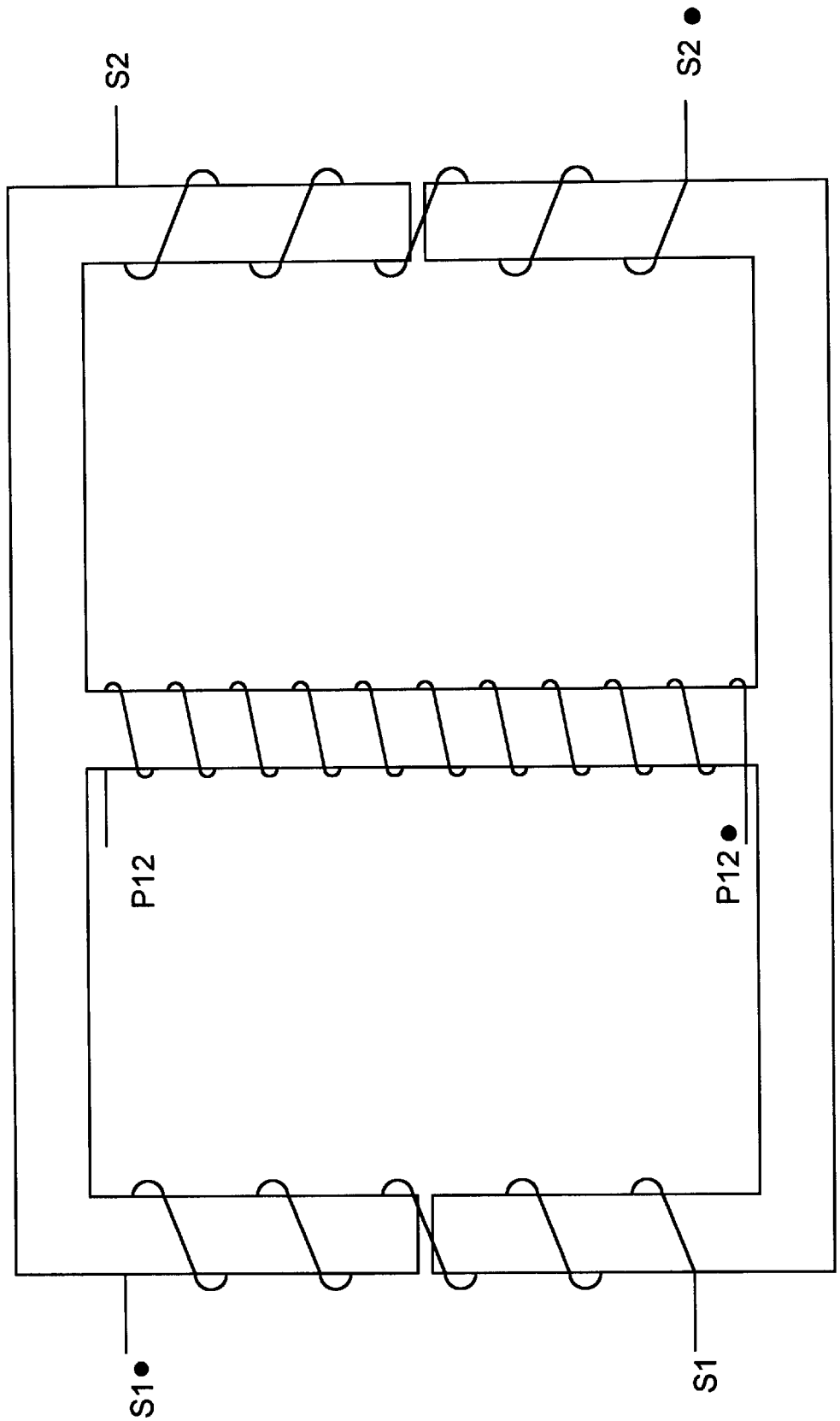
FIG. 27 illustrates a possible construction of the integrated magnetic of the FIG. 26 circuit.

The FIG. 26 circuit is similar to the FIG. 25 circuit, but with the series LC circuit arranged in a way which would benefit pulse width modulation controlled converters. Another difference is that the integrated magnetic has now combined the two primary windings into a single primary winding. An example of a coupled inductor construction that can integrate the two coupled inductors onto a single core with a single shared primary winding is shown in FIG. 27. Here the two primary windings are combined into a single winding on the ungapped core center post and the two independent secondary windings are wound on the two gapped core outer legs. The FIG. 27 construction although simpler and cheaper than the FIG. 25 construction suffers from lower coupling coefficient between primary winding and secondary windings since the primary and secondary windings cannot be colocated on the same core leg with the single primary winding construction. A relatively low coupling coefficient results in higher leakage flux, higher leakage inductance, higher ringing, and higher EMI. The ringing will likely result in the need for a larger, more complicated, and more expensive snubber offsetting some of the advantage of combining the two primary windings.

Additional embodiments are realized by adding converter outputs. Additional converter outputs can be added by adding secondary windings to each coupled inductor and secondary switches for each secondary winding and output capacitors and loads for each additional output.

Structure

Figure 28:
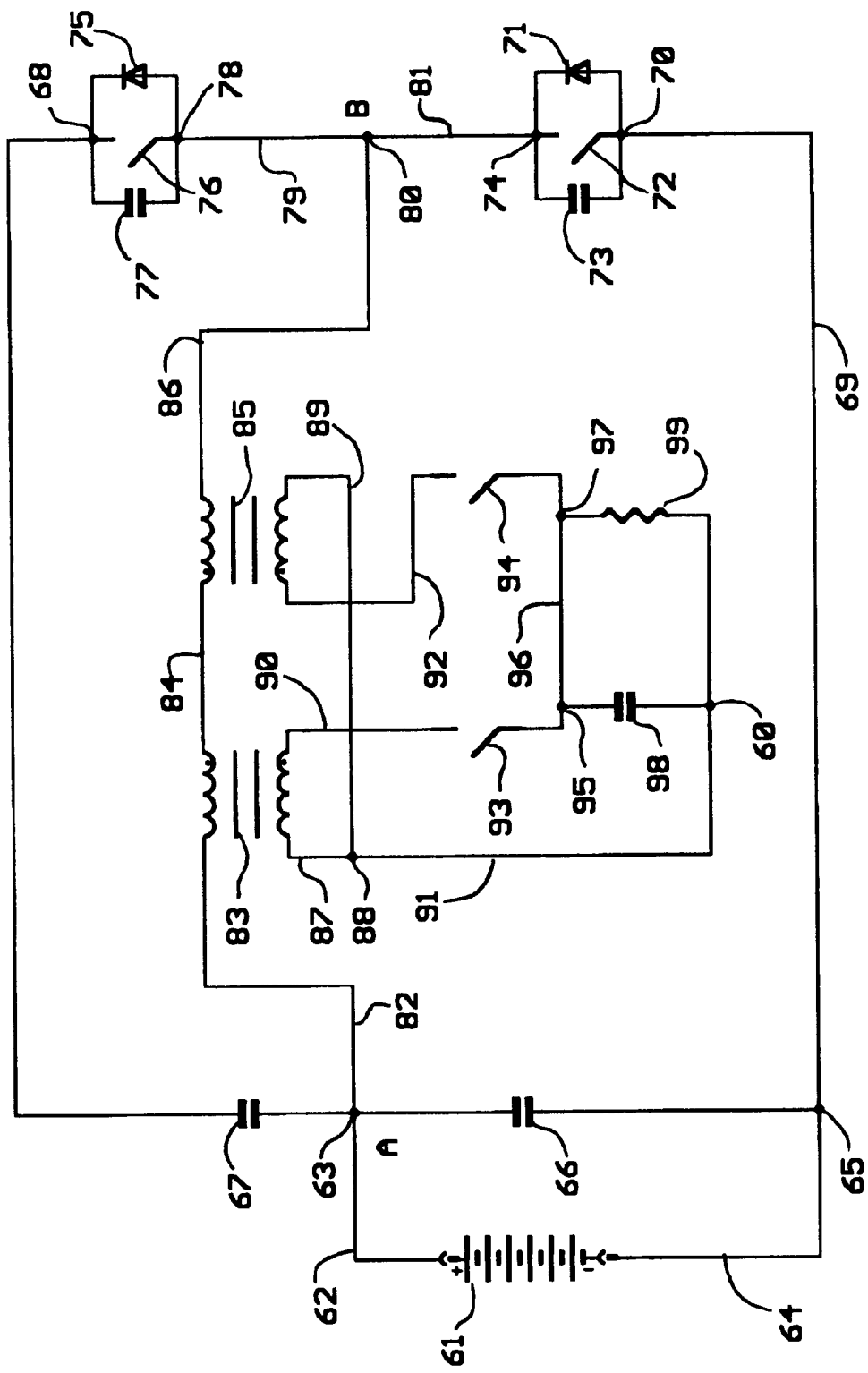
FIG. 28 illustrates a circuit schematic drawing of a soft switching, active reset, pulse width modulated, dual opposed interleaved coupled inductor buck converter according to the subject invention.

As shown in the circuit of FIG. 28, a positive terminal of DC input power source 61 is coupled, via a lead 62, to a node 63. Node 63 is connected to a first terminal of an input filter capacitor 66. A negative terminal of source 61 is connected, via a lead 64, to a node 65. Node 65 is connected to a second terminal of capacitor 66. Node 63 is connected to a first terminal of a reset capacitor 67. A second terminal of capacitor 67 is connected to a node 68. Node 65 is connected to a node 70 via a lead 69. Node 70 is connected to an anode terminal of a diode 71 and to a first terminal of a primary switch 72 and to a first terminal of a capacitor 73. Diode 71, capacitor 73, and switch 72 form a first switch subcircuit. A node 74 is connected to a cathode terminal of diode 71 and to a second terminal of switch 72 and to a second terminal of capacitor 73. Node 68 is connected to a cathode terminal of a diode 75 and to a first terminal of a primary switch 76 and to a first terminal of a capacitor 77. Diode 75, capacitor 77, and switch 76 form a second switch subcircuit. A node 78 is connected to an anode terminal of diode 75 and to a second terminal of switch 76 and to a second terminal of capacitor 77. Node 78 is connected to a node 80 via a lead 79. Node 74 is connected to node 80 via a lead 81. Node 63 is connected to an undotted terminal of the primary winding of a coupled inductor 83 via a lead 82. A dotted terminal of the primary winding of inductor 83 is connected to a dotted terminal of the primary winding of a coupled inductor 85 via a lead 84. An undotted terminal of the primary winding of inductor 85 is connected to node 80 via a lead 86. An undotted terminal of a secondary winding of inductor 83 is connected to a node 88 via a lead 87. An undotted terminal of a secondary winding of inductor 85 is connected to node 88 via a lead 89. A dotted terminal of the secondary winding of inductor 83 is connected to a first terminal of a secondary switch 93 via a lead 90. A dotted terminal of the secondary winding of inductor 85 is connected to a first terminal of a secondary switch 94 via a lead 92. A second terminal of switch 93 is connected to a node 95. A second terminal of switch 94 is connected to a node 97. Node 95 is connected to node 97 via a lead 96. Node 95 is connected to a first terminal of an output filter capacitor 98. Node 97 is connected to a first terminal of a resistor 99. A second terminal of capacitor 98 is connected to a node 60. A second terminal of resistor 99 is connected to node 60. Node 60 is connected to node 88 via a lead 91. The dots on the primary and secondary windings of inductors 83 and 85 indicate the polarity of the windings so that the AC wave forms of the dotted terminals will be in phase with respect to each other for each coupled inductor. The AC wave forms of the undotted terminals will be in phase with respect to each other for each coupled inductor. The AC wave forms of the dotted terminals and the undotted terminals will be 180° out of phase or in opposite phase in comparison to each other for each coupled inductor.

Figure 29:
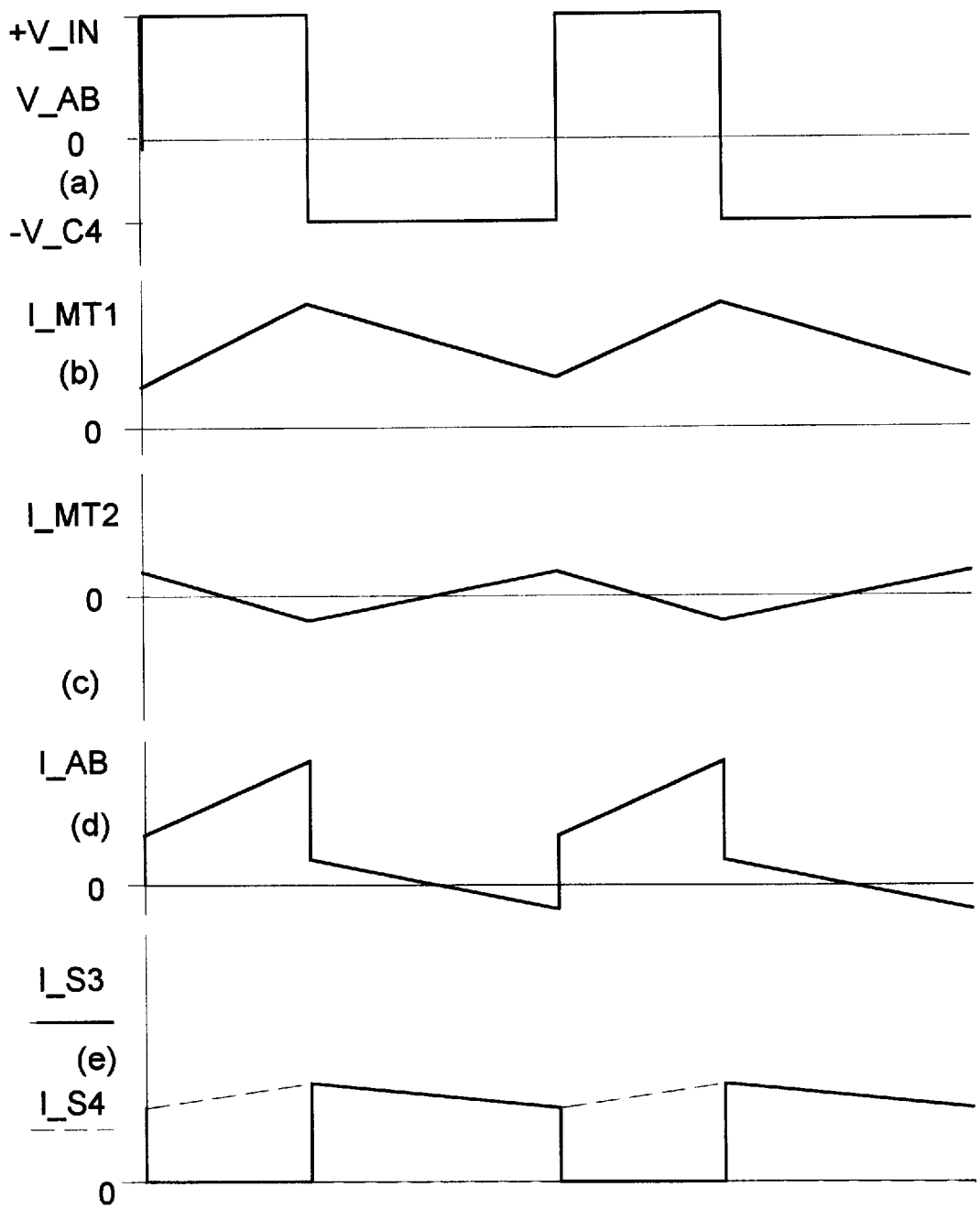
FIG. 29 illustrates voltage and current wave forms of the FIG. 28 converter.

The primary switching network consisting of switches 72, and 76 converts the substantially DC input voltage, V__IN of source 61, applied to this network to an AC wave form at its output terminal, labeled A and B in FIG. 28. The AC wave form, V__AB, is a stream of bi-directional pulses that alternate in polarity and are, generally, different in magnitude and duration, as illustrated by FIG. 29a. A conventional timing circuit (not shown) controls the duty cycles of the switches in order to accomplish output voltage regulation. The control circuit may be responsive to an external control signal or voltage reference, to an AC component of the DC input power source, to the output voltage, to the output current, to the current supplied by source 61, to other physical parameters which may effect power converter or load operation, or to any combination of these physical parameters.

Operation

It is assumed in this analysis that the system has reached a settled operating condition. Except for the short, but finite, switching intervals there are two states of the circuit of FIG. 28, an on state and an off state. It is also assumed, for purpose of analysis, that the switching intervals between the states are approximately zero seconds in duration and that capacitors 73 and 77 are small and do not contribute significantly to the operation of the converter, except during the switching transitions.

Figure 31:
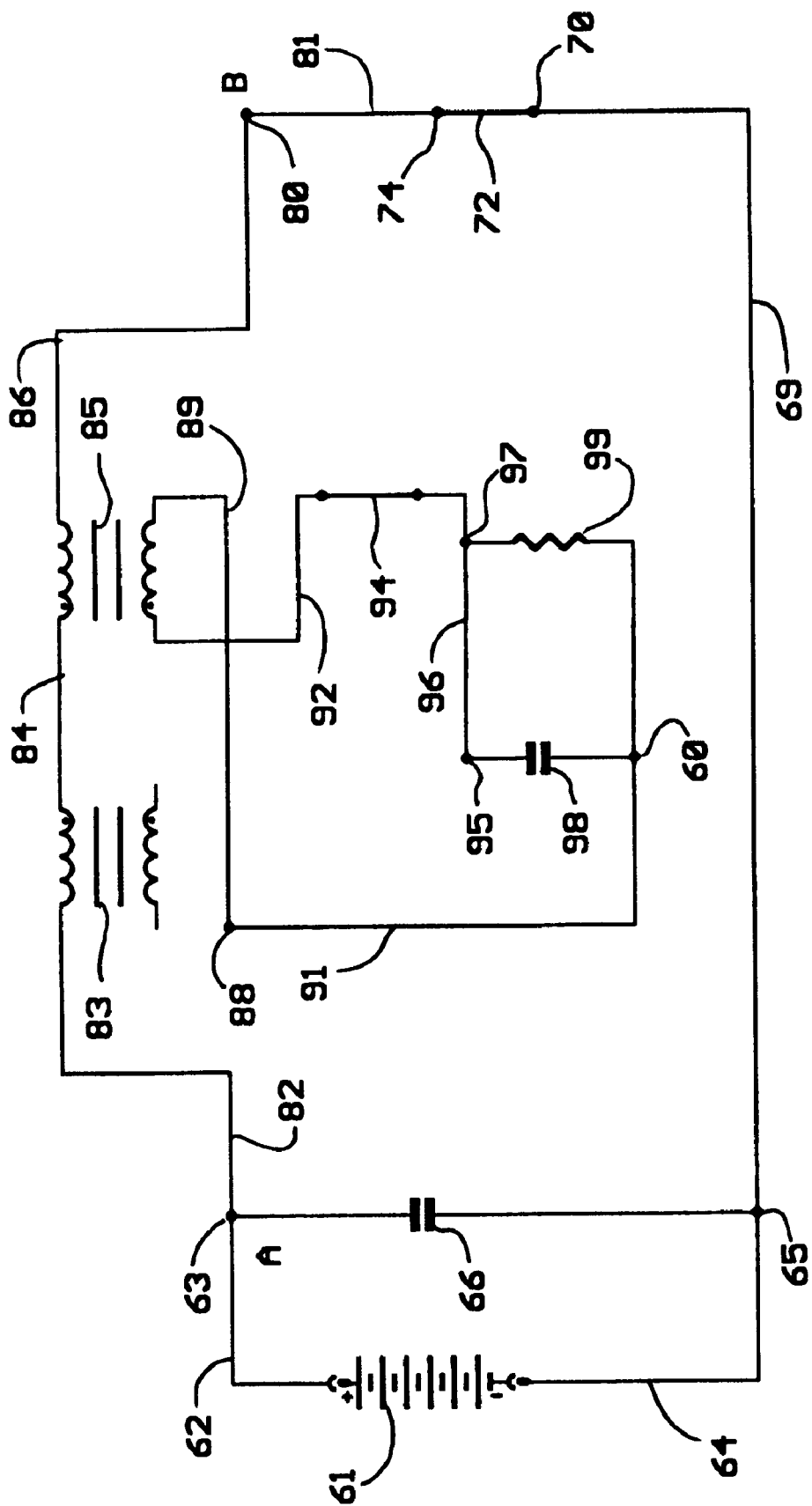
FIG. 31 illustrates an on state of the FIG. 28 converter.
Figure 32:
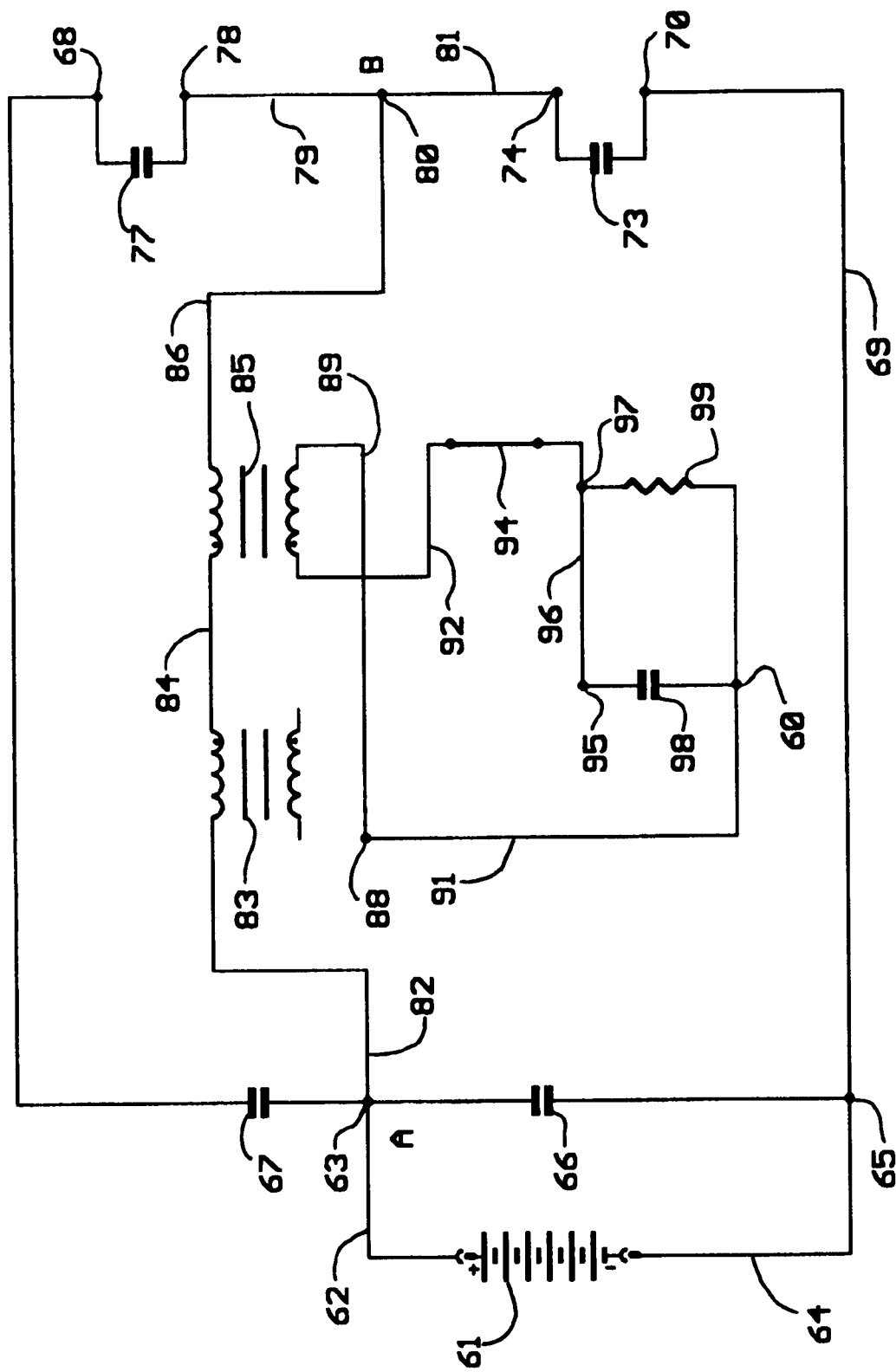
FIG. 32 illustrates a first phase of a turn off transition of the FIG. 28 converter.
Figure 33:
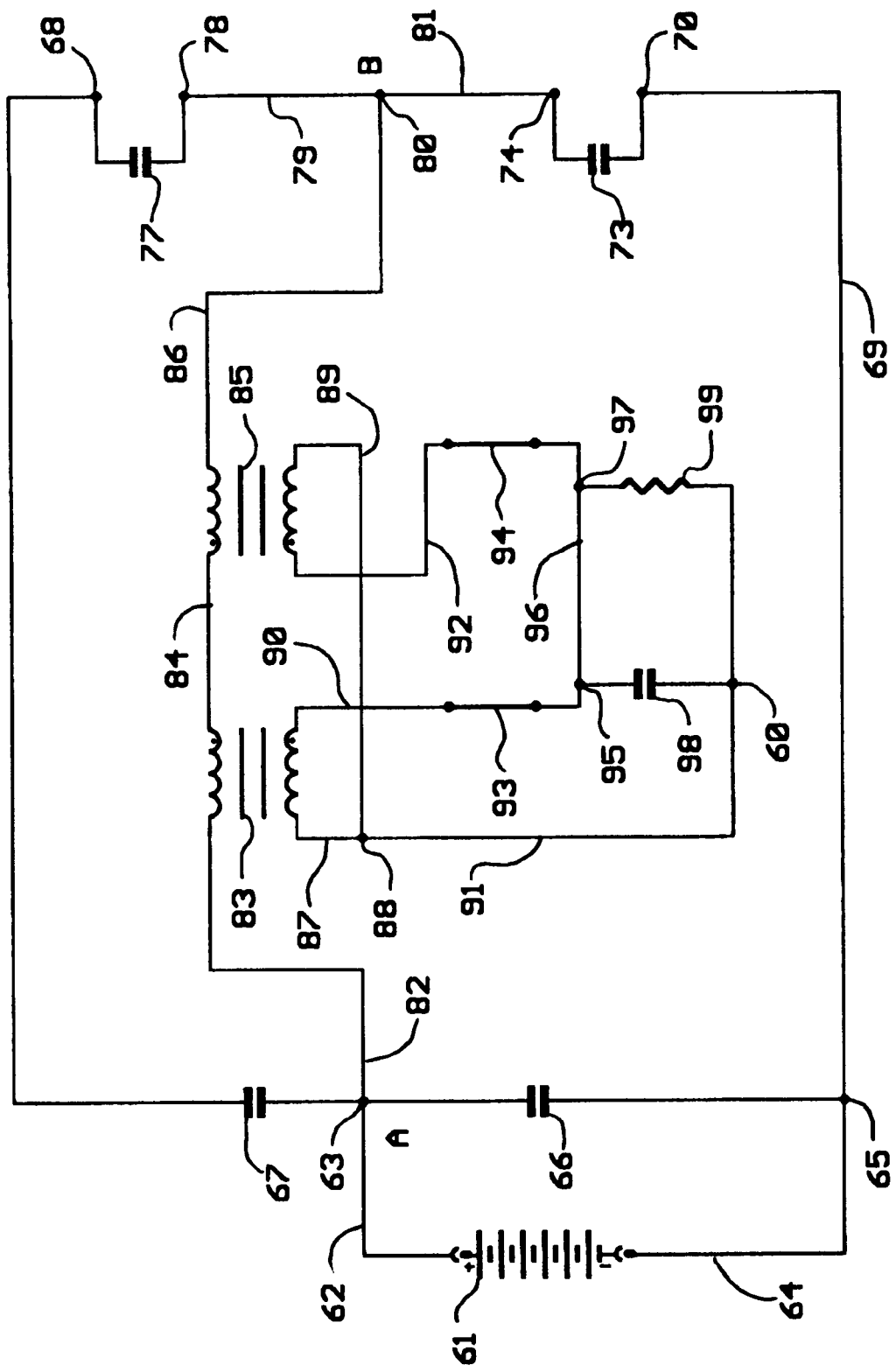
FIG. 33 illustrates a second phase of a turn off transition of the FIG. 28 converter.
Figure 34:
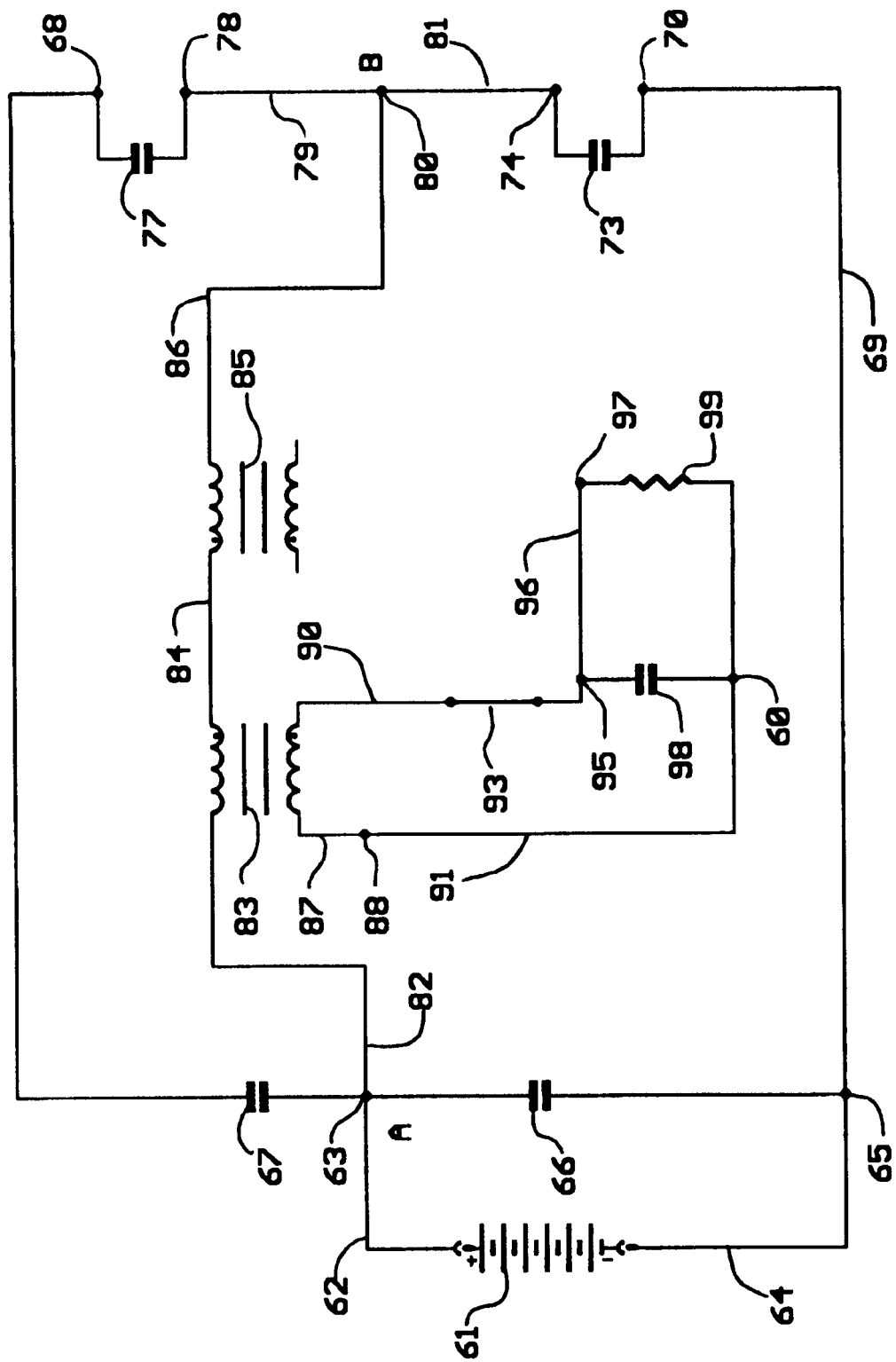
FIG. 34 illustrates a third phase of a turn off transition of the FIG. 28 converter.
Figure 35:
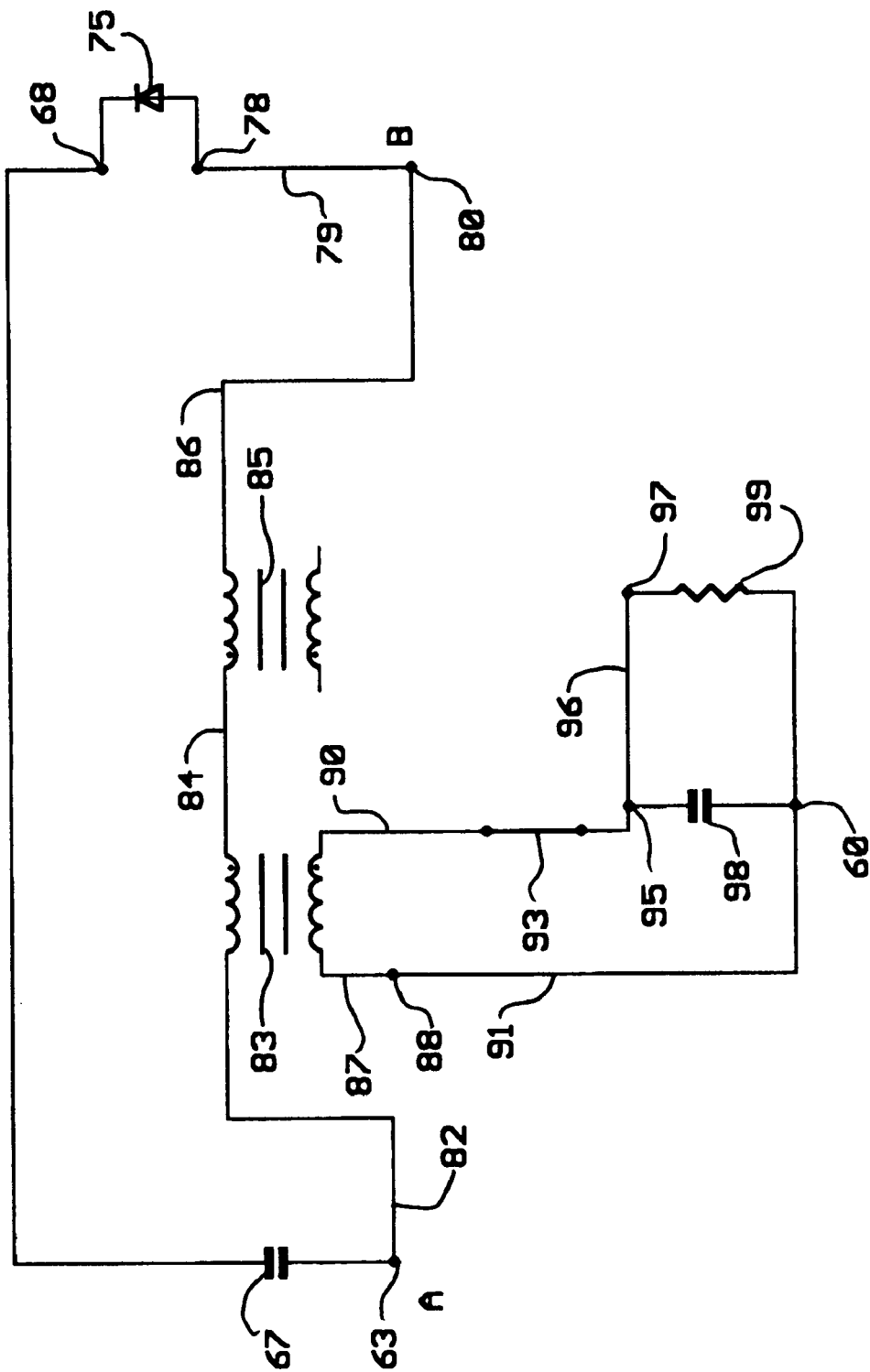
FIG. 35 illustrates a fourth phase of a turn off transition of the FIG. 28 converter.
Figure 36:
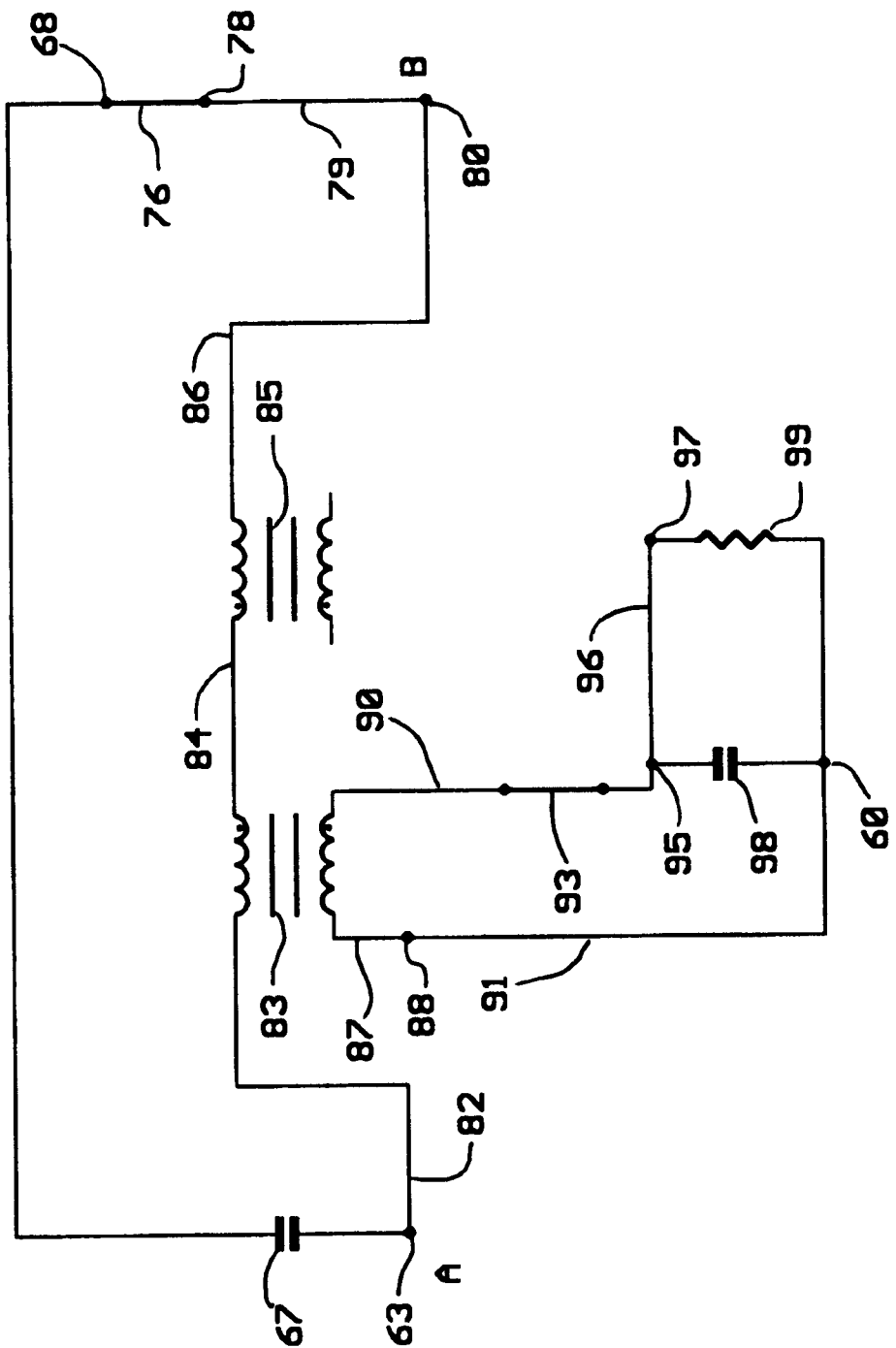
FIG. 36 illustrates an off state of the FIG. 28 converter.
Figure 37:
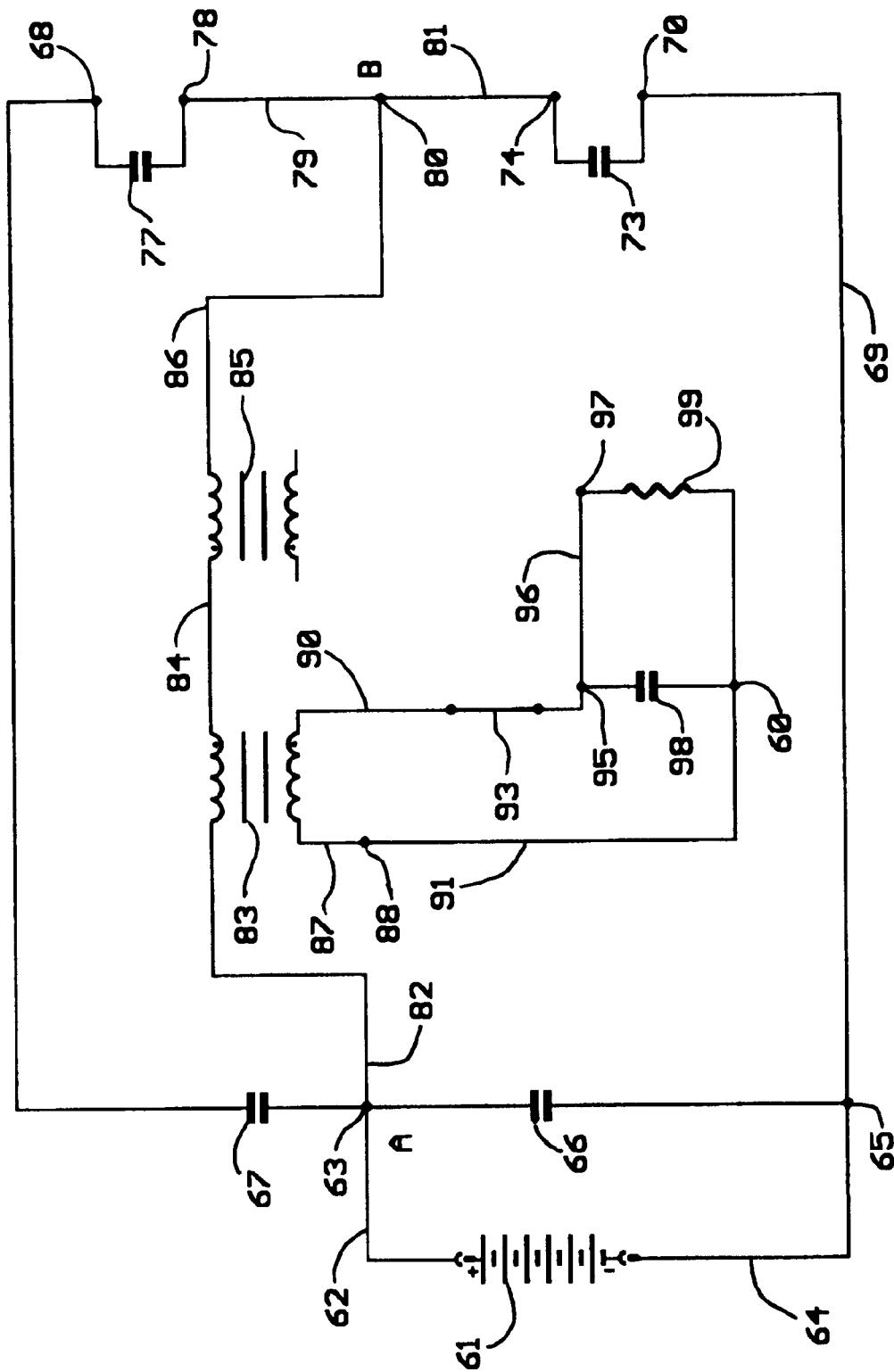
FIG. 37 illustrates a first phase of a turn on transition of the FIG. 28 converter.
Figure 38:
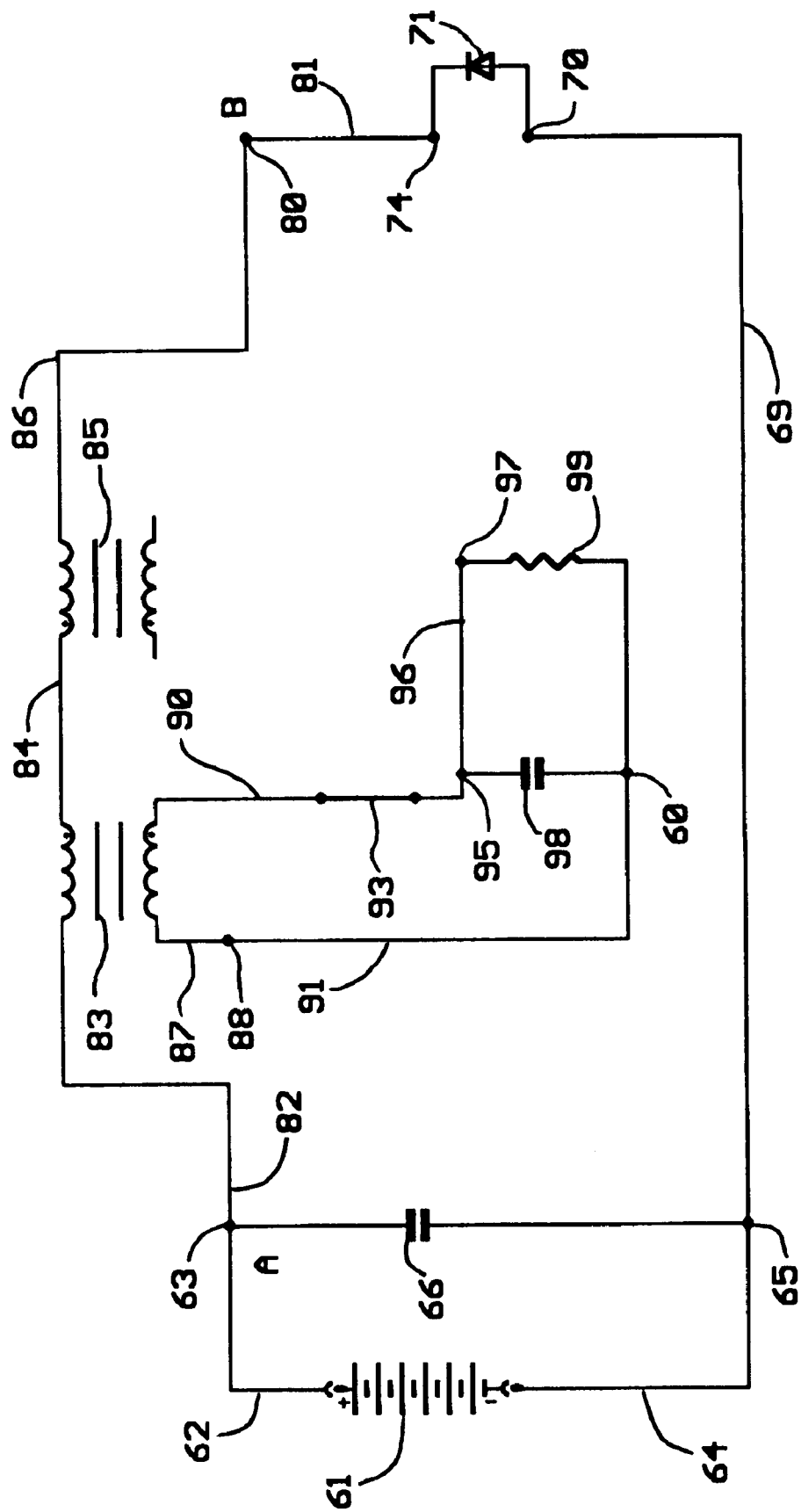
FIG. 38 illustrates a second phase of a turn on transition of the FIG. 28 converter.
Figure 39:
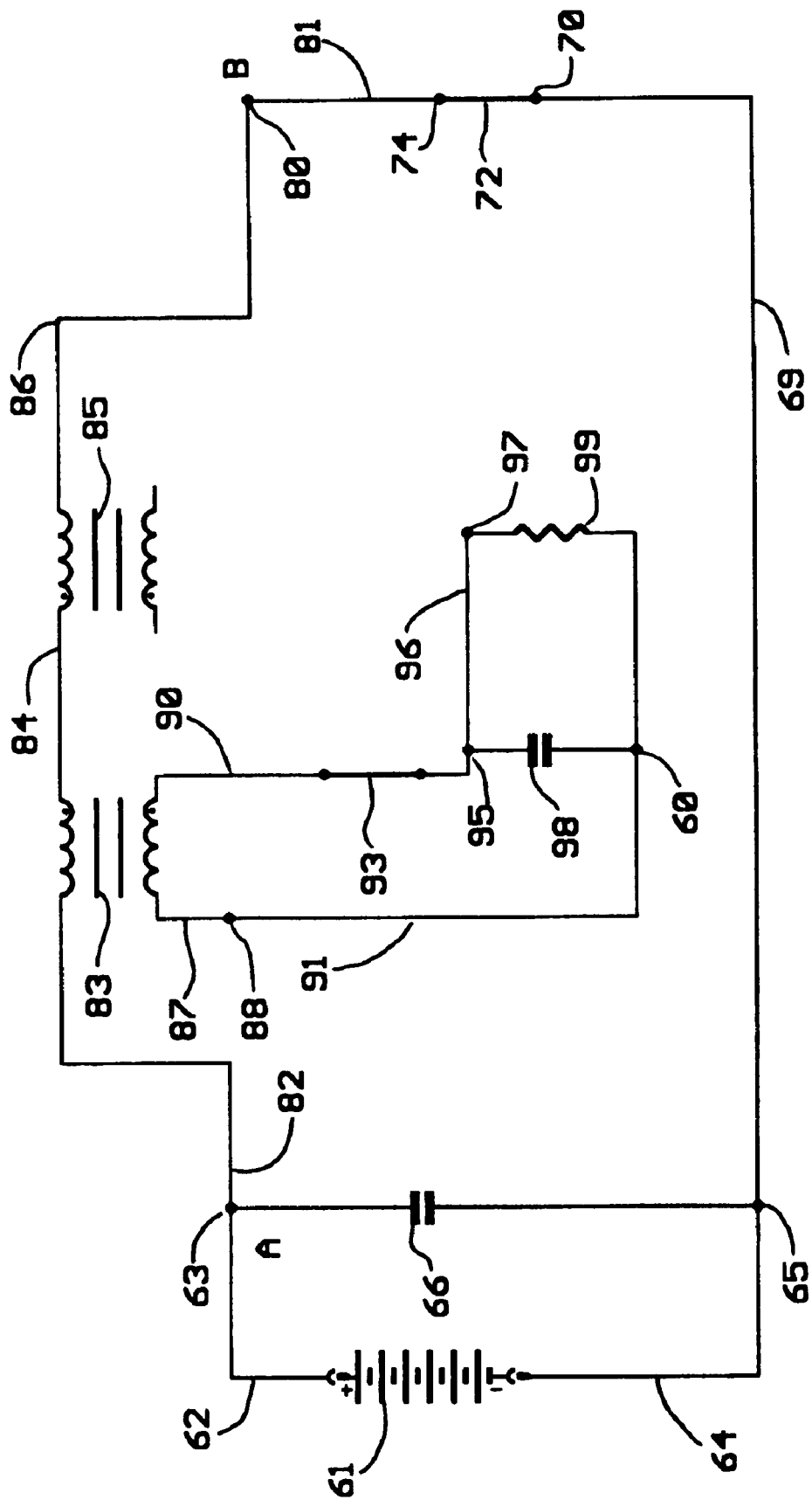
FIG. 39 illustrates a third phase of a turn on transition of the FIG. 28 converter.
Figure 40:
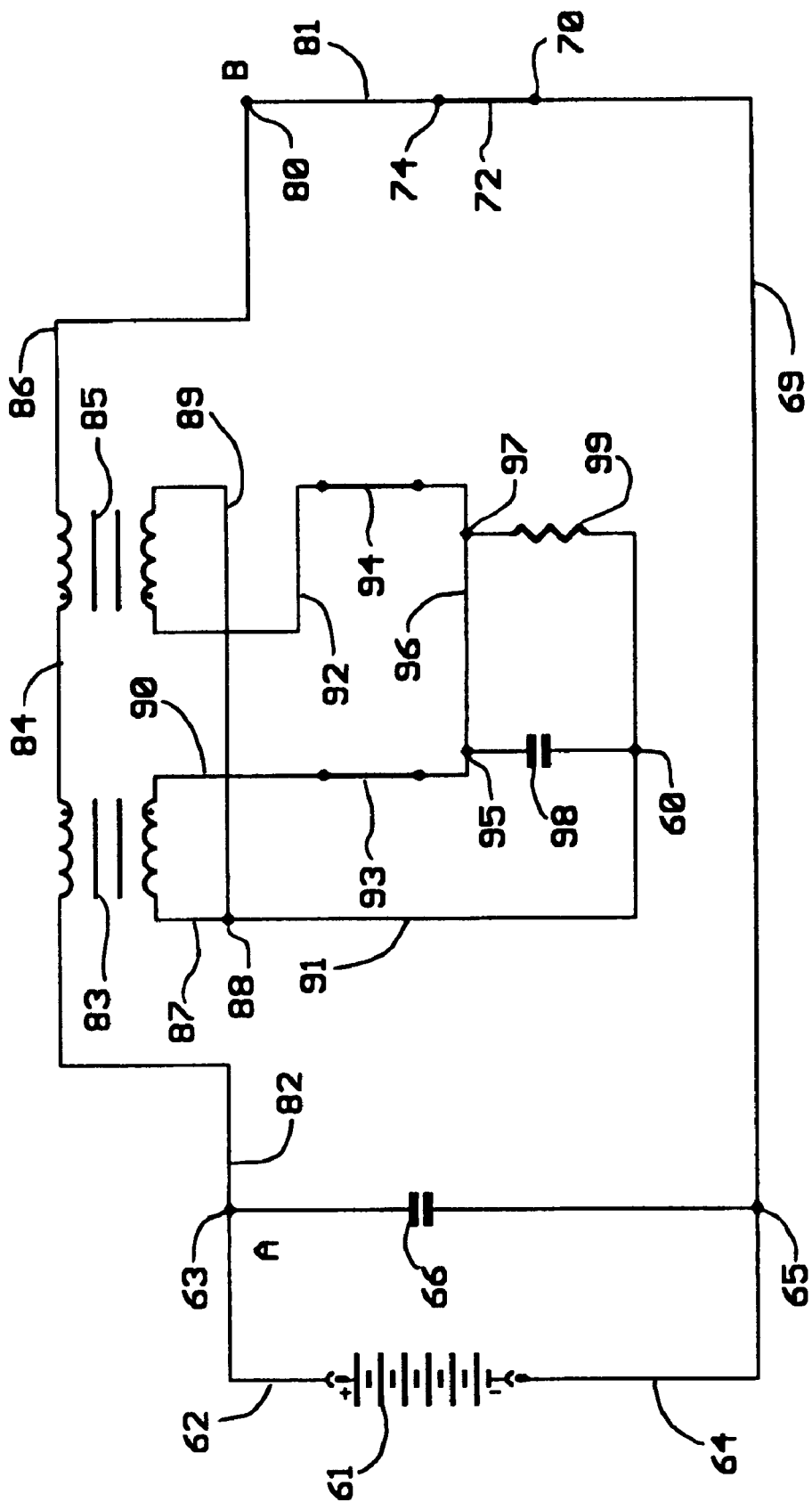
FIG. 40 illustrates a fourth phase of a turn on transition of the FIG. 28 converter.

In operation consider an initial condition, illustrated in FIG. 31, in which the voltage difference between points A and B, labeled V__AB in FIG. 29a, is equal to the voltage of source 61 and current is flowing from left to right or from A to B. The current flowing in the primary windings of inductors 83 and 85, labeled I__AB in FIG. 29d, is positive. During this initial condition, switch 72 is closed (on) and switch 76 is open (off) and switch 94 is closed (on) and switch 93 is open (off). During this initial condition, inductor 83 has a substantial amount of stored energy. During this initial condition, inductor 85 also has a substantial amount of stored energy but, in general, the stored energy in inductor 85 will be less than the stored energy in inductor 83. Let us define that the magnetizing current is flowing in a positive direction when the current flows from the undotted terminal through the winding to the dotted terminal. For inductor 83, during the initial condition, the secondary current is zero and the primary current is equal to its magnetizing current and the magnetizing current, referred to the primary winding, labeled I_MT1 in FIG. 29b, is positive, since the current is flowing through its primary winding from the undotted terminal of its primary winding to the dotted terminal of its primary winding. During the initial condition, the current I_AB is equal in magnitude and direction to the magnetizing current, referred to the primary winding, of inductor 83. During the initial condition, the magnetizing current, referred to the primary winding, of inductor 85 is decreasing. The total current in the primary winding of inductor 85 is equal to the current I_AB. There are two components of the secondary winding current of inductor 85. One component of the secondary winding current of inductor 85 is its magnetizing current, referred to the secondary winding, and the other component is the induced current from its primary winding. The induced current component of the secondary winding current of inductor 85 is equal to the current flowing in the primary winding of inductor 85 multiplied by the ratio of the primary winding turns to the secondary winding turns of inductor 85. During the initial condition, the secondary winding voltage of inductor 85 is equal to the output voltage and the primary winding voltage of inductor 85 is equal to the secondary winding voltage of inductor 85 multiplied by the ratio of the primary winding turns to the secondary winding turns of inductor 85. The primary winding voltage of inductor 83 is equal to the voltage of source 61 minus the primary winding voltage of inductor 85. During the initial condition, the energy in inductor 83 increases. At a time determined by the control circuit the primary switching network changes state so that switch 72 is opened, as illustrated in FIG. 32. The stored energy in inductor 83 maintains the primary winding current, which is flowing from A towards B, and forces charge into capacitor 73, into capacitor 77, and into capacitor 67. The voltage at the node 80 rises as capacitors 73 and 67 charge and capacitor 77 discharges. When the voltage at node 80 reaches the voltage at node 63, switch 93 is closed (turned on), as illustrated in FIG. 33. The voltage at node 80 continues to rise and the current in switch 94 falls and the current in the primary windings of inductors 83 and 85 falls as the current in switch 93 rises. While switches 93 and 94 are closed, the output current rapidly transfers from switch 94 to switch 93. Soon the current in switch 94 drops to zero and switch 94 is opened (turned off), as illustrated in FIG. 34 The voltage of node 80 continues to rise driven by the energy stored in inductor 85, which maintains a current in the primary windings of inductors 83 and 85 equal to the magnetizing current in inductor 85. A delay in the turn on of switch 93 would have prevented a reduction of the primary winding currents of inductors 83 and 85 and would have provided a faster transition, but a delay is not necessary since the energy provided by inductor 85 would be sufficient to complete the transition without switching losses. In most circumstances switch 93 can be implemented using a single diode but a delay mechanism would add extra cost and complexity with no benefit. When the voltage of node 80 rises to the level of the voltage at node 68 diode 75 becomes forward biased and turns on, as illustrated in FIG. 35. Shortly after diode 75 turns on switch 76 is closed (turned on), as illustrated in FIG. 36. FIG. 36 shows the operating condition for an off state. At the beginning of the off state the primary current is flowing from A towards B and the primary current is equal in magnitude to the magnetizing current of inductor 85, which is negative and increasing, i.e., becoming more positive as time progresses, as illustrated in FIG. 29c. By examining FIG. 36 one can see that the voltage on capacitor 67 is equal to the sum of the primary winding voltages of inductors 83 and 85. The voltage on the secondary winding of inductor 83 is equal to the converter's output voltage. The voltage on the primary winding of inductor 83 is equal to the output voltage times the ratio of the primary winding turns to the secondary winding turns of inductor 83. The primary winding voltage of inductor 85 is equal to the voltage of capacitor 67 minus the primary winding voltage of inductor 83. The voltage applied to the primary winding of inductor 85 is directed so that the magnetizing current in inductor 85 becomes more positive with the passage of time and the magnetizing current in inductor 85 passes through zero and becomes positive, as illustrated in FIG. 29c. When the magnetizing current in inductor 85 has increased to a value equal to the negative of its value at the beginning of the off state, switch 76 is opened (turned off). When switch 76 is turned off the energy stored in inductor 85 maintains the primary winding current, which is now flowing from B towards A, charging capacitor 77 and discharging capacitors 67 and 73, as illustrated in FIG. 37. The voltage at node 80 drops during this time, until the voltage at node 80 reaches the voltage at node 65, at which time diode 71 becomes forward biased, as illustrated in FIG. 38. Shortly after diode 71 begins to conduct switch 72 is closed (turned on), as illustrated in FIG. 39. Shortly after switch 72 is closed switch 94 is closed, as illustrated in FIG. 40. The timing of switch 94 is critical to the operation of this invention. If switch 94 is allowed to close (turn on) prior to the close (turn on) of switch 72, then zero voltage switching would not be possible since the magnetizing current and stored energy in inductor 83 would oppose the current that drives the transition. Without the delay in the timing of switch 94 switch 72 would turn on with simultaneous significant applied voltage and significant current in switch 72, and would, thereby, incur substantial switching losses. While switches 93 and 94 are closed, current transfers rapidly from switch 93 to switch 94 as the current in the primary windings of inductors 83 and 85 rapidly changes sign and value from the magnetizing current of inductor 85 to the magnetizing current of inductor 83, as shown in FIG. 29d and FIG. 29e. When the current in switch 93 has dropped to zero, switch 93 is opened (turned off) as illustrated in FIG. 31, which also illustrates the initial condition. The initial condition is the on state of the converter. At this point a full cycle of operation has been completed and the initial conditions are again established. During the full operating cycle both of the primary switches were turned on and turned off at substantially zero voltage, eliminating first order switching losses for the two primary switches.

In the steady state the volt second product must add up to zero for any winding for a complete cycle, which is a way of expressing the fact that the average winding voltage is zero in the steady state. This fact can be used to calculate the transfer function for the converter. Let D represent the fraction of a cycle that the system is in the on state. Since the time average voltage across a transformer winding must be zero in the steady state, for inductor 83 primary winding the volt second product sum for one cycle can be expressed as:

$$\left(V_{IN} - V_{OUT} \cdot \frac{N_{P2}}{N_{S2}}\right) \cdot D \cdot T - V_{OUT} \cdot \frac{N_{P1}}{N_{S1}} \cdot (1-D) \cdot T = 0, \quad (19)$$

where $N_{P1}$ and $N_{S1}$ are the primary winding turns and the secondary winding turns, respectively, for inductor 83, and $N_{P2}$ and $N_{S2}$ are the primary winding turns and the secondary winding turns, respectively, for inductor 85. For the primary winding of inductor 85 the volt second product sum for one cycle can be expressed as:

$$\left(V_{C4} - V_{OUT} \cdot \frac{N_{P1}}{N_{S1}}\right) \cdot (1-D) \cdot T - V_{OUT} \cdot \frac{N_{P2}}{N_{S2}} \cdot D \cdot T = 0, \quad (20)$$

where $V_{C4}$ is the average voltage applied to capacitor 67 during the off state. During the off state the average primary winding current is zero. This must be the case or the voltage of capacitor 67 will change and the steady state assumption would not be valid. Since the average primary winding current is zero during the off state, then the net contribution to the secondary winding current of inductor 83 during the off state that is induced from the primary winding will be zero and we can conclude that the net secondary winding current is due entirely to the net contribution from the magnetizing current of inductor 83. The average magnetizing current, referred to the primary winding, of inductor 83 during the off state is equal to the input current $I_{IN}$. The average magnetizing current, referred to the secondary winding, of inductor 83 is equal to the output current $I_{OUT}$. The average magnetizing current, referred to the secondary winding, of inductor 83 is also equal to the input current $I_{IN}$ multiplied by the ratio of the primary winding turns to the secondary winding turns of inductor 83. We can say then that:

$$I_{OUT} = I_{IN} \cdot \frac{N_{P1}}{N_{S1}}. \quad (21)$$

If we assume that the converter is lossless, then the input power will be equal to the output power or:

$$V_{OUT} \cdot I_{OUT} = V_{IN} \cdot I_{IN} \cdot D \quad (22).$$

Combining (21) and (22) and solving for $V_{OUT}$ we determine that:

$$V_{OUT} = D \cdot V_{IN} \cdot \frac{N_{S1}}{N_{P1}}. \quad (23)$$

Combining (23) and (20) and solving for $V_{C4}$ we determine that:

$$V_{C4} = \frac{V_{IN} \cdot D}{(1-D)} \cdot \left(1 - D \cdot \left(1 - \frac{N_{S1} \cdot N_{P2}}{N_{P1} \cdot N_{S2}}\right)\right). \quad (24)$$

For both the on state and the off state the output ripple current has an increasing component and a decreasing component, neither of which is dominant for all conditions, in terms of the ripple slope. There is a condition for which the components of the output current will yield a zero slope, so that the AC component of the output ripple current is zero. Consider the on state where the secondary winding of inductor 85 is providing current to the output. The secondary winding current of inductor 85 will have two components, an increasing component due to the increasing primary winding current which is equal to the magnetizing current in inductor 83, and a decreasing component equal to the decreasing magnetizing current of inductor 85. The time rate of change of the component due to the increasing magnetizing current of inductor 83 is:

$$\frac{d I_{MT1}}{dt} = \frac{\left(V_{IN} - V_{OUT} \cdot \frac{N_{P2}}{N_{S2}}\right)}{L_{P1}}. \quad (25)$$

The time rate of change of the component due to the magnetizing current of inductor 85 is:

$$\frac{d I_{MT2}}{dt} = -\frac{V_{OUT} \cdot \frac{N_{P2}}{N_{S2}}}{L_{P2}}. \quad (26)$$

If we add (25) and (26) and set the sum equal to zero and solve for D we will have the duty cycle for which the output ripple is zero. We get:

$$D_{ZERO\ RIPPLE} = \frac{L_{P2}}{(L_{P1} + L_{P2})} \cdot \frac{N_{S2} \cdot N_{P1}}{N_{S1} \cdot N_{P2}}. \quad (27)$$

If the two coupled inductors are identical then the duty cycle for which the ripple is zero is 50%. There are some advantages to having dissimilar coupled inductors. If $L_{P2}$ is made smaller than $L_{P1}$ then the optimal duty cycle is reduced and operating at reduced duty cycle will reduce the applied voltage, $V_{C4}$, to capacitor 67. Reducing $V_{C4}$ reduces the peak voltages applied to switches 72 and 76. The peak primary current depends on the value of the primary winding inductance of inductor 83. A larger value of primary inductance will result in lower peak primary current and lower conduction losses if the larger inductance can be accomplished without adding winding resistance, i.e., by reducing the air gap or increasing the effective permeability of inductor 83 core without saturating the core. The peak magnetizing current in inductor 85 can be calculated. During the on state $$\Delta I_{MT2} = \frac{d I_{MT2}}{dt} \cdot D \cdot T, \quad (28)$$

where $\Delta I_{MT2}$ is the change in magnetizing current during the on state of inductor 85. Since the average magnetizing current of inductor 85 is zero we can say that the peak magnetizing current of inductor 85 is $$I_{MT2\_PEAK} = \Delta I_{MT2}/2 \quad (29).$$

If we combine (26) and (28) with (29) we get $$I_{MT2\_PEAK} = \frac{V_{OUT}}{2 \cdot L_{P2}} \cdot \frac{N_{P2}}{N_{S2}} \cdot D \cdot T. \quad (30)$$

The current available to drive the switching transition is equal to $I_{MT2\_PEAK}$ and the energy available, $E_{MT2}$, is $$E_{MT2} = \frac{1}{2} \cdot L_{P2} \cdot I^2_{MT2\_PEAK}. \quad (31)$$

By substituting (30) into (31) we get $$E_{MT2} = \frac{1}{8} \cdot \frac{V^2_{OUT}}{L_{P2}} \cdot \left(\frac{N^2_{P2}}{N^2_{S2}}\right) \cdot D^2 \cdot T^2. \quad (32)$$

There is also some advantage to reducing the value of the primary winding inductance, $L_{P2}$, of inductor 85 in some cases. The converter of FIG. 28 has the property that the peak magnetizing current, $I_{MT2\_PEAK}$, in inductor 85 is independent of the load current. This is a very valuable property and one which is unique to this converter. This property is very valuable because it eases the design task of driving the switching transition over a broad range of loads. In all other fixed frequency zero voltage switching schemes for other converter designs the energy and current available to drive the transition is load dependent, which inevitably means that at some critical load there may not be sufficient energy or current available to drive the switching transition. Another problem with load dependent energy and current for driving the switching transition is that the switch timing design is complicated. When there is less energy and current available to drive the transition the transition takes more time. Providing a switch drive circuit with load dependent timing is difficult and seldom implemented. Typically converters with load dependent energy for driving switching transitions will suffer switching losses over part of the load range or they will provide more energy and current than necessary at high loads and switch very fast with very small rise and fall times, potentially creating an electromagnetic interference problem in the process. The peak magnetizing current, $I_{MT2\_PEAK}$, in inductor 85 along with the primary winding inductance, $L_{P2}$, of inductor 85 determines how much energy is available to drive the switching transitions, i.e., to charge and discharge the parasitic capacitances in the circuit to accomplish a zero voltage switching transition. The transition time is inversely proportional to the peak magnetizing current, $I_{MT2\_PEAK}$, in inductor 85. The peak magnetizing current, $I_{MT2\_PEAK}$, in inductor 85 can be increased by lowering the primary winding inductance, $L_{P2}$, of inductor 85 thereby reducing the time required to accomplish a zero voltage switching transition, if necessary.

Related Embodiments

Figure 41:
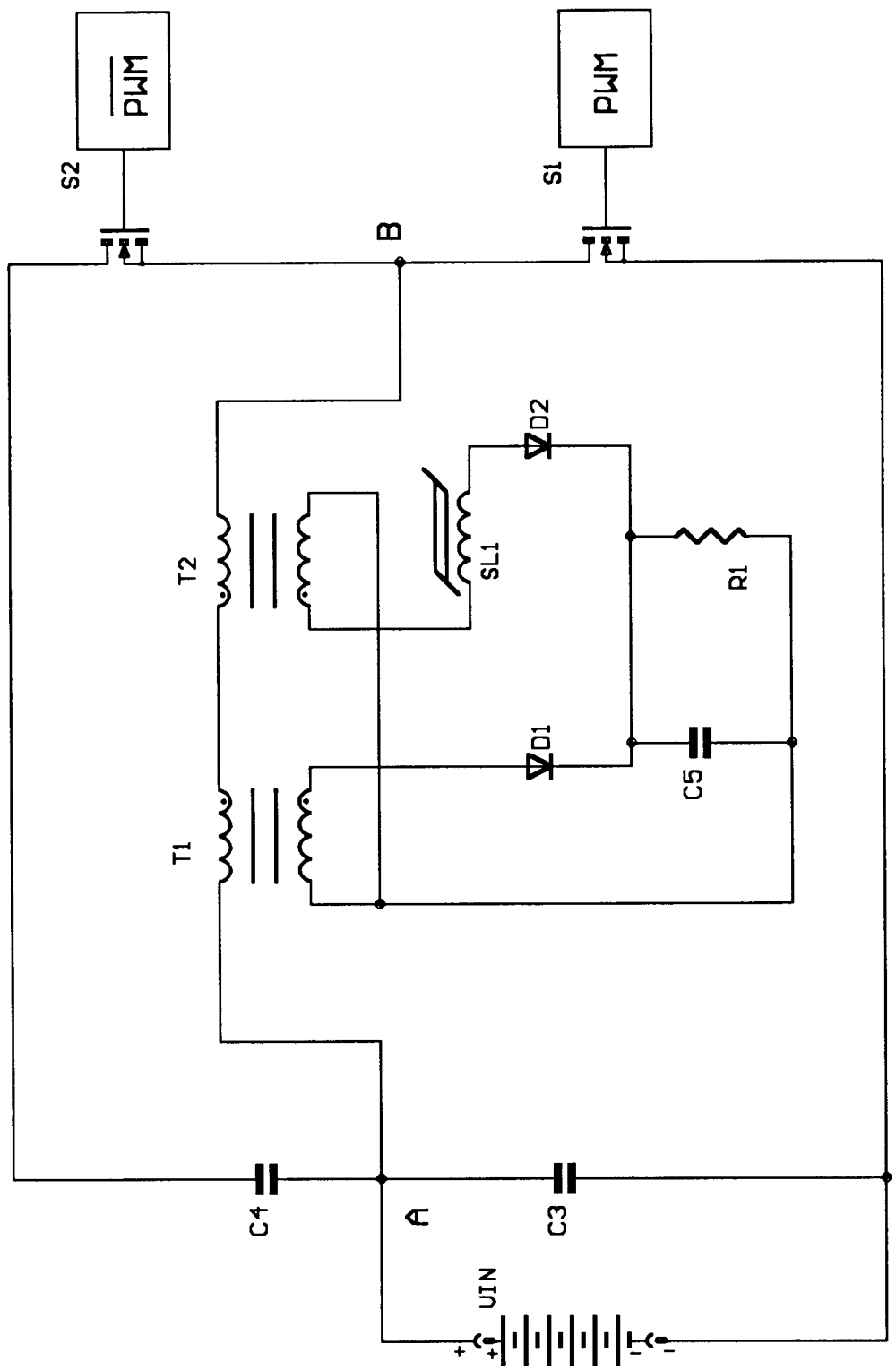
FIG. 41 illustrates an embodiment of the FIG. 28 converter in which power mosfets are used a primary switches and diodes are used as secondary switches and a saturable core inductor is used to provide the necessary secondary switch delay timing.

FIG. 41 shows an implementation of the circuit of FIG. 28 in which the secondary switches are diodes and the turn on delay timing needed for the D2 diode is provided by the saturable inductor SL1. In the FIG. 41 circuit the primary switches S1 and S2 are implemented using power mosfets which intrinsically contain a capacitor and a diode in the form of the mosfet output capacitance and the body drain diode, respectively.

Figure 42:
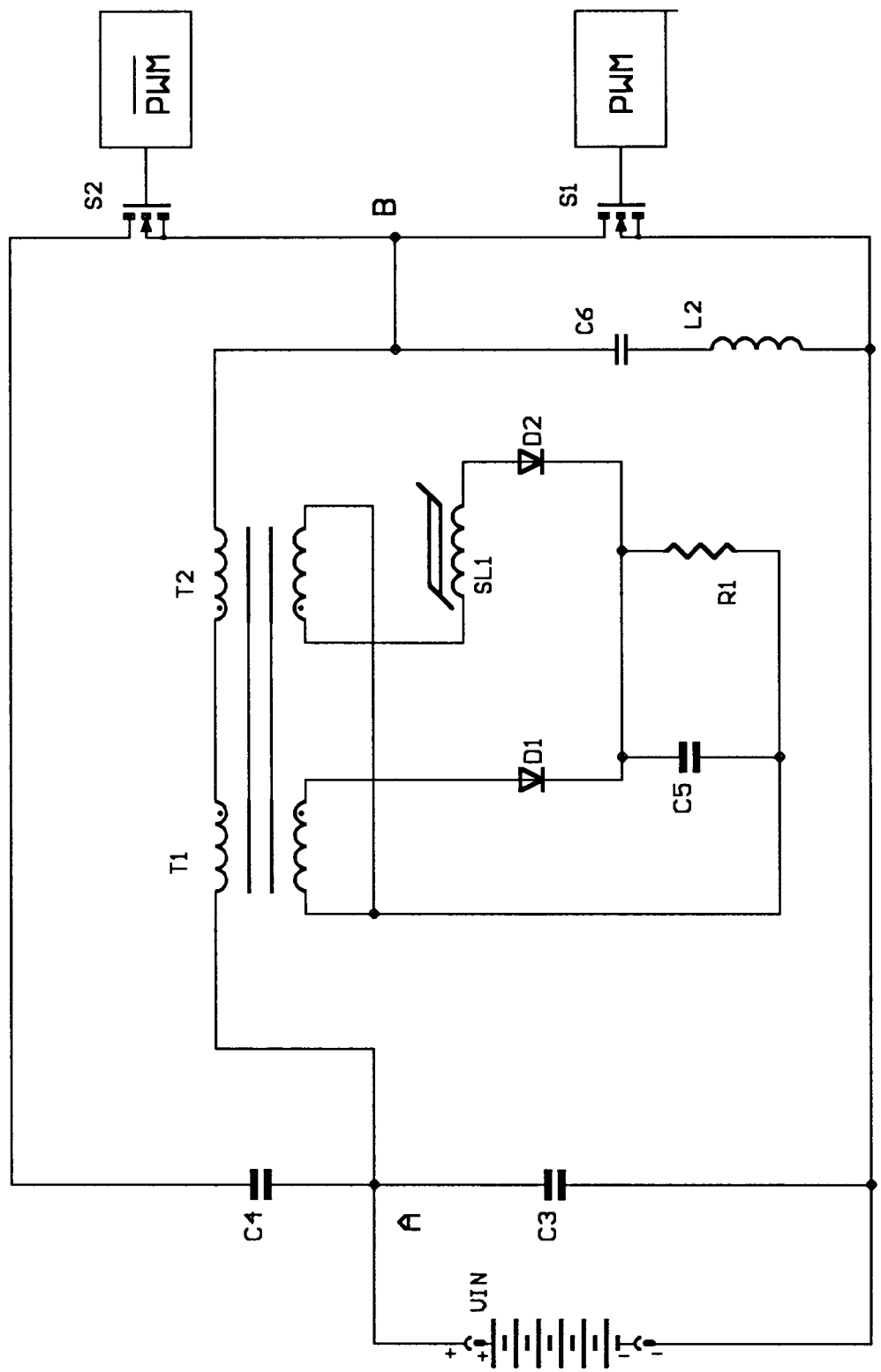
FIG. 42 illustrates the FIG. 41 converter with a series LC circuit added to provide additional current and stored energy for driving the switching transitions and with an integrated magnetic in which the two coupled inductors are wound on a single core, as illustrated in FIG. 25.

FIG. 42 is another embodiment in which a series LC circuit is added to the FIG. 41 embodiment to provide additional drive current and energy to drive the switching transitions. The series LC circuit consisting of L2 and C6 provides current that is proportional to line voltage. At higher line voltages more energy is needed to drive the switching transitions. The L2 C6 combination provides the additional energy when it is needed. In most cases the L2 C6 combination would not be necessary, but in converters that have a very wide line voltage range the L2 C6 combination will be helpful. Another feature of the FIG. 42 circuit is the integration of the two coupled inductors onto a single magnetic core. This integration can be accomplished with the winding arrangement illustrated in FIG. 25.

Figure 30:
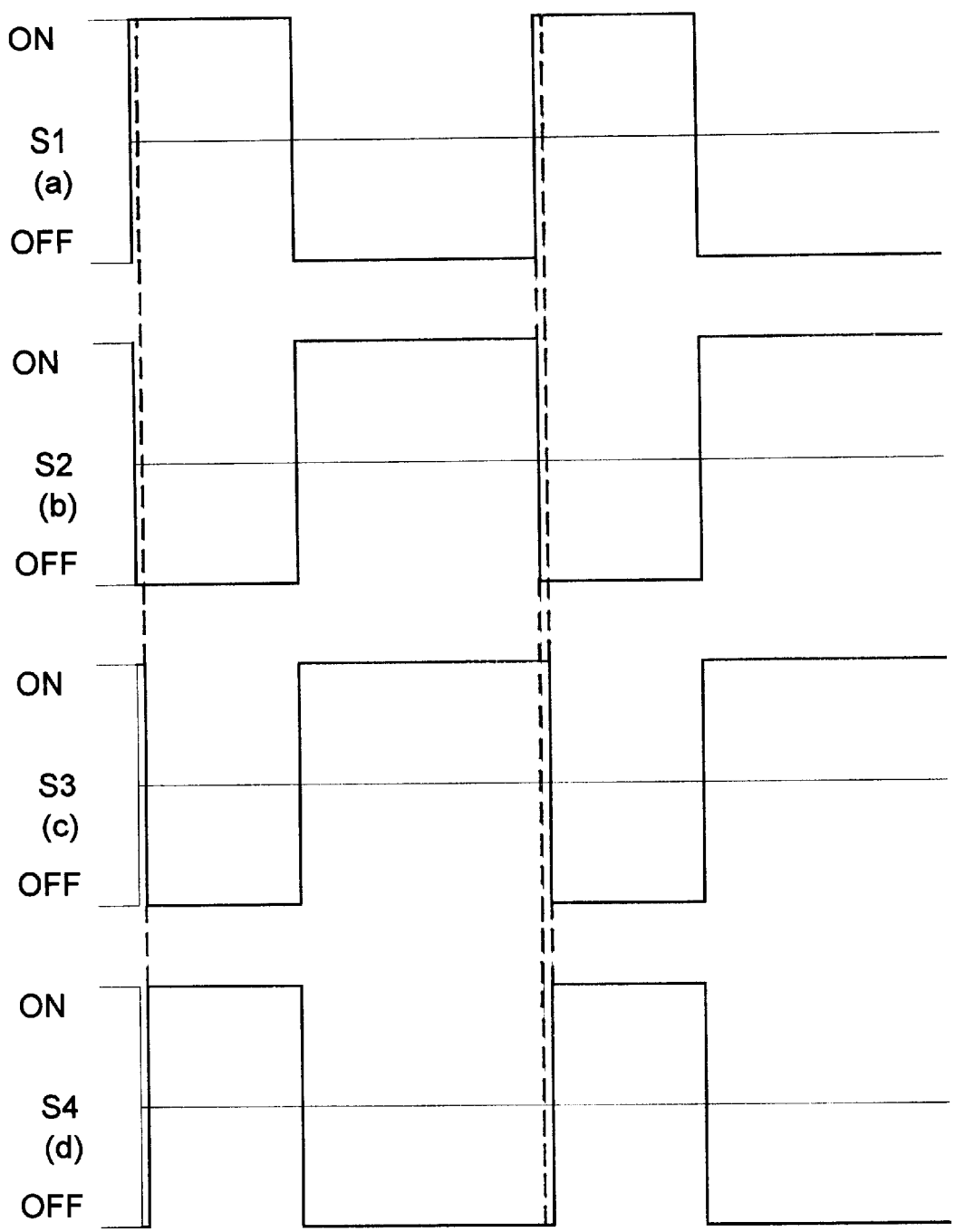
FIG. 30 illustrates switch timing for the switches of the FIG. 28 converter.
Figure 43:
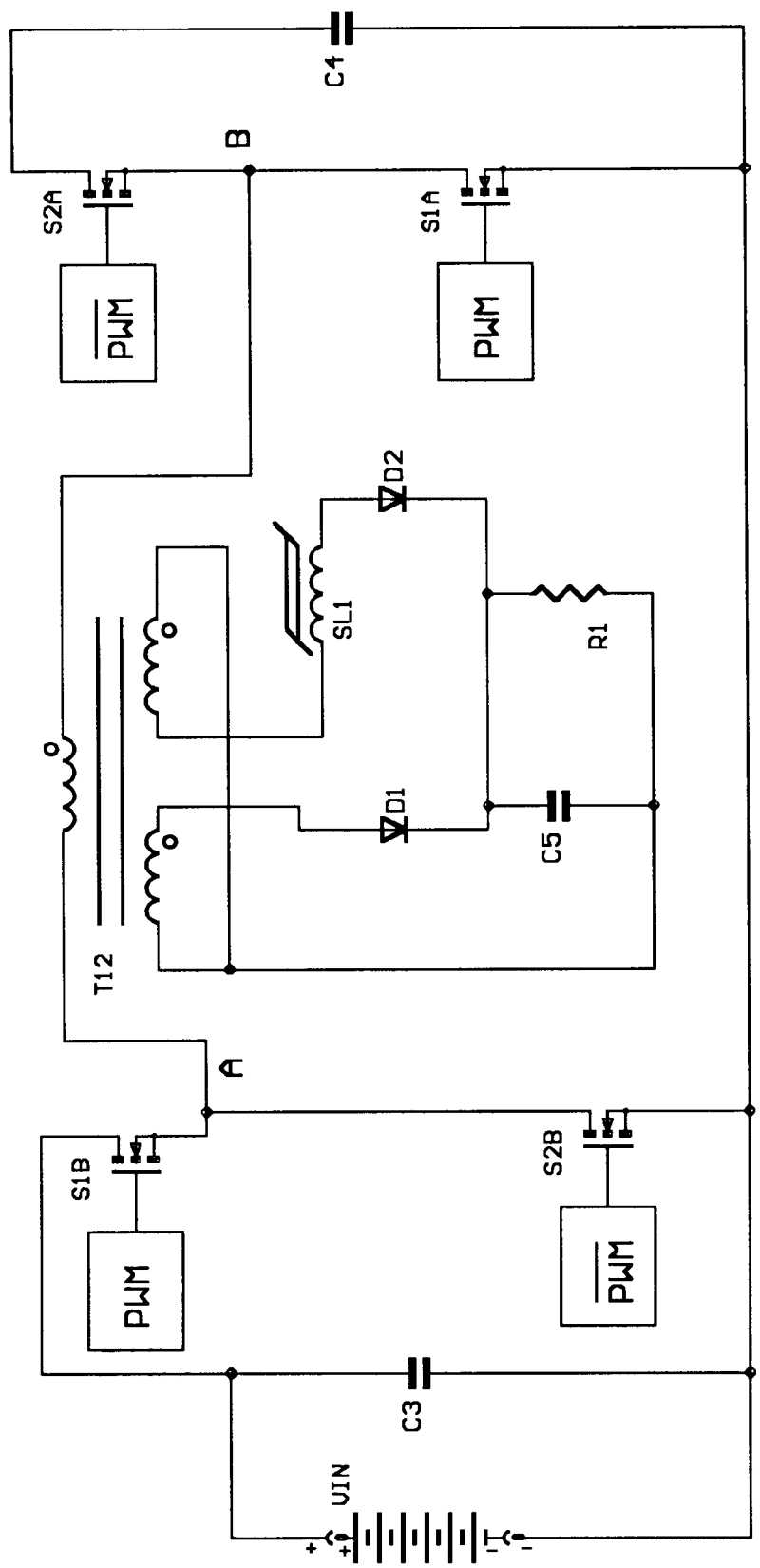
FIG. 43 illustrates the FIG. 41 converter with an additional pair of power mosfet switches arranged to reduce the applied voltage to the circuit primary switches for extending the power range of the FIG. 41 converter and with an integrated magnetic in which the two coupled inductors are wound on a single core with a single primary winding, as illustrated in FIG. 27.

FIG. 43 is another embodiment of the subject invention in which two pairs of switches are employed. The switches S1A and S1B are opened and closed at the same times and always conduct the same current. The timing for the S1A and S1B switches is illustrated in FIG. 30a. Similarly, the switches S2A and S2B are opened and closed at the same times and always conduct the same current. The timing for the S2A and S2B switches is illustrated in FIG. 30b. This doubled switch arrangement allows for the use of mosfets with lower voltage ratings and much lower on resistance. The connection of the C4 capacitor is also different in FIG. 43 by comparison to the connection in FIG. 41. The converter will operate essentially the same without regard to which terminal of the input DC source the C4 capacitor is connected. The connection point for the C4 capacitor will be chosen on the basis of which connection results in the lowest applied voltage on the C4 capacitor over the line voltage operating range. The FIG. 43 circuit extends the effective power range of the circuit of FIG. 41 by enabling the use of lower voltage mosfets with lower on resistance. Another feature of the FIG. 43 circuit is the integration of the two coupled inductors onto a single core with a single combined primary winding. This integration can be accomplished with the construction illustrated in FIG. 27.

Additional embodiments can be realized by adding secondary windings to each coupled inductor and associated switches, capacitors, and loads to extend the concept to multiple outputs. Another embodiment is realized by paralleling interleaved converters of the type shown in FIG. 28 which share input power source, input capacitor, reset capacitor, and output capacitors.

Additional embodiments of the power converter shown in FIG. 28 are realized by extending and altering the FIG. 28 embodiment in the same ways that the FIG. 4 embodiment was extended and altered.

Structure

Figure 44:
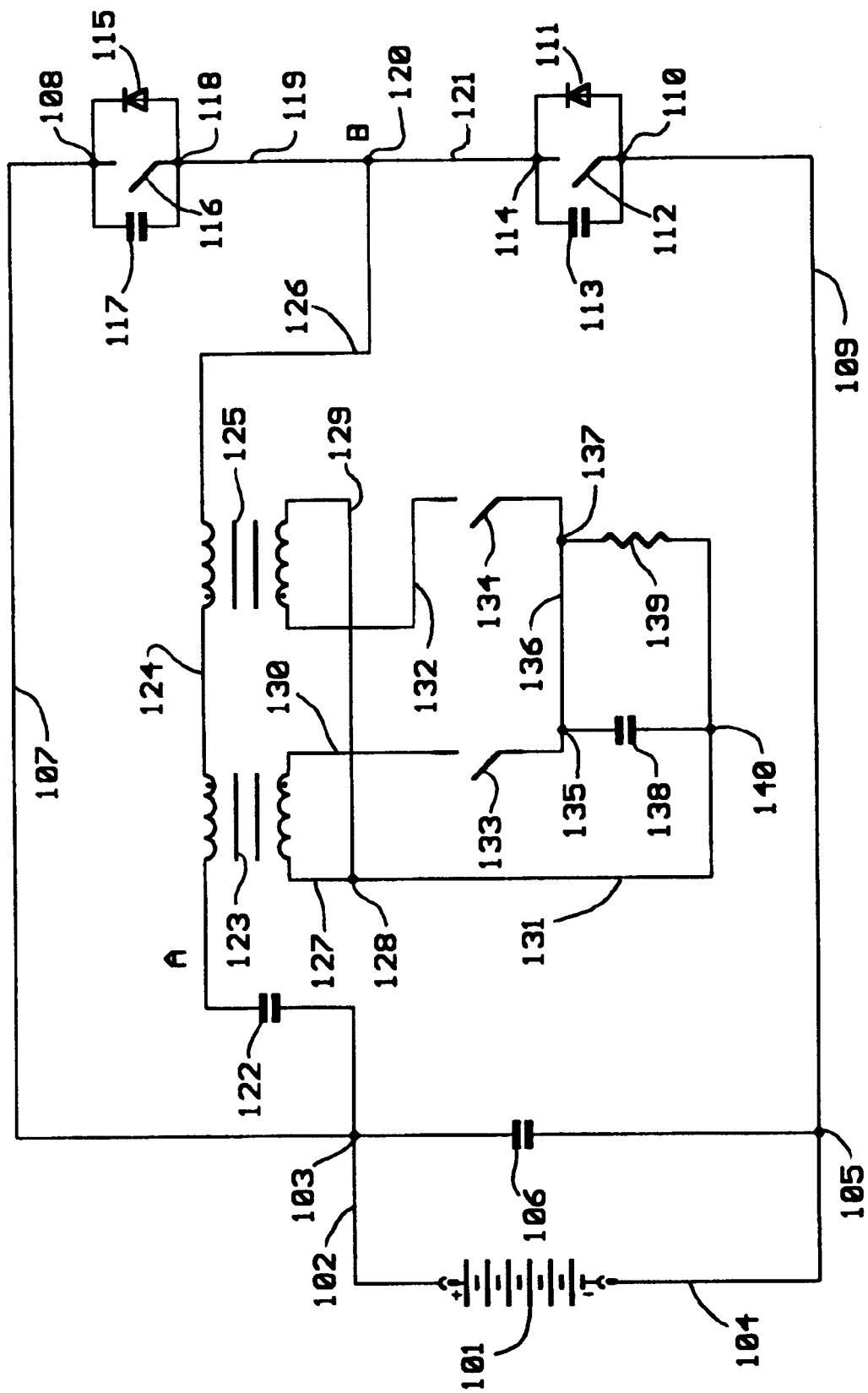
FIG. 44 illustrates a circuit schematic drawing of a soft switching, pulse width modulated, dual opposed interleaved coupled inductor buck converter according to the subject invention.

As shown in the circuit of FIG. 44, a positive terminal of DC input power source 101 is coupled, via a lead 102, to a node 103. Node 103 is connected to a first terminal of an input filter capacitor 106. A negative terminal of source 101 is connected, via a lead 104, to a node 105. Node 105 is connected to a second terminal of capacitor 106. Node 103 is connected to a first terminal of a coupling capacitor 122. A second terminal of capacitor 122 is connected to a first undotted terminal of a coupled inductor 123. Node 105 is connected to a node 110 via a lead 109. Node 110 is connected to an anode terminal of a diode 111 and to a first terminal of a switch 112 and to a first terminal of a capacitor 113. Diode 111, capacitor 113, and switch 112 form a first switch subcircuit. A node 114 is connected to a cathode terminal of diode 111, to a second terminal of switch 112, and to a second terminal of capacitor 113. Node 103 is connected, via a lead 107, to a node 108. Node 108 is connected to a cathode terminal of a diode 115, to a first terminal of a switch 116, and to a first terminal of a capacitor 117. Diode 115, capacitor 117, and switch 116 form a second switch subcircuit. A node 118 is connected to an anode terminal of diode 115, to a second terminal of switch 116, and to a second terminal of capacitor 117. Node 118 is connected to a node 120 via a lead 119. Node 114 is connected to node 120 via a lead 121. A dotted terminal of the primary winding of inductor 123 is connected to a dotted terminal of the primary winding of a coupled inductor 125 via a lead 124. An undotted terminal of the primary winding of inductor 125 is connected to node 120 via a lead 126. An undotted terminal of a secondary winding of inductor 123 is connected to a node 128 via a lead 127. An undotted terminal of a secondary winding of inductor 125 is connected to node 128 via a lead 129. A dotted terminal of the secondary winding of inductor 123 is connected to a first terminal of a switch 133 via a lead 130. A dotted terminal of the secondary winding of inductor 125 is connected to a first terminal of a switch 134 via a lead 132. A second terminal of switch 133 is connected to a node 135. A second terminal of switch 134 is connected to a node 137. Node 135 is connected to node 137 via a lead 136. Node 135 is connected to a first terminal of an output filter capacitor 138. Node 137 is connected to a first terminal of a load resistor 139. A second terminal of capacitor 138 is connected to a node 140. A second terminal of resistor 139 is connected to node 140. Node 140 is connected to node 128 via a lead 131. The dots on the primary and secondary windings of coupled inductors 123 and 125 indicate the polarity of the windings. The AC wave forms of the dotted terminals will be in phase with respect to each other for each inductor. The AC wave forms of the undotted terminals will be in phase with respect to each other for each inductor. The AC wave forms of the dotted terminals and the undotted terminals will be 180° out of phase or in opposite phase in comparison to each other for each coupled inductor.

Figure 45:
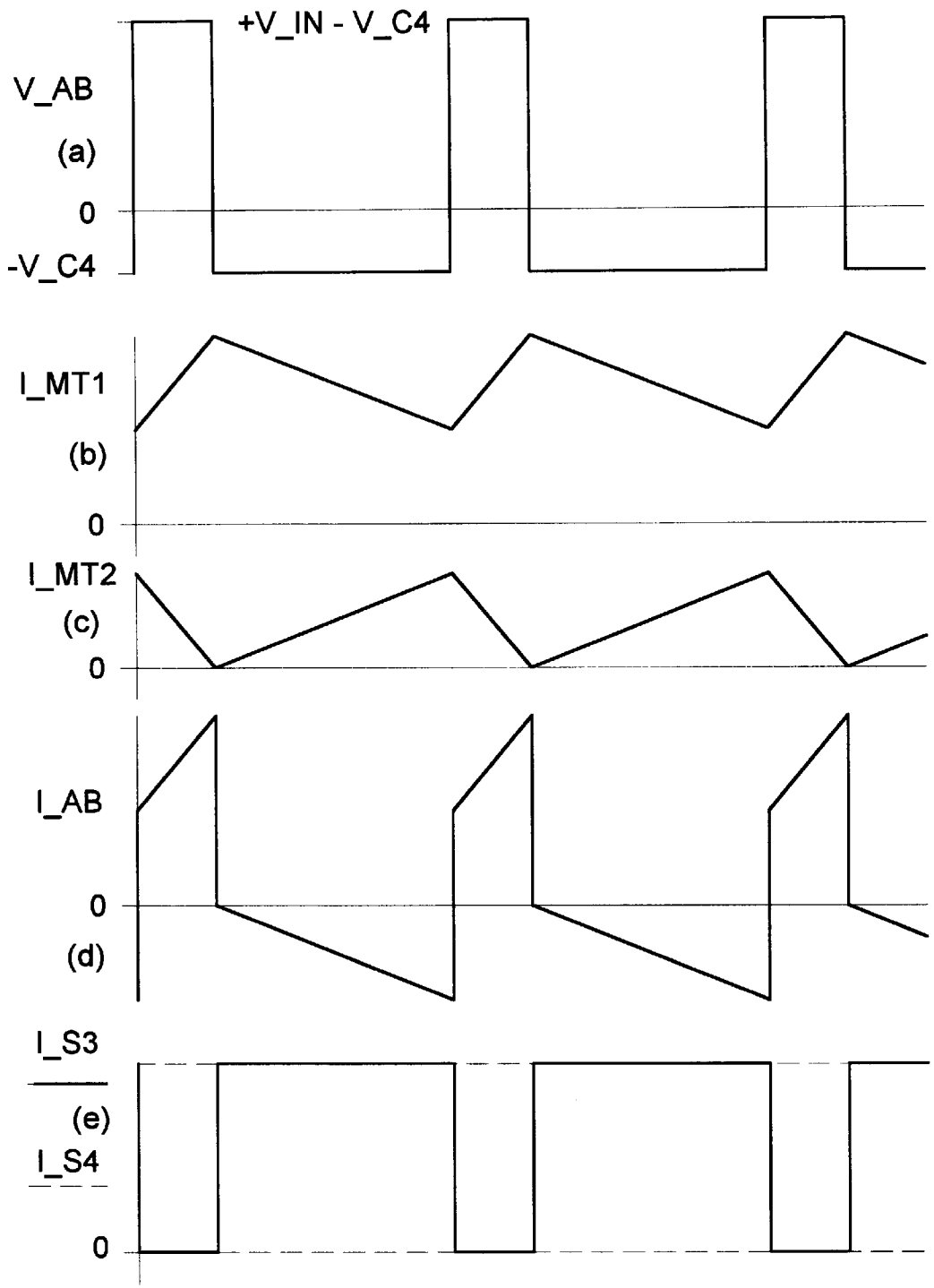
FIG. 45 illustrates operating wave forms of the FIG. 44 converter.

The primary switching network consisting of switches 112 and 116 converts the substantially DC input voltage, V_IN, of source 101, applied to this network to an AC wave form at its output terminals, labeled A and B in FIG. 44. The AC wave form, V_AB, is a stream of bi-directional pulses that alternate in polarity and are, generally, different in magnitude and duration, as illustrated by FIG. 45a. A conventional timing circuit (not shown) controls the duty cycles of the switches in order to accomplish output voltage regulation. The control circuit may be responsive to an external control signal or voltage reference, to an AC component of the DC input power source, to the output voltage, to the output current, to the current supplied by the DC input power source, to other physical parameters which may effect power converter or load operation, or to any combination of these physical parameters.

Operation

It is assumed in this analysis that the system has reached a settled operating condition. Except for the short, but finite, switching intervals there are two states of the circuit of FIG. 44, an on state and an off state. It is also assumed, for purpose of analysis, that the switching intervals between the states are approximately zero seconds in duration and that capacitors 113, and 117 are small and do not contribute significantly to the operation of the converter, except during the switching transitions.

Figure 46:
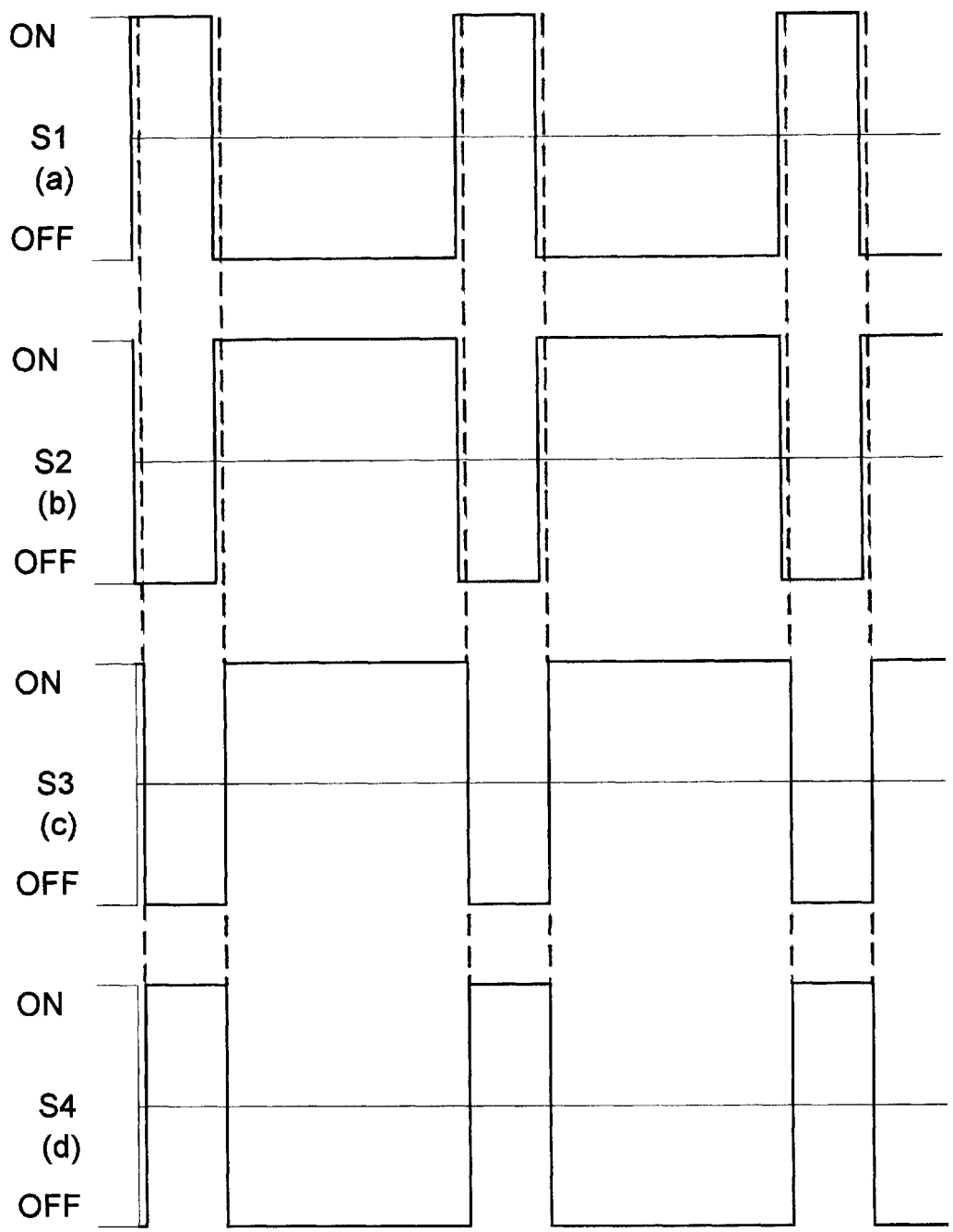
FIG. 46 illustrates the switch timing of the FIG. 44 converter.
Figure 47:
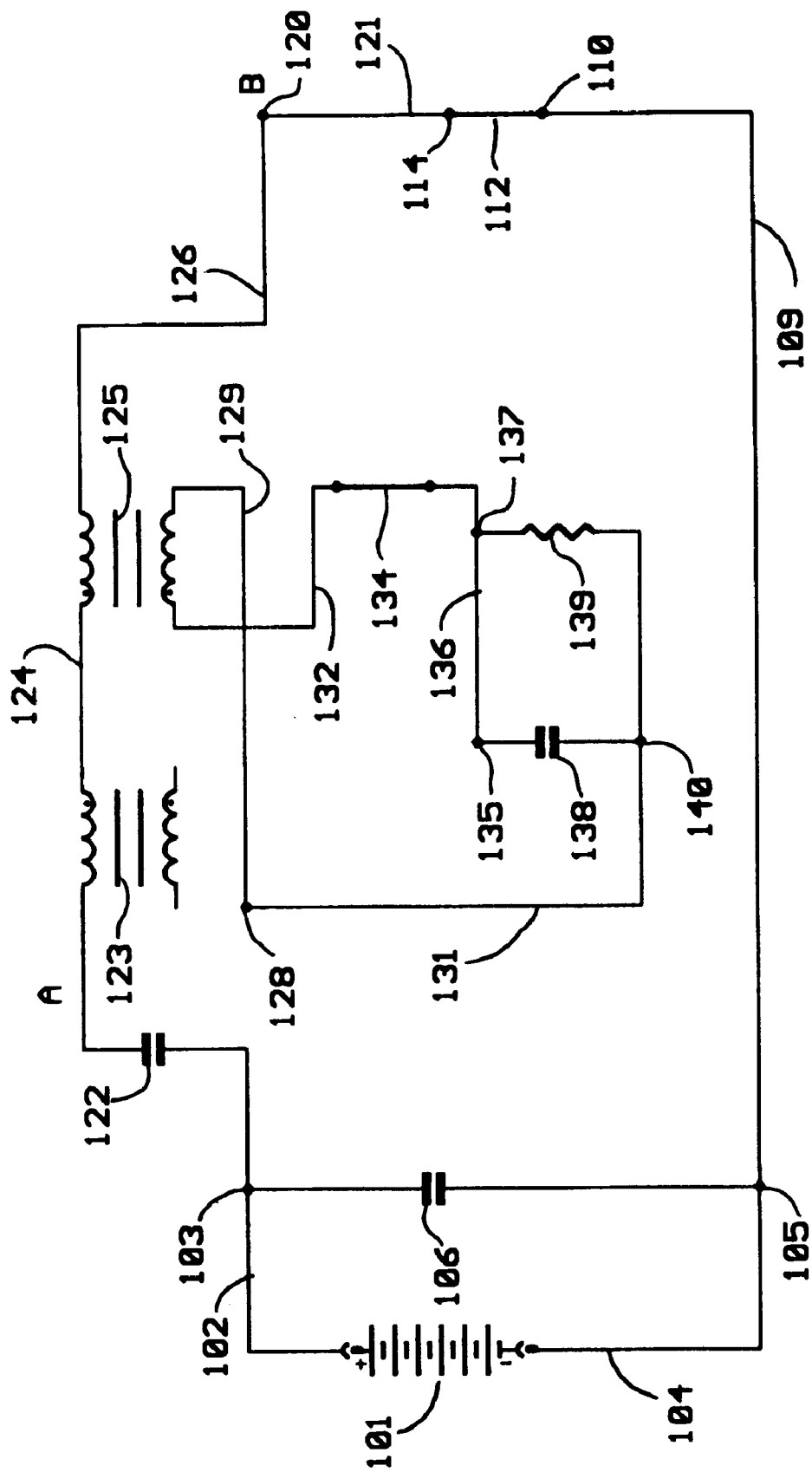
FIG. 47 illustrates an on state of the FIG. 44 converter.
Figure 48:
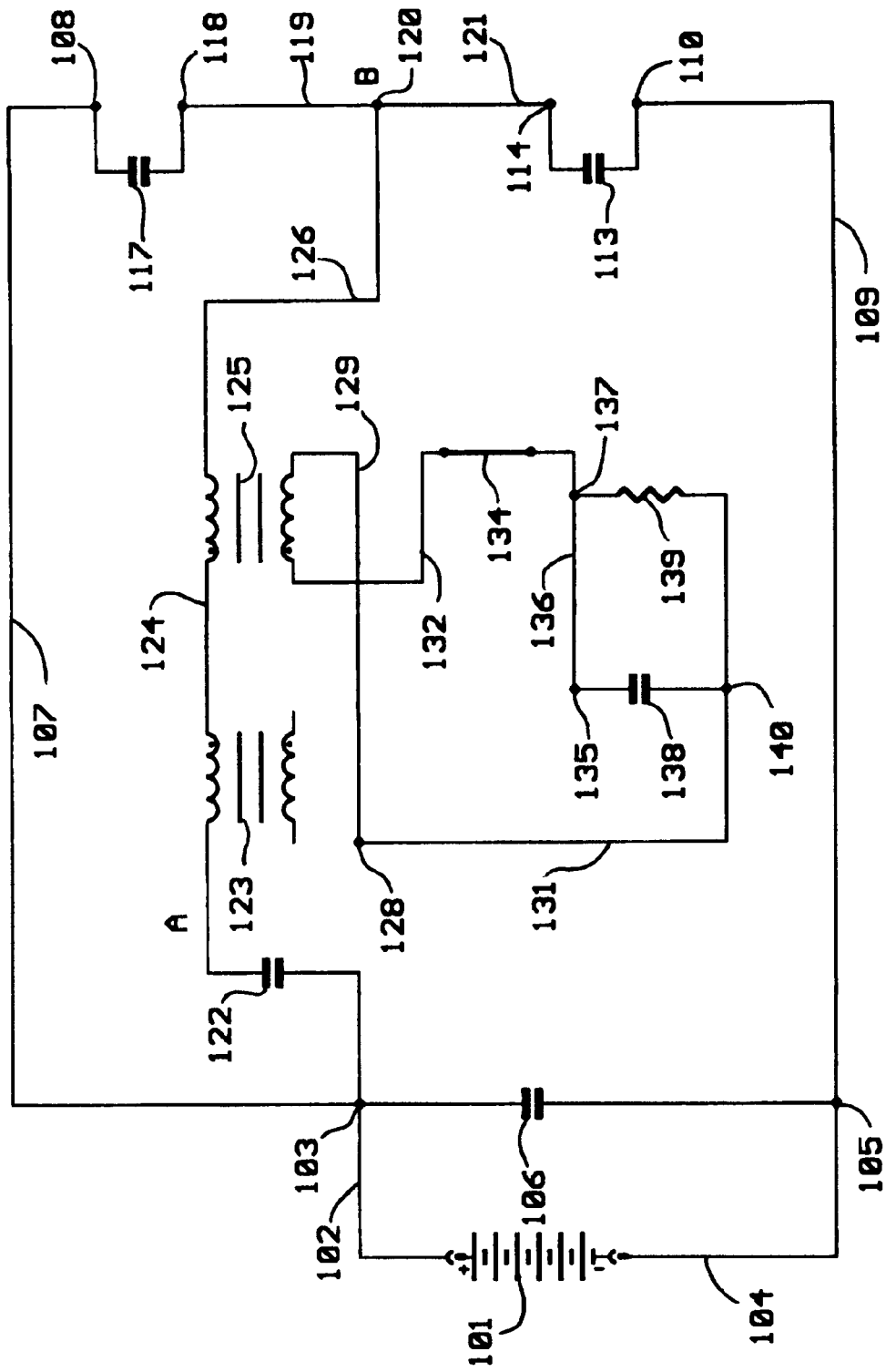
FIG. 48 illustrates a first phase of a turn off transition of the FIG. 44 converter.
Figure 49:
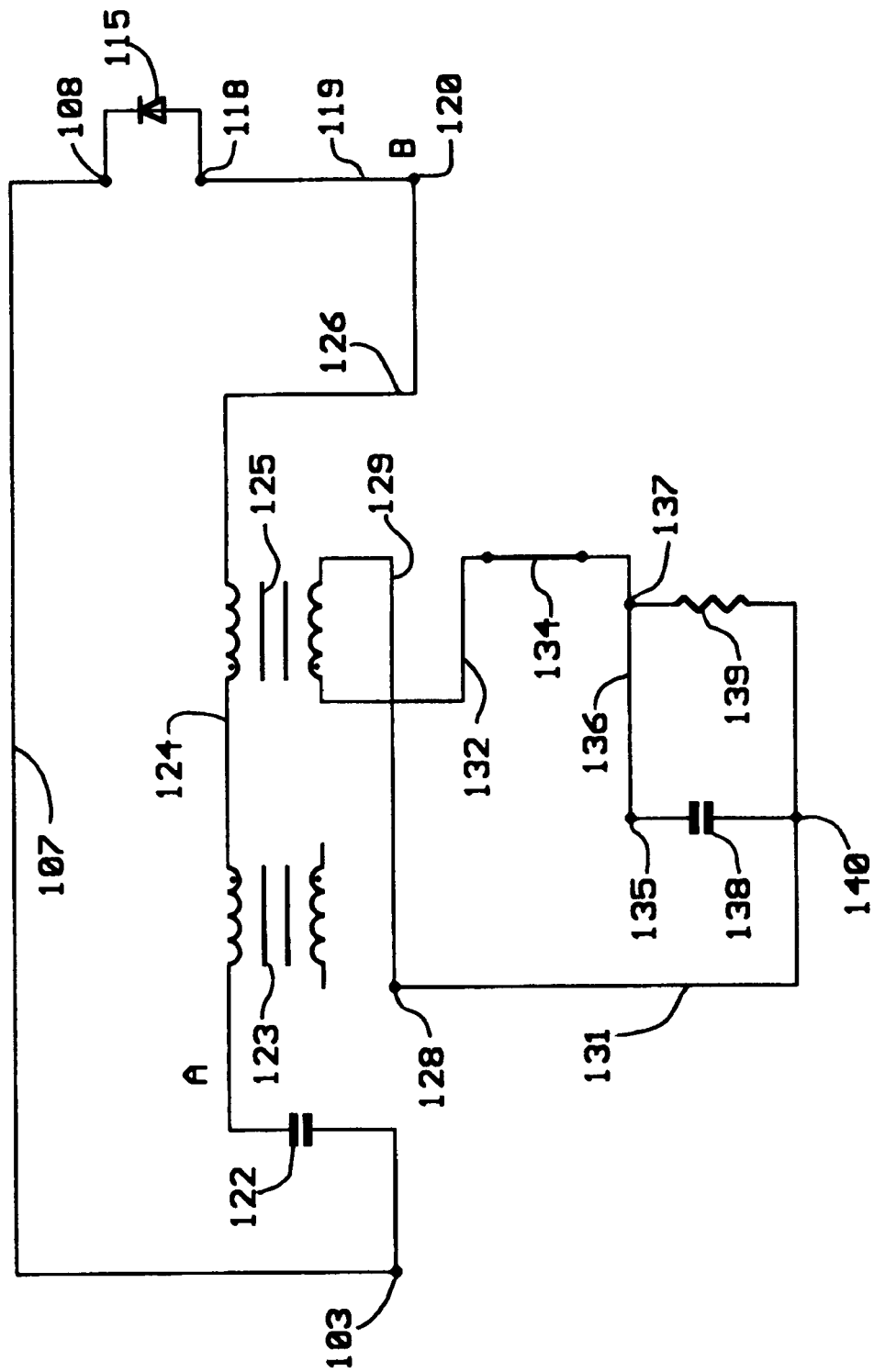
FIG. 49 illustrates a second phase of a turn off transition of the FIG. 44 converter.
Figure 50:
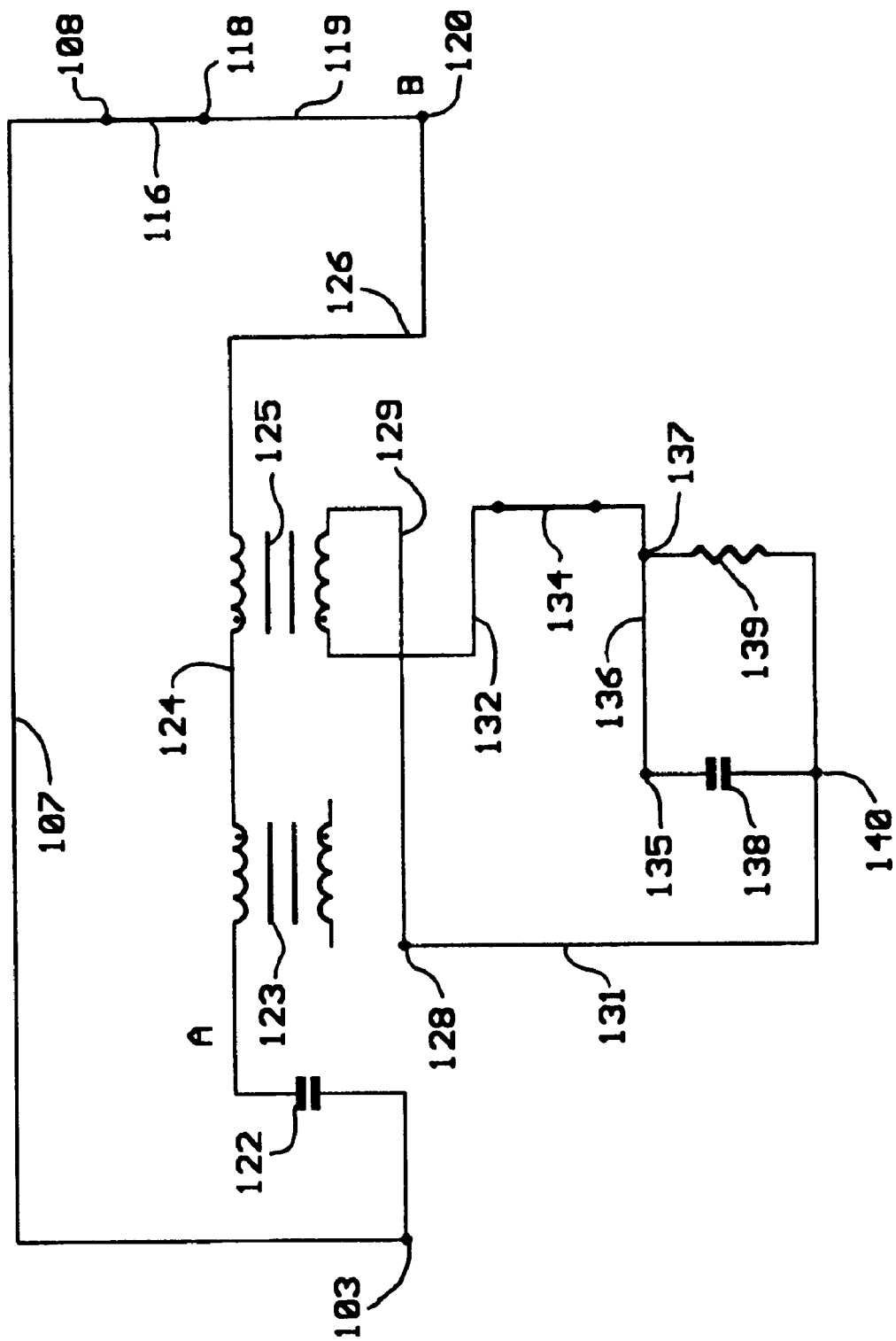
FIG. 50 illustrates a third phase of a turn off transition of the FIG. 44 converter.
Figure 51:
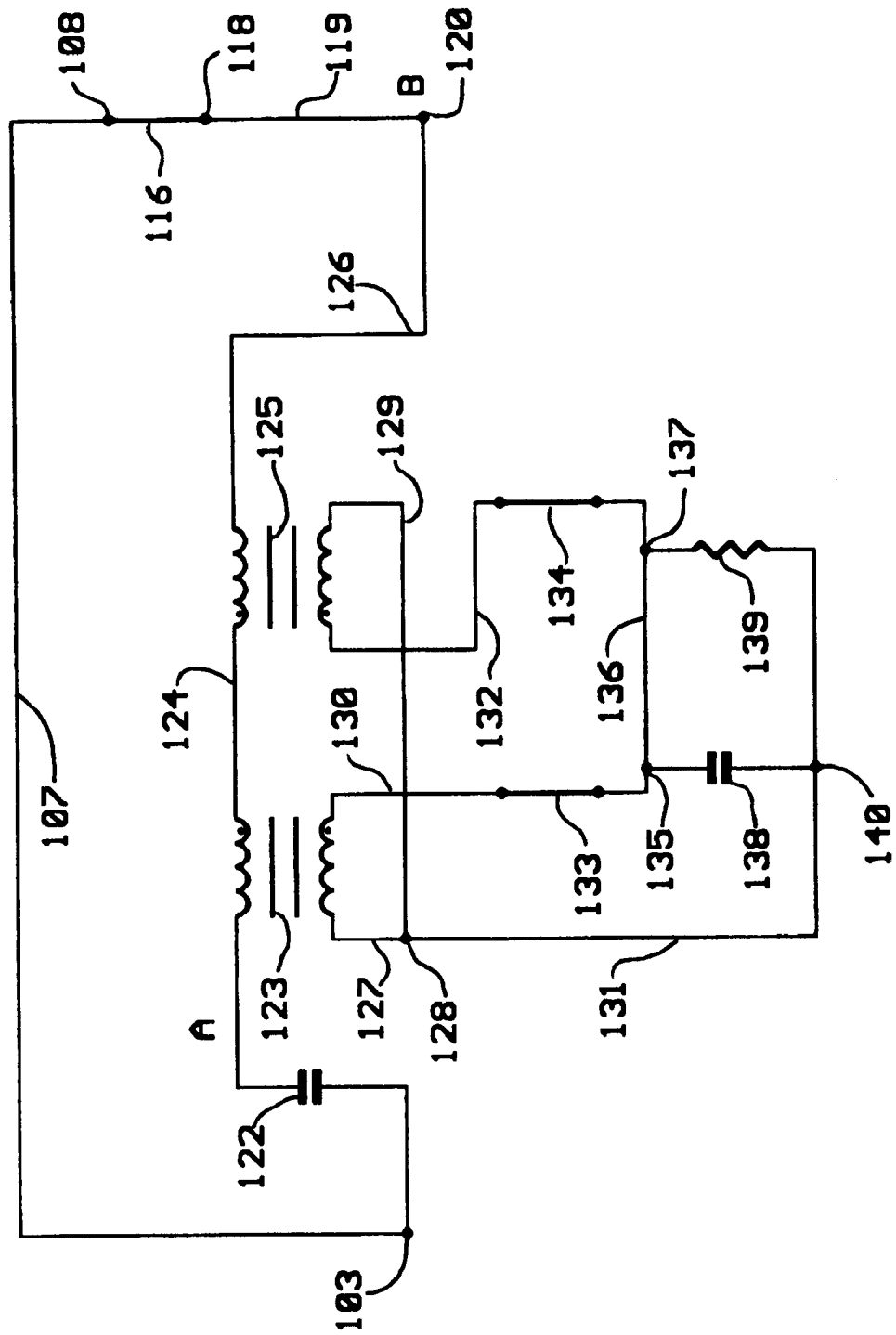
FIG. 51 illustrates a fourth phase of a turn off transition of the FIG. 44 converter.
Figure 52:
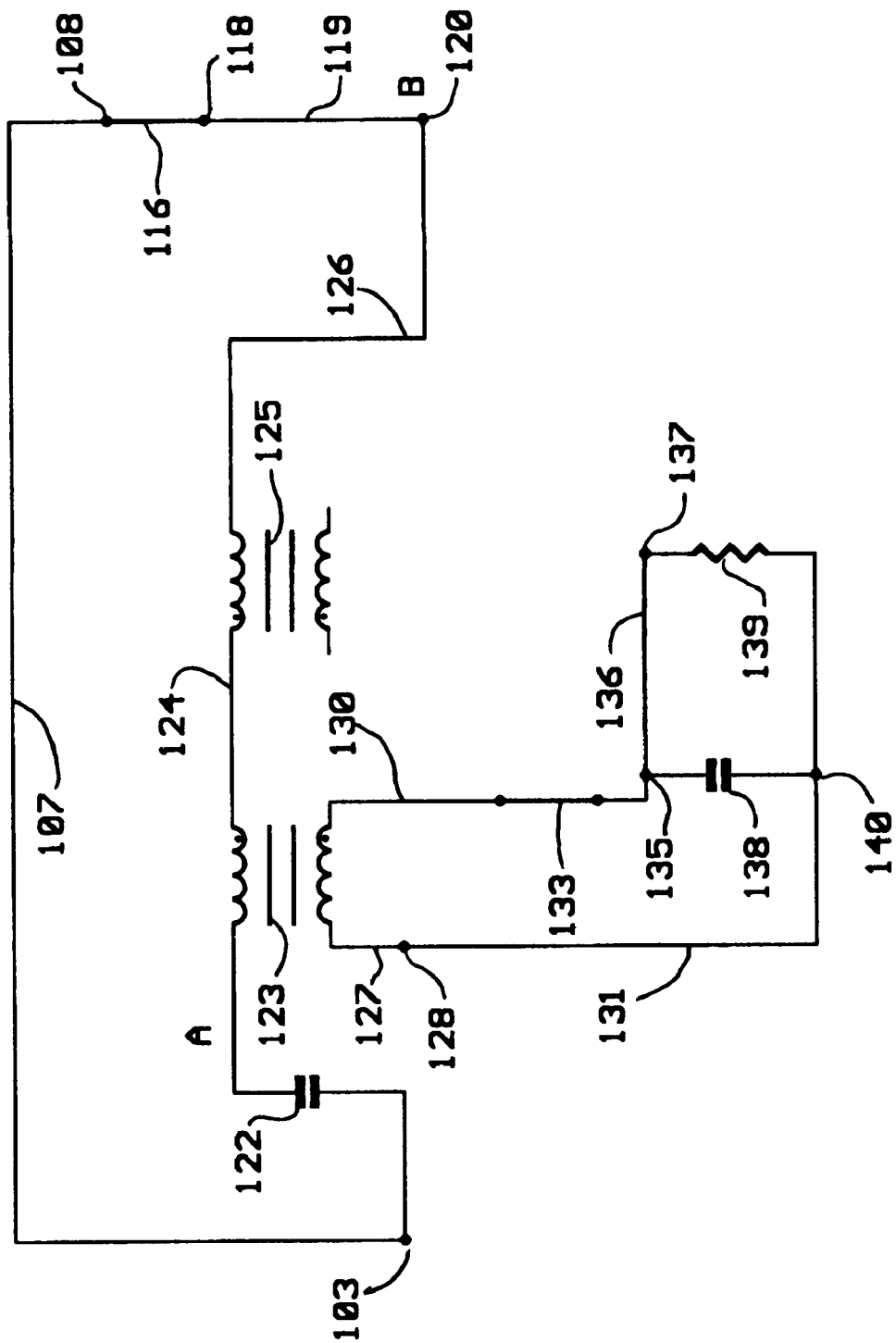
FIG. 52 illustrates an off state of the FIG. 44 converter.
Figure 53:
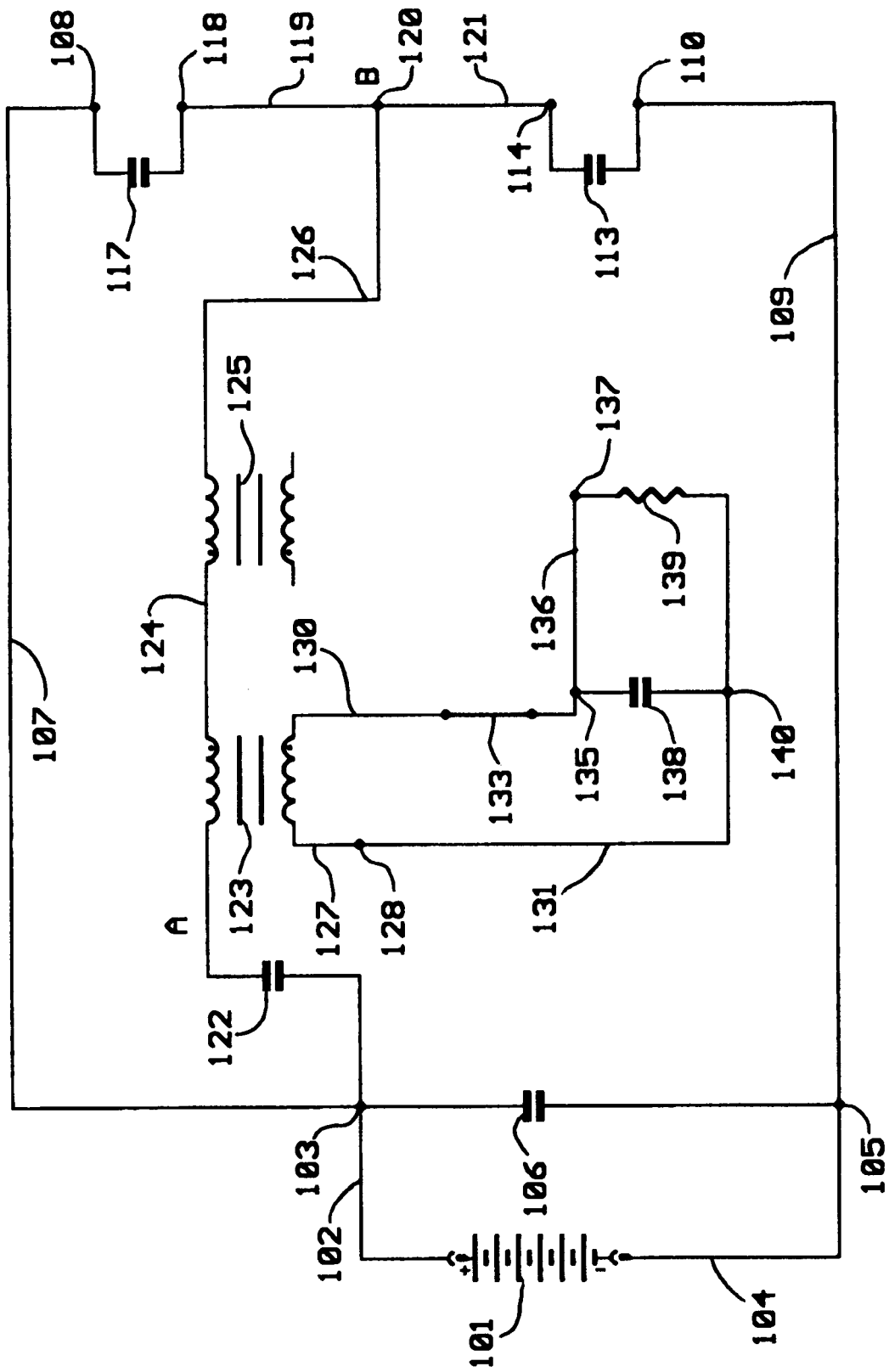
FIG. 53 illustrates a first phase of a turn on transition of the FIG. 44 converter.
Figure 54:
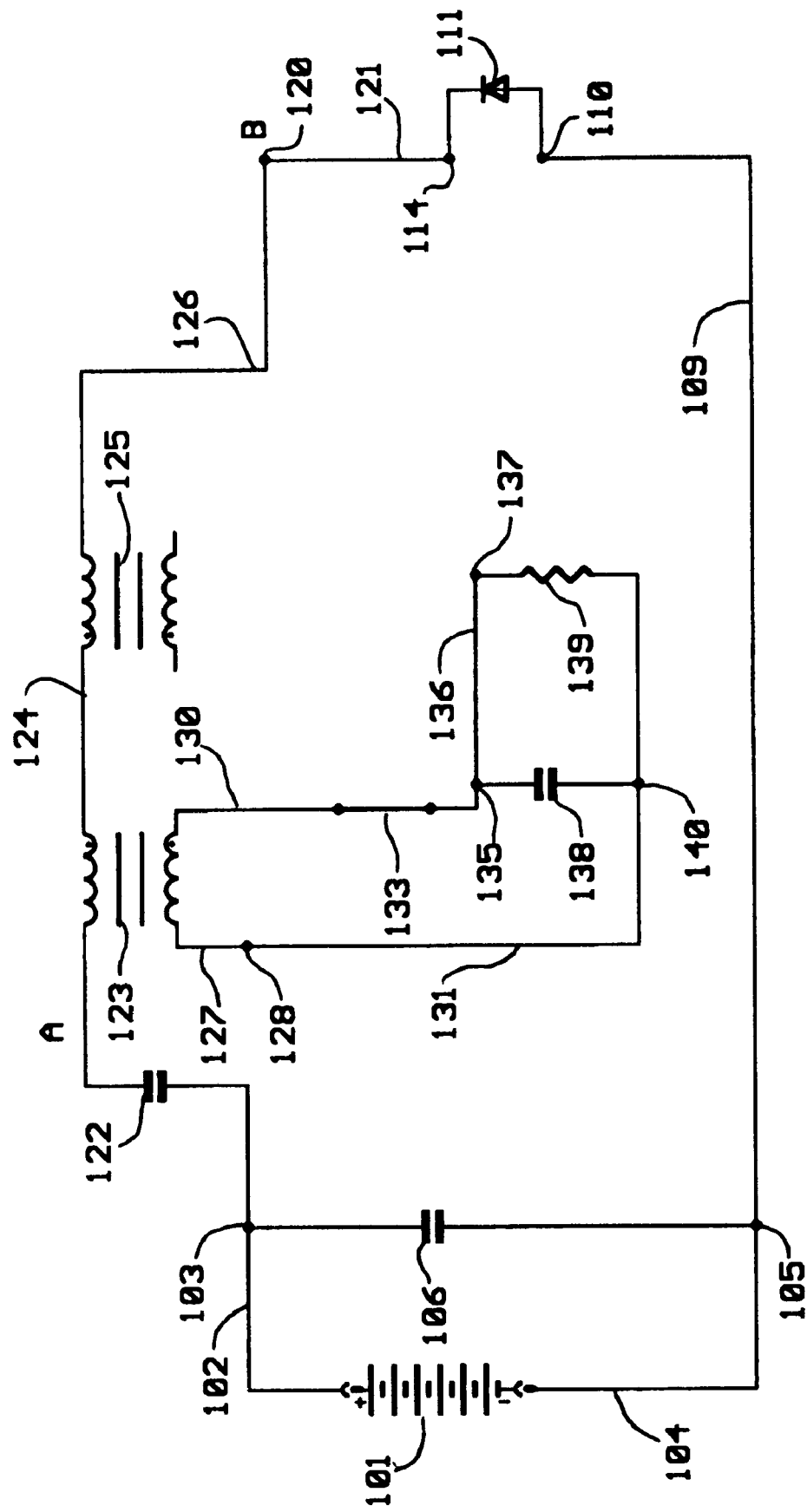
FIG. 54 illustrates a second phase of a turn on transition of the FIG. 44 converter.
Figure 55:
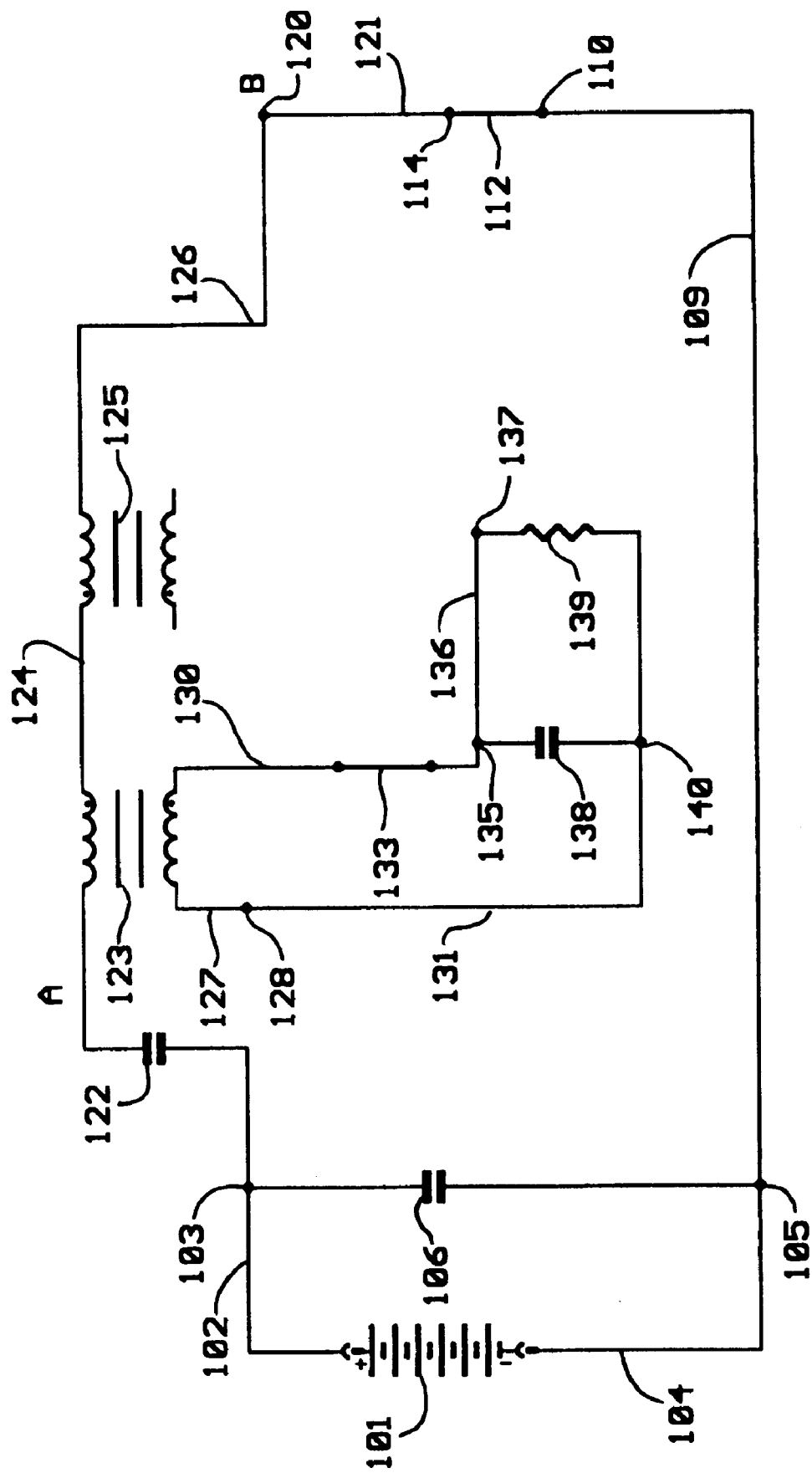
FIG. 55 illustrates a third phase of a turn on transition of the FIG. 44 converter.
Figure 56:
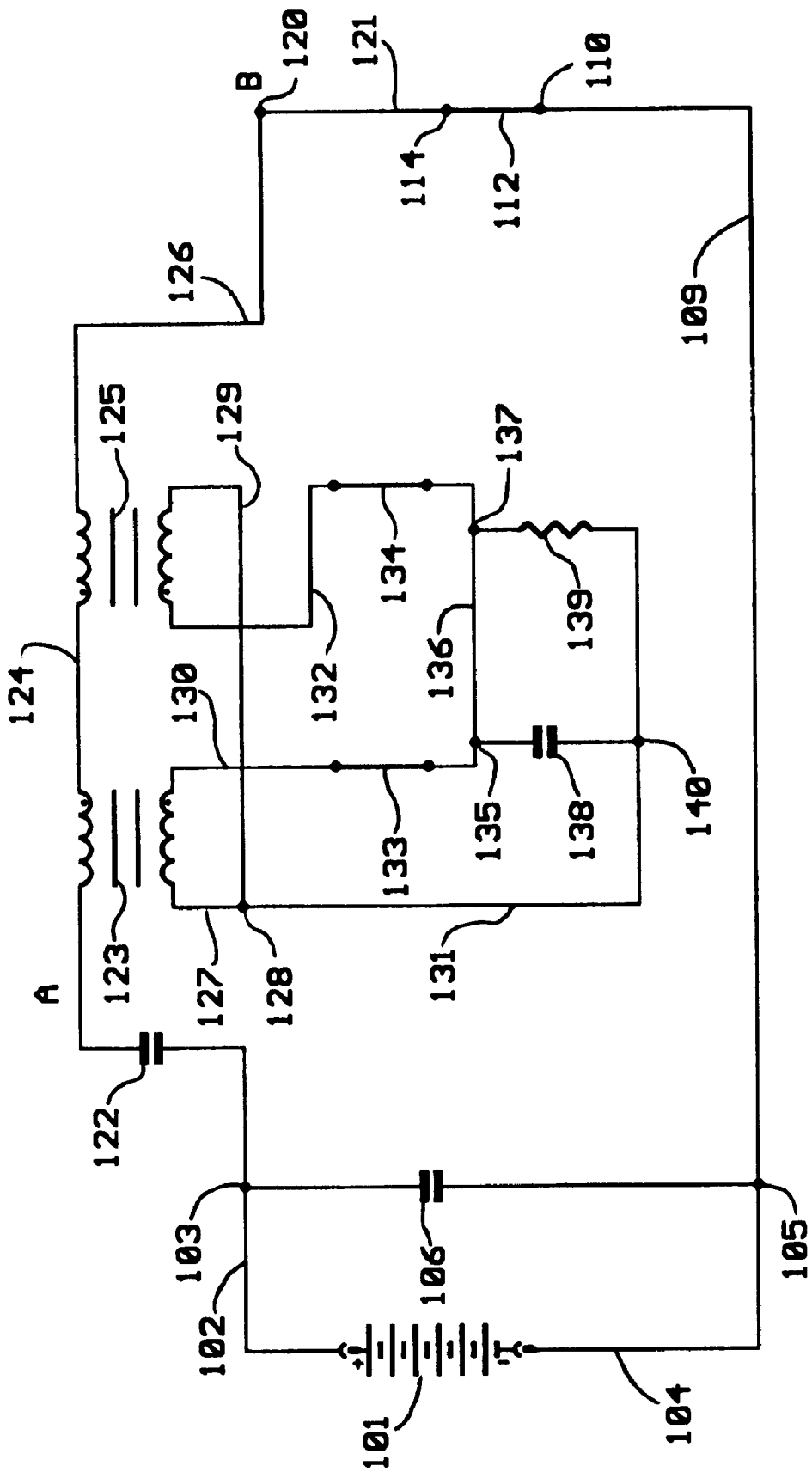
FIG. 56 illustrates a fourth phase of a turn on transition of the FIG. 44 converter.

In operation consider an initial condition, illustrated in FIG. 47, in which the voltage difference between points A and B, labeled V_AB in FIG. 45a, is equal to the voltage of source 101, V_IN, minus the voltage applied to capacitor 122 and primary winding current is flowing from left to right or from A to B. The current flowing in the primary windings of inductors 123 and 125, labeled I_AB in FIG. 45d, is positive. During this initial condition, switch 112 is closed (on), switch 116 is open (off), switch 134 is closed (on), and switch 133 is open (off). During this initial condition inductor 123 has a substantial amount of stored energy. During this initial condition inductor 125 also has a substantial amount of stored energy but, in general, the stored energy in inductor 125 will be less than the stored energy in inductor 123. Let us define that the magnetizing current is flowing in a positive direction when the current flows from the undotted terminal through the winding to the dotted terminal. For inductor 123, during the initial condition, the secondary current is zero and the primary current is equal to its magnetizing current and the magnetizing current, referred to the primary winding, of inductor 123, labeled I_MT1 in FIG. 45b, is positive, since the current is flowing through its primary winding from the undotted terminal of its primary winding to the dotted terminal of its primary winding. During the initial condition, the current I_AB is equal in magnitude and direction to the magnetizing current, referred to the primary winding, of inductor 123. During the initial condition, capacitor 122 is being charged by the current I_AB. During the initial condition, the magnetizing current, referred to the primary winding, of inductor 125 is decreasing and positive. The total current in the primary winding of inductor 125 is equal to the current I_AB. There are two components of the secondary winding current of inductor 125. One component of the secondary winding current of inductor 125 is the magnetizing current, referred to the secondary winding, and the other component is the induced current from the primary winding of inductor 125. The induced current component of the secondary winding current of inductor 125 is equal to the current flowing in the primary winding of inductor 125 multiplied by the ratio of the primary winding turns to the secondary winding turns of inductor 125. During the initial condition the secondary winding voltage of inductor 125 is equal to the output voltage and the primary winding voltage of inductor 125 is equal to the inductor 125 secondary winding voltage multiplied by the ratio of the primary winding turns to the secondary winding turns of inductor 125. The primary winding voltage of inductor 123 is equal to the voltage of source 101 minus the primary winding voltage of inductor 125 minus the voltage of capacitor 122. During the initial condition the energy in inductor 123 increases. At a time determined by the control circuit the primary switching network changes state, so that switch 112 is opened, as illustrated in FIG. 48. The stored energy in inductor 123 maintains the primary winding current, which is flowing from A towards B, and forces charge into capacitor 113 and into capacitor 117, as illustrated in FIG. 48. The voltage at node 120 rises as capacitor 113 charges and capacitor 117 discharges. When the voltage at node 120 reaches the voltage at node 103, diode 115 begins to conduct, as illustrated in FIG. 49. Soon after diode 115 begins to conduct, switch 116 is closed (turned on), as illustrated in FIG. 50. Soon after switch 116 is closed, switch 133 is closed, as illustrated in FIG. 51. During the brief time that switches 133 and 134 are closed the output current rapidly transfers from switch 134 to switch 133. During this brief time the primary current is also rapidly changing as the primary current changes in value from the magnetizing current of inductor 123 to the magnetizing current of inductor 125. The secondary switch timing is critical and is illustrated in FIG. 46. When the current in switch 134 reaches zero, switch 134 is opened (turned off), as illustrated in FIG. 52. The system is now in the off state. During the off state the magnetizing current in inductor 125 increases in magnitude, as illustrated in FIG. 45c. By examining FIG. 52 one can see that the voltage on capacitor 122 is equal to the sum of the primary winding voltages of inductors 123 and 125. The voltage on the secondary winding of inductor 123 is equal to the converter's output voltage. The voltage on the primary winding of inductor 123 is equal to the output voltage times the ratio of the primary winding turns to the secondary winding turns of inductor 123. The primary winding voltage of inductor 125 is equal to the voltage of capacitor 122 minus the primary winding voltage of inductor 123. The voltage applied to the primary winding of inductor 125 is directed so that the magnetizing current in inductor 125 increases. At a time determined by the control circuit, switch 116 is opened (turned off). When switch 116 is turned off the energy stored in inductor 125 maintains the primary winding current, which is now flowing from B towards A, charging capacitor 117 and discharging capacitor 113, as illustrated in FIG. 53. The voltage at node 120 drops during this time, until the voltage at node 120 reaches the voltage at node 105, at which time diode 111 becomes forward biased, as illustrated in FIG. 54. Shortly after diode 111 begins to conduct, switch 112 is closed (turned on), as illustrated in FIG. 55. Shortly after switch 112 is closed, switch 134 is closed, as illustrated in FIG. 56. The timing of switch 134 is critical to the operation of this invention. If switch 134 is allowed to close (turn on) prior to the close (turn on) of switch 112, then zero voltage switching would not be possible, since the magnetizing current and stored energy in inductor 123 would oppose the current that drives the transition. Without the delay in switch 134 timing, switch 112 would turn on with simultaneous significant applied voltage and significant current in switch 112 and would thereby incur substantial switching losses. While switches 133 and 134 are closed, current transfers rapidly from switch 133 to switch 134, as the current in the primary windings of inductors 123 and 125 rapidly changes sign and value from the magnetizing current of inductor 125 to the magnetizing current of inductor 123, as shown in FIG. 45d and FIG. 45e. When the current in switch 133 has dropped to zero, switch 133 is opened (turned off), as illustrated in FIG. 47, which also illustrates the initial condition. The initial condition is the on state of the converter. At this point a full cycle of operation has been completed and the initial conditions are again established. During the full operating cycle, both of the primary switches were turned on and turned off at substantially zero voltage, eliminating first order switching losses for the two primary switches.

In the steady state the volt second product must add up to zero for any winding for a complete cycle, which is a way of expressing the fact that the average winding voltage is zero in the steady state. This fact can be used to calculate the transfer function for the converter. Let D represent the fraction of a cycle that the system is in the on state. Since the time average voltage across a coupled inductor winding must be zero in the steady state, for the inductor 123 primary winding, the volt second product sum for one cycle can be expressed as:

$$\left(V_{IN} - V_{C4} - V_{OUT} \cdot \frac{N_{P2}}{N_{S2}}\right) \cdot D \cdot T - V_{OUT} \cdot \frac{N_{P1}}{N_{S1}} \cdot (1-D) \cdot T = 0, \quad (33)$$

where $V_{IN}$ is the voltage of source 101, $V_{C4}$ is the applied voltage on capacitor 122, $N_{P2}$ is the number of primary winding turns of inductor 125, $N_{S2}$ is the number of secondary winding turns of inductor 125, $V_{OUT}$ is the converter output voltage, T is the period of a complete switching cycle, $N_{P1}$ is the number of primary winding turns of inductor 123, and $N_{S1}$ is the number of secondary winding turns of inductor 123. The volt second product sum for the primary winding of inductor 125 for one cycle can be expressed as:

$$\left(V_{C4} - V_{OUT} \cdot \frac{N_{P1}}{N_{S1}}\right) \cdot (1-D) \cdot T - V_{OUT} \cdot \frac{N_{P2}}{N_{S2}} \cdot D \cdot T = 0. \quad (34)$$

Solving (33) and (34) for $V_{C4}$ and $V_{OUT}$ we get:

$$V_{C4} = D \cdot V_{IN} \quad (35)$$

and $$V_{OUT} = \frac{D \cdot (1-D) \cdot V_{IN}}{D \cdot \frac{N_{P2}}{N_{S2}} + (1-D) \cdot \frac{N_{P1}}{N_{S1}}}. \quad (36)$$

For the case in which the two coupled inductors have the same turns ratios $$V_{OUT} = D \cdot (1-D) \cdot V_{IN} \cdot \frac{N_{S1}}{N_{P1}}. \quad (37)$$

The transfer function indicated by (37) has a maximum value at $$D = \frac{1}{2}.$$

The output voltage is zero for both minimum and maximum duty cycle. Because of this behavior, the converter would typically be operated in the range of $$D = \frac{1}{4}$$

and the operating range near $$D = \frac{1}{2}$$

would be avoided, because the control to output voltage gain goes to zero at $$D = \frac{1}{2}.$$

If we assume that the converter is lossless and that the magnetizing inductances of inductors 123 and 125 are very large, so that the magnetizing currents of inductors 123 and 125 are invariant over a switching cycle then we can say that $$V_{OUT} \cdot I_{OUT} = V_{IN} \cdot I_{MT1} \cdot D \quad (38)$$

where $I_{MT1}$ is the magnetizing current in inductor 123. Since the net current into capacitor 122 must be zero over a full switching cycle we can say that $$I_{MT1} \cdot D - I_{MT2} \cdot (1-D) = 0 \quad (39).$$

If we use (36) and (38) to solve for $I_{MT1}$ and eliminate $V_{OUT}$ we get $$I_{MT1} = \frac{I_{OUT} \cdot (1-D)}{D \cdot \frac{N_{P2}}{N_{S2}} + (1-D) \cdot \frac{N_{P1}}{N_{S1}}}. \quad (40)$$

Combining (39) and (40) and solving for $I_{MT2}$ we get $$I_{MT2} = \frac{I_{OUT} \cdot D}{D \cdot \frac{N_{P2}}{N_{S2}} + (1-D) \cdot \frac{N_{P1}}{N_{S1}}}. \quad (41)$$

We can see from (40) and (41) that if we operate in the low duty cycle range, where $$D \approx \frac{1}{4},$$

then $I_{MT1} \approx 3 \cdot I_{MT2}$, so that the bulk of the converter's stored magnetic energy is contained within inductor 123.

For both the on state and the off state the output ripple current has an increasing component and a decreasing component, neither of which is dominant for all conditions in terms of the ripple slope. There is a condition for which the components of the output current will yield a net zero slope, so that the AC component of the output ripple current is zero. Consider the on state where the secondary winding of inductor 125 is providing current to the output. The secondary winding current of inductor 125 will have two components, an increasing component due to the increasing primary winding current, which is equal to the magnetizing current in inductor 123, and a decreasing component equal to the decreasing magnetizing current of inductor 125. The time rate of change of the component due to the magnetizing current of inductor 123 is:

$$\frac{d\, I_{MT1}}{dt} = \frac{\left(V_{IN} - V_{C4} - V_{OUT} \cdot \frac{N_{P2}}{N_{S2}}\right)}{L_{P1}}. \tag{42}$$

The time rate of change of the component due to the magnetizing current of inductor 125 is:

$$\frac{d\, I_{MT2}}{dt} = -\frac{V_{OUT} \cdot \frac{N_{P2}}{N_{S2}}}{L_{P2}}. \tag{43}$$

If we add (42) and (43) and set the sum equal to zero and solve for D we will have the duty cycle for which the output ripple is zero. We get:

$$D_{ZERO\ RIPPLE} = \frac{L_{P2}}{L_{P2} + L_{P1} \cdot \frac{N_{S1} \cdot N_{P2}}{N_{S2} \cdot N_{P1}}}. \tag{44}$$

If the two coupled inductors are identical then the duty cycle for which the ripple is zero is 50%. Since the converter would not likely ever be operated at a duty cycle of 50%, either the turns ratios or the inductances must be altered to obtain the zero ripple condition. If the turns ratios of the two inductors are equal and inductor 125 has a primary inductance equal to one third of the primary inductance of inductor 123, then the zero ripple duty cycle will be 25%.

Related Embodiments

Figure 57:
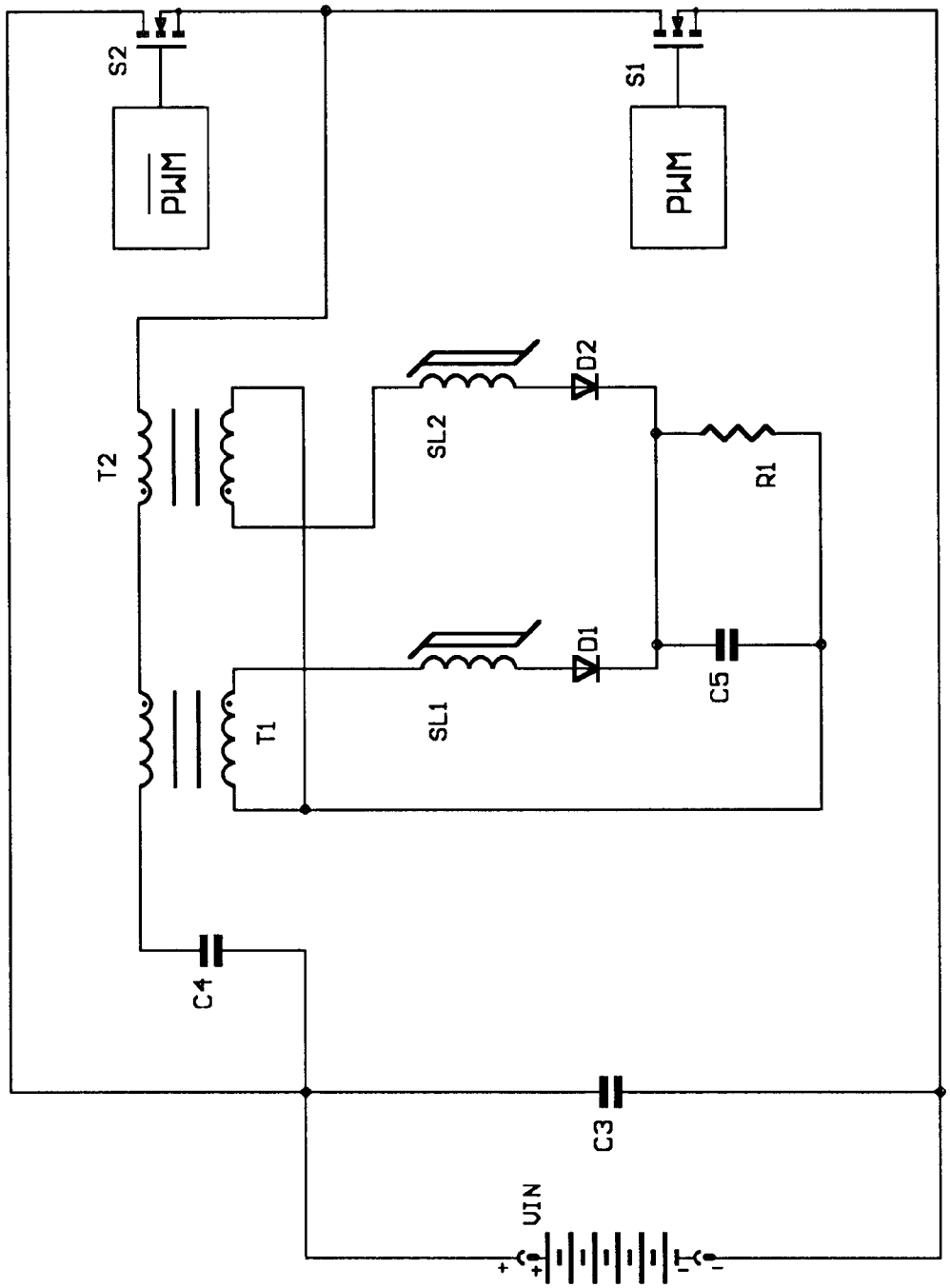
FIG. 57 illustrates an embodiment of the FIG. 44 converter in which the primary switches are implemented with power mosfets and the secondary switches are implemented with diodes and the necessary switch delay timing is provided by saturable core inductors placed in series with secondary diodes.

Another embodiment of the invention is shown in FIG. 57. Here the primary switch subcircuits are implemented with power mosfets and each secondary switch is implemented with a series combination of a diode and a saturable core inductor to provide the necessary brief time delays at turn on.

Figure 58:
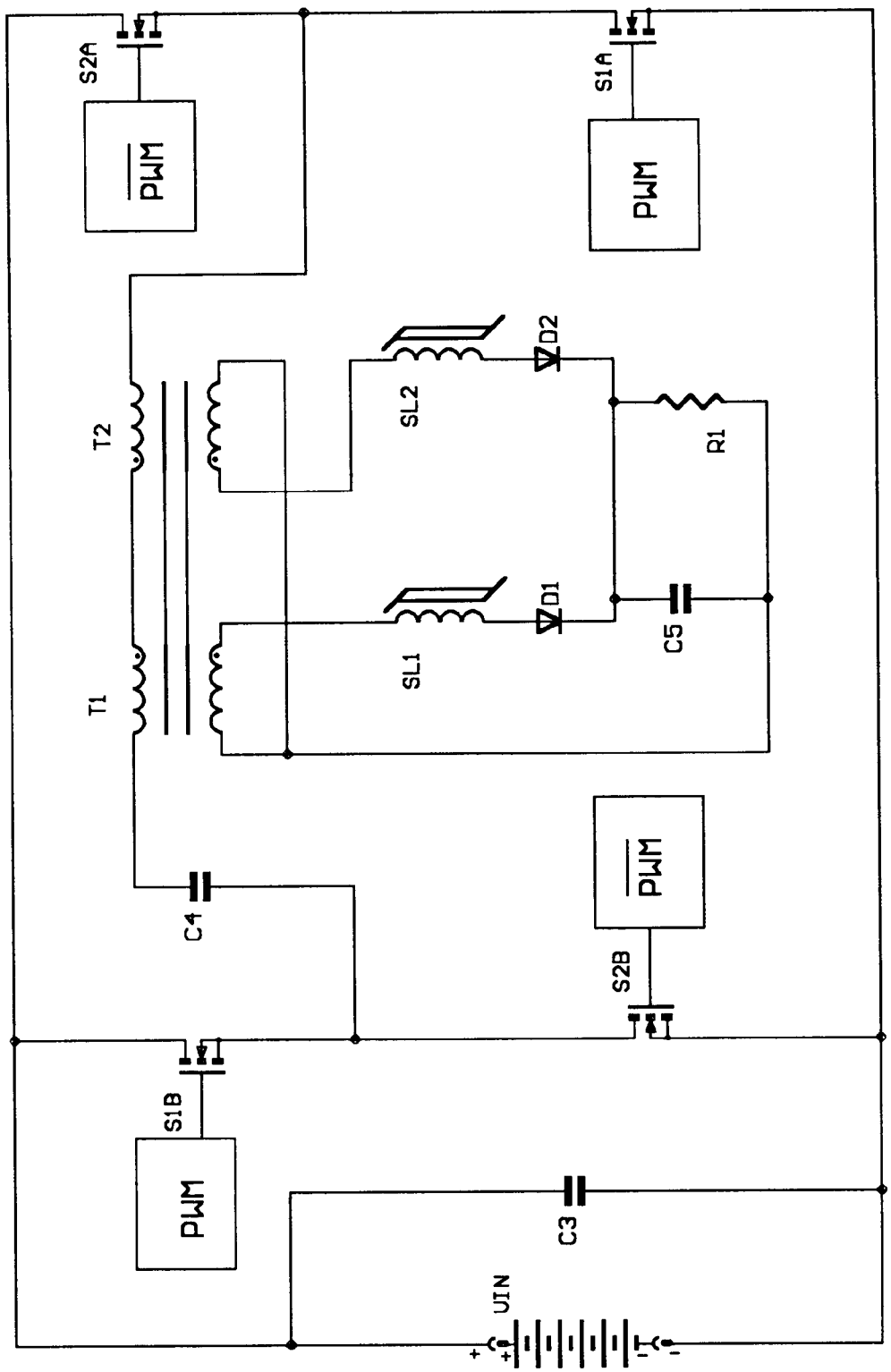
FIG. 58 illustrates an embodiment of the FIG. 44 converter in which a second pair of switches is added that doubles the effective input voltage and enables power input during both on and off states thereby extending the useful power range of the converter and with an integrated magnetic in which the two coupled inductors are wound on a single core, as illustrated in FIG. 25.

Another embodiment is shown in FIG. 58. The FIG. 58 embodiment is similar to the FIG. 57 embodiment, except that an additional pair of power mosfets have been added. This addition of the two mosfets results in an effective doubling of the input DC source voltage. Also, power can now be delivered to the circuit from the input DC voltage source during both the on state and the off state. The operating equations developed above all apply to this circuit with the following exceptions: 1) The term $V_{IN}$ must be replaced with the term $2 \cdot V_{IN}$ in each equation except equation (35), and 2) equation (35) becomes $V_{C4}=V_{IN} \cdot (2 \cdot D-1)$. The circuit of figure 58 is attractive because it can extend the power range of the FIG. 44 circuit. Another feature of the FIG. 58 embodiment is that the two coupled inductors are integrated onto a single magnetic core structure. This integration can be accomplished with the winding arrangement illustrated in FIG. 25.

Figure 59:
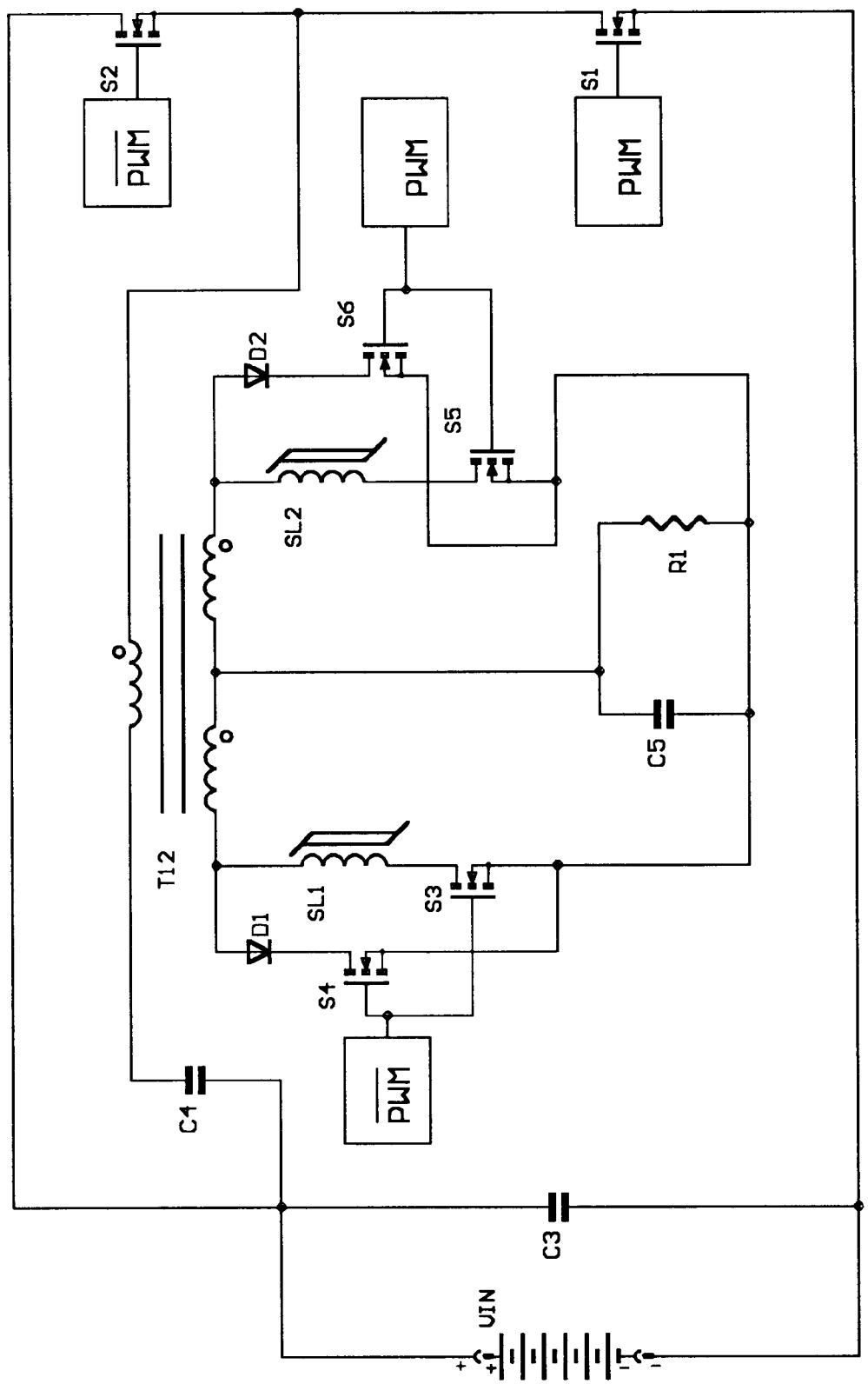
FIG. 59 illustrates the circuit of FIG. 57 with the secondary switches implemented with power mosfets that accomplish synchronous rectification and bi-directional power flow and with an integrated magnetic in which the two coupled inductors are wound on a single core with a single primary winding, as illustrated in FIG. 27.

Another related embodiment is shown in FIG. 59. The FIG. 59 circuit is similar to the FIG. 57 circuit except that the secondary switches are implemented using power mosfets or synchronous rectifiers. S3 and S5 are the synchronous rectifiers in the FIG. 59 circuit. There is also a mechanism provided for bi-directional current flow. The power mosfets S4 and S6 enable reverse power flow. The diodes D1 and D2 are necessary to prevent current from bypassing the saturable core inductors during the switching transitions. Without the D1 and D2 diodes soft switching would not be achieved. Another feature of the FIG. 59 embodiment is that the two coupled inductors are integrated onto a single magnetic core structure with a single combined primary winding. This integration can be accomplished with the winding arrangement illustrated in FIG. 27.

Additional embodiments are realized by adding converter outputs. Additional converter outputs can be added by adding secondary windings to each coupled inductor, secondary switches for each secondary winding, output capacitors, and loads for each additional output. Another embodiment is realized by paralleling interleaved converters, of the type shown in FIG. 44, which share input power source, input capacitor, coupling capacitor, and output capacitor.

Additional embodiments of the power converter shown in FIG. 44 are realized by extending and altering the FIG. 44 embodiment in the same ways that the FIG. 4 and FIG. 28 embodiments were extended and altered.

CONCLUSION, RAMIFICATIONS, AND SCOPE
OF INVENTION

Thus the reader will see that the power converters of the invention provide a mechanism which significantly reduces switching losses, has low component parts counts, and does not require high core losses or high conduction losses to accomplish zero voltage switching, relying on the energy stored in magnetic circuit elements that are integral to the converter and a unique and novel delayed switching action to enable the use of the integral stored magnetic energy.

While my above description contains many specificities, these should not be construed as limitations on the scope of the invention, but rather as exemplifications of preferred embodiments thereof. Many other variations are possible. For example, other variations include power converters with more than one output; multi-phase, interleaved, parallel power converters with two or more parallel converter sections; power converters arranged in a bridged configuration for amplifier and inverter applications; power converters similar to those shown in the drawing but which integrate individual magnetic circuit elements onto a single magnetic core; power converters similar to those shown but which have instead high AC ripple voltages on the input filter capacitors; power converters, similar to those shown in the drawing, but where the DC input source is instead a varying rectified AC signal. Accordingly, the scope of the invention should be determined not by the embodiments illustrated, but by the appended claims and their legal equivalents.

I claim:

1. A power converter comprising:
   an input coupleable to a source of DC potential,
   an output coupleable to a DC load,
   a first coupled inductive element with substantial DC energy storage capability having a secondary winding coupled to said output and a primary winding, a second coupled inductive element with substantial DC energy storage capability having a secondary winding coupled to said output and a primary winding coupled in series to said primary winding of said first coupled inductive element, first switch means for coupling said input to said primary winding of said first coupled inductive element, second switch means for coupling said input to said primary winding of said first coupled inductive element and to said first switch means operable substantially in anti-synchronization with said first switch means, third switch means for coupling said input to said primary winding of said second coupled inductive element, fourth switch means for coupling said input to said primary winding of said second coupled inductive element and to said third switch means operable substantially in anti-synchronization with said third switch means, fifth switch means for coupling said secondary winding of said first coupled inductive element to said load, sixth switch means for coupling said secondary winding of said second coupled inductive element to said load operable substantially in anti-synchronization with said fifth switch means, control means for activating said first, second, third, fourth, fifth, and sixth switch means such that said first, second, third, and fourth switch means are operated when the voltage drop therethrough is substantially zero, whereby either said first coupled inductive element or said second coupled inductive element contributes energy to the turn on transition of said first, second, third, or fourth switch means and operation of said fifth or sixth switch means is delayed in time with respect to said operation of said first, second, third, or fourth switch means during said turn on transition so that said stored energy contributed to said turn on transitions by either said first or second coupled inductive elements can be substantially maintained throughout the duration of said turn on transition and cannot be directed to said load prior to said operation of said first, second, third, or fourth switch means during said turn on transitions.

2. A power converter as set forth in claim 1, wherein said first, second, third, fourth, fifth, and sixth switch means comprise semiconductor switch means.

3. A power converter as set forth in claim 2, further comprising a first magnetic inductive element coupled in series with said secondary winding of said first coupled inductive element a second magnetic inductive element coupled in series with said secondary winding of said second coupled inductive element whereby said magnetic inductive elements provide said time delays during said turn on transitions.

4. A power converter as set forth in claim 3, wherein said magnetic inductive elements comprise saturable core inductors.

5. A power converter as set forth in claim 1, wherein said first and second coupled inductive elements are integrated onto a single magnetic core.

6. A power converter as set forth in claim 5, wherein said primary winding of said first coupled inductive element and said primary winding of said second coupled inductive element are combined into a single primary winding.

7. A power converter comprising:

an input coupleable to a source of DC potential, an output coupleable to a DC load, a first coupled inductive element with substantial DC energy storage capability having a secondary winding coupled to said output and a primary winding coupled to said input, a second coupled inductive element with substantial DC energy storage capability having a secondary winding coupled to said output and a primary winding coupled in series to said primary winding of said first coupled inductive element, first switch means for coupling said input to said primary winding of said second coupled inductive element, a capacitor coupled to said input second switch means for coupling said capacitor to said primary winding of said second coupled inductive element and to said first switch means operable substantially in anti-synchronization with said first switch means, third switch means for coupling said secondary winding of said first coupled inductive element to said load operated substantially in synchronization with said second switch means, fourth switch means for coupling said secondary winding of said second coupled inductive element to said load operable substantially in synchronization with said first switch means, control means for activating said first, second, third, and fourth switch means such that said first and second switch means are operated when the voltage drop therethrough is substantially zero, whereby said second coupled inductive element contributes energy to the turn on transition of said first and second switch means and operation of said fourth switch means is delayed in time with respect to said operation of said first switch means during said turn on transition of said first switch means so that said stored energy contributed to said turn on transition by said second coupled inductive element can be substantially maintained throughout said turn on transition and cannot be directed to said load prior to said operation of said first switch means during said turn on transition of said first switch means.

8. A power converter as set forth in claim 7, wherein said first, second, third, and fourth switch means consist of semiconductor switch means.

9. A power converter as set forth in claim 8, further comprising a magnetic inductive element coupled in series with said secondary winding of said second coupled inductive element, whereby said magnetic inductive element provides said time delay during said turn on transition of said first switch means.

10. A power converter as set forth in claim 9, wherein said magnetic inductive element comprises a saturable core inductor.

11. A power converter as set forth in claim 7, wherein said first and second coupled inductive elements are integrated onto a single magnetic core.

12. A power converter as set forth in claim 11, wherein said primary winding of said first coupled inductive element and said primary winding of said second coupled inductive element are combined into a single primary winding.

13. A power converter comprising:

an input coupleable to a source of DC potential, an output coupleable to a DC load, a capacitor coupled to said input a first coupled inductive element with substantial DC energy storage capability having a secondary winding coupled to said output and a primary winding coupled in series to said capacitor, a second coupled inductive element with substantial DC energy storage capability having a secondary winding coupled to said output and a primary winding coupled in series to said primary winding of said first coupled inductive element, first switch means for coupling said input to said primary winding of said second coupled inductive element, second switch means for coupling said input to said primary winding of said second coupled inductive element and to said first switch means operable substantially in anti-synchronization with said first switch means, third switch means for coupling said secondary winding of said first coupled inductive element to said load operated substantially in synchronization with said second switch means, fourth switch means for coupling said secondary winding of said second coupled inductive element to said load operable substantially in synchronization with said first switch means, control means for activating said first, second, third, and fourth switch means such that said first and second switch means are operated when the voltage drop therethrough is substantially zero, whereby said first coupled inductive element contributes energy to the turn on transition of said second switch means and said second coupled inductive element contributes energy to the turn on transition of said first switch means and operation of said third and fourth switch means is delayed in time with respect to said operation of said second and first switch means, respectively, during said turn on transition of said second and first switch means, respectively, so that said stored energy contributed to said turn on transitions by said first and second coupled inductive elements can be substantially maintained throughout said turn on transitions and cannot be directed to said load prior to said operation of said first and second switch means during said turn on transitions of said first and second switch means.

14. A power converter as set forth in claim 13, wherein said first, second, third, and fourth switch means consist of semiconductor switch means.

15. A power converter as set forth in claim 14, further comprising:

a first magnetic inductive element coupled in series with said secondary winding of said first coupled inductive element, a second magnetic inductive element coupled in series with said secondary winding of said second coupled inductive element, whereby said magnetic inductive elements provide said time delays during said turn on transitions.

16. A power converter as set forth in claim 15, wherein said magnetic inductive elements comprise saturable core inductors.

17. A power converter as set forth in claim 13, wherein said first and second coupled inductive elements are integrated onto a single magnetic core.

18. A power converter as set forth in claim 17, wherein said primary winding of said first coupled inductive element and said primary winding of said second coupled inductive element are combined into a single primary winding.

* * * * *